US006265708B1

(12) United States Patent
Tanaka et al.

(10) Patent No.: US 6,265,708 B1
(45) Date of Patent: Jul. 24, 2001

(54) METHOD AND APPARATUS FOR CONTROLLING PHOTOINTENSITY AND/OR LUMINOUS FLUX DENSITY OF A SIGNAL LIGHT

(75) Inventors: Norio Tanaka, Tokyo; Shigeru Takarada, Matsudo; Hiromitsu Yanagimoto, Tokyo; Masakatsu Kai, Yokohama; Ichiro Ueno, Isehara, all of (JP)

(73) Assignees: Dainichiseika Color & Chemicals Mfg. Co., Ltd., Tokyo; Victor Company of Japan, Limited, Yokohama, both of (JP)

( * ) Notice: Subject to any disclaimer, the term of this patent is extended or adjusted under 35 U.S.C. 154(b) by 0 days.

(21) Appl. No.: 09/117,877
(22) PCT Filed: Nov. 14, 1996
(86) PCT No.: PCT/JP96/02687
    § 371 Date: Aug. 6, 1998
    § 102(e) Date: Aug. 6, 1998
(87) PCT Pub. No.: WO97/30372
    PCT Pub. Date: Aug. 21, 1997

(30) Foreign Application Priority Data

| Feb. 14, 1996 | (JP) | ................................................ 8-026419 |
| Mar. 12, 1996 | (JP) | ................................................ 8-054551 |
| Mar. 12, 1996 | (JP) | ................................................ 8-054563 |
| Jun. 12, 1996 | (JP) | ................................................ 8-151133 |
| Sep. 10, 1996 | (JP) | ................................................ 8-239313 |
| Sep. 10, 1996 | (JP) | ................................................ 8-239314 |

(51) Int. Cl.[7] .............................. G02F 1/17; G02F 1/35
(52) U.S. Cl. ........................................ 250/216; 250/214.1
(58) Field of Search ............................ 250/214.1, 214 R, 250/216; 359/241, 244, 239, 238, 237; 252/582

(56) References Cited

U.S. PATENT DOCUMENTS 4,362,364   12/1982   Smith .

| 4,693,545 | * | 9/1987 | Henningsen et al. ................... 385/30 |
| 5,309,262 | * | 5/1994 | Haas ........................................ 359/67 |
| 5,600,172 | * | 2/1997 | McDevitt et al. ...................... 257/436 |

FOREIGN PATENT DOCUMENTS

| 2 164 168  | 3/1986  | (GB) . |
| 53-137884  | 12/1978 | (JP) . |
| 55-100503  | 7/1980  | (JP) . |

(List continued on next page.)

OTHER PUBLICATIONS

Yang et al., "All–optical switching and optical limiting based on non–linear effect of excited–state," Wuli Xuepao, vol. 44, No. 3, 1995, pp. 419–426, Mar. 1995.*

T. H. Wei, et al. *Direct Measurements of Nonlinear Absorption and Refraction in Solutions of Phthalocyanines*, Appl. Phys. B, vol. 54, No. 1 (1992), pp. 46–51.

(List continued on next page.)

*Primary Examiner*—John R. Lee
(74) *Attorney, Agent, or Firm*—Oliff & Berridge, PLC

(57) ABSTRACT

The present invention provides a method of controlling light and an apparatus of controlling light capable of extracting sufficiently large and speedy optical responses from the photoresponsive photoelement with a high reproducibility, wherein the control light is emitted from the light source 1, and the signal light from the light source 2. The control light and signal light are converged by the converging lens 7, and illuminated to the film photoelement 8 filled in with the photoresponsive composition. Via the collimate lens 9 and the band-pass filter 20, only the signal light is detected with the photodetector 22. By turning the control light on and off, the transmittance and/or refractive index of the signal light are reversibly increased or decreased, realizing the modulation of photointencity. By setting the numerical aperture of the collimate lens at the value essentially smaller than the numerical aperture of the collimate lens, sufficiently large and speedy optical responses can be extracted from the photoelement comprised of photoresponsive composition containing dye.

19 Claims, 51 Drawing Sheets

FOREIGN PATENT DOCUMENTS

| | | |
|---|---|---|
| 55-108603 | 8/1980 | (JP). |
| 60-130723 | 7/1985 | (JP). |
| 61-129621 | 6/1986 | (JP). |
| 63-89805 | 4/1988 | (JP). |
| 63-231424 | 9/1988 | (JP). |
| 63-236013 | 9/1988 | (JP). |
| 64-73326 | 3/1989 | (JP). |

OTHER PUBLICATIONS

M. M. Martin et al. Fast Change in the Excited State Absorption Spectrum of TPM Dye Solutions, Springer Series in Chemical Physics, vol. 53 (1990), pp. 504–506.

F. Graf et al. Excited State Absorption Dynamics of Fast Relaxing Dye No. 5, Optics Communications, vol. 51, No. 2 (1984), pp. 111–116.

* cited by examiner

,

,

METHOD AND APPARATUS FOR CONTROLLING PHOTOINTENSITY AND/OR LUMINOUS FLUX DENSITY OF A SIGNAL LIGHT

BACKGROUND OF THE INVENTION

1. Field of Invention

The present invention relates to a method of controlling light and to an apparatus for controlling light using a photo-responsive element useful in the field of photoelectronics and photonics, such as optical communication and optical information processing.

2. Description of Related Art

For the purpose of ultra-high speed transduction and processing of information, in the field of optical electronics and photonics focused on the multiplicity and high density of light research and development on the light-light controlling method (method of controlling light by light) have been ardently made aiming at the modulation of the intensity (amplitude) or frequency (wavelength) of light utilizing the changes in the transmittance and refractive index caused by illuminating the optical element formed by processing optical materials or optical compositions without depending on electronic circuit techniques. In addition, when the parallel optical logical operation and imaging are intended to make the best use of the characteristics of light, a "spatial light modulator" for performing a certain modulation such as a modulation of the photointensity distribution on the beam-section (bundle of rays) is extremely important, wherein the application of said light-light controlling method is also highly expected.

As the phenomena wherein the application for the light-light controlling method is expected, the nonlinear optical effect such as the saturable absorption, nonlinear refraction and photoreactive effect, and photochromic phenomenon is of great interest.

On the other hand, the phenomenon wherein a molecule excited by the light in the first wavelength band region newly absorbs the light in the second wavelength band region different from the first wavelength band region has been known, and this phenomenon may be called "excited state absorption" or "induced absorption", or "transient absorption".

As an example of attempting to apply excited state absorption, Japanese Patent Laid-open Publication No. Sho 53-137884, for example, discloses an optical modulation method wherein a solution or solid containing compounds of the porphyrin series and an electron receptor was illuminated with lights of two different wavelengths, resulting in the transduction of the information of the one light of the one wavelength to the wavelength of the other light. Also, Japanese Patent Laid-open Publication No. Sho 55-100503 and Japanese Patent Laid-open Publication No. Sho 55-108603 disclose an optical fiber of the functional liquid core-type which selects the propagation light corresponding to the time-dependent variation of the excited light utilizing the spectrum difference between the ground and excited states of porphyrin derivatives. In addition, Japanese Patent Laid-open Publication No. Sho 63-89805 discloses an plastic optical fiber containing organic compounds such as porphyrin derivatives in its core which show the absorption corresponding to the transition to the more higher triplet state from the light-excited triplet state. Also, Japanese Patent Laid-open Publication No. Sho 63-236013 discloses an optical functional element wherein, after the crystalline cyanine dye such as cryptocyanine is illuminated with a light of the first wavelength to excite the molecule, said molecule is illuminated with another light of the second wavelength different from the first wavelength, thereby the transmittance or reflection of the light of the second wavelength is switched by the light-excited state by the light of the first wavelength. Furthermore, Japanese Patent Laid-open Publication No. Sho 64-73326 discloses an optical signal modulating medium which optically modulates utilizing the absorption spectral difference between the excited and ground states induced by illuminating the optical modulation medium comprising a light-induced electron migration material such as porphyrin derivatives dispersed in the matrix materials with the lights of the first and second wavelengths.

As the construction of the optical apparatus used in the conventional techniques, Japanese Patents Laid-open Publications No. Sho 55-100503, No. Sho 55-108603, and No. Sho 63-89805 disclose an apparatus construction wherein the light source of exciting light (e.g., flush lamp) is wound by the optical fiber propagating the propagation light. Japanese Patent Laid-open Publications No. Sho 53-137884 and No. Sho 64-73326 disclose the apparatus construction wherein the whole portion within the photo-responsive optical element where the light corresponding to the signal light propagates is illuminated with the light corresponding to the control light from the different direction from that of the light path of the signal light without said control light being converged, but rather diverged by means of a projecting lens, etc.

However, because of the requirement for the light power of extremely high density to give rise to changes in the transmittance or refractive index (photoresponse) large enough for practical use, the slow response to light illumination, and the low durability of photoresponsive materials in the conventional techniques, an apparatus for controlling light for practical usage has yet to be obtained.

It is the object of the present invention to solve the above-described problems and provide a method and apparatus of controlling light to obtain the sufficiently large photoresponse with a superior reproducibility.

SUMMARY OF THE INVENTION

In order to attain the above described objects, the method of controlling light in accordance with the present invention comprises illuminating the photoelement comprised of photo-responsive composition with the control light having a wavelength to which said photo-responsive composition responds, reversibly changing the transmittance and/or the refractive index of said photoelement in the wavelength band range different from that of said control light, and modulating the photointensity and/or luminous flux density of said signal light transmitting through said photoelement.

Said method comprises converging said control light and said signal light respectively and illuminating them to said photoelement, and aligning the light paths of said control light and said signal light respectively such that the regions with the highest photon density in the vicinity of the focal points of said control light and said signal light are overlapped each other in said photoresponsive composition within said photoelement.

Also, in order to attain the above-described object, a method of controlling light in accordance with an exemplary embodiment of the present invention comprising propagating said control light and said signal light on essentially the same light path in said photo-element in the method in accordance with the present invention.

In addition, in order to attain the above-described object, a method of controlling light in accordance with an exemplary embodiment of the present invention comprising differentiating and extracting the bundle of rays of the signal light in the region which has undergone the profound modulation of said photointensity and/or luminous flux density out of the bundle of rays of the signal light which have transmitted said photo-responsive composition in said photoelement and emitted therefrom in the method of controlling light in the method of controlling light in accordance with the present invention.

In this case, usually since the central portion of the bundle of rays of the signal light is especially susceptible to the modulation, it is preferable to coincide the central optical axis of the collimate lens with the central optical axis of the bundle of rays of the signal light when the collimate lens is used to converge the bundle of rays of the divergent signal light.

Furthermore, in order to attain the above-described object, a method for controlling light in accordance with an exemplary embodiment of the present invention comprises extracting the bundle of rays of the diverging signal light after its transmittance through said light-responsive composition within said photo-element by a smaller angular aperture than the diverging angle of the bundle of rays of said signal light, and thereby differentiating and extracting the bundle of rays of the signal light in the region which has undergone the profound modulation in the method of controlling light in accordance with the present invention.

Also, in order to attain the above-described object, a method of controlling light in accordance with an exemplary embodiment of the present invention comprising, by changing the positional relationship between the focal points of said control light and said signal light respectively and the position of said photo-element, selecting and extracting the photo-responses either in the direction of decreasing the apparent photointensity of said signal light which has transmitted said photo-element or in the direction of increasing the apparent photointensity of said signal light by the illumination of said control light in the methods in accordance with the present invention.

In addition, in order to attain the aboveescribed object, a method of controlling light in accordance with an exemplary embodiment of the present invention comprises using a photo-element comprising a photo-responsive composition containing dye as said photo-element in the method of controlling light in accordance with the present invention.

Furthermore, in order to attain the above-described object, a method of controlling light in accordance with an exemplary embodiment of the present invention comprises using a photo-element comprising a photo-responsive composition containing at least one kind of the triarylmethane dye represented by the following Formula 1 as said photo-element in the method of controlling light in accordance with the present invention.

(in Formula 1, $\phi^1$, $\phi^2$ and $\phi^3$ represent the monovalent or divalent aromatic hydrocarbon residues or aromatic heterocyclic residues linked to the central carbon atom C with the carbon atom, including the cases wherein these residues have substituent(s).)

$X^-$ represents a chemically inactive counter anion for said triarylmethyl cation. By "chemically inactive" it is meant that the anion does not react with said triarylmethyl cation, and, only as an ionic species, electrostatically interacts with said cation. $X^-$ may be exemplified by anions such as chloride ion ($Cl^-$), bromide ion ($Br^-$), iodide ion ($I^-$), perchlorate ion ($ClO_4^-$), tetrafluoroborate ion ($BF_4^-$), hexafluorophosphorate ion ($PF_6^-$), sulfate ion ($SO_4^-$), hydrogensulfate ion ($HSO_4^-$), p-oluenesulfonate ion ($CH_3C_6H_4SO_3^-$), benzenesulfonate ion ($C_6H_5SO_3^-$), methanesulfonate ion ($CH_3SO_3^-$), trifluoromethanesulfonate ion ($CF_3SO_3^-$), acetate ion ($CH_3COO^-$), trichloroacetate ion ($CCl_3COO^-$), or trifluoroacetate ion ($CF_3COO^-$).

Also, in order to attain the above-described object, a method of controlling light in accordance with an exmplary embodiment of the present invention comprises using a photo-element containing a photo-responsive composition including at least one of triarylmethane dyes represented by the following Formula 2 as said photo-element in the method of controlling light in accordance with the present invention.

(in Formula 2, $\phi^4$ and $\phi^5$ represent the monovalent or divalent aromatic hydrocarbon residue or aromatic heterocyclic residue linked to the central carbon atom C with the carbon atom, including the cases wherein these residues have substituent(s).)

$\phi^6$ represents a quinoid aromatic hydrocarbon residue or aromatic heterocyclic residue wherein two carbon atoms are linked to the central carbon atom and an oxygen atom via the double bond, respectively, including the cases wherein these residues have substituent(s).)

In addition, in order to attain the above-described object, a method of controlling light in accordance with an exemplary embodiment of the present invention comprises using a photo-element comprising a photo-responsive composition containing at least one of polymethine dyes represented by the following Formula 3 as said photo-element in the method of controlling light in accordance with the present invention.

(in Formula 3, $\phi^7$ represents a monovalent heterocyclic residue linked to the methine chain by the carbon atom, including the cases wherein these residues have substituent (s).

$\phi^8$ represents a divalent heterocyclic residue linked to the methine chain by the carbon atom, including the cases wherein these residues have substituent(s).

m is an integer including 0, 1, 2 or higher than 3.

When m is higher than 1, $R^A$ and $R^B$ represent hydrogen atom, ethyl carbonate group, halogen atom, alkyl group, aryl group, hydroxyl group, alkoxy group, or amino group, respectively, including the cases wherein these residues have substituent(s).

When m is higher than 2, cases are included wherein $R^A$ and $R^B$ are separate, or where they combine with each other to form a ring.

$Y^-$ represents a chemically inactive counter anion for the cationic moiety of said polymethine dye. By "chemically inactive" it is meant that the anion does not react with the cationic moiety of said polymethine dye, and, only as an ionic species, electrostatically interacts with said cation. $Y^-$ may be exemplified by anions such as chloride ion ($Cl^-$), bromide ion ($Br^-$), iodide ion ($I^-$), perchlorate ion ($ClO_4^-$), tetrafluoroborate ion ($BF_4^-$), hexafluorophosphorate ion ($PF_6^-$), sulfate ion ($SO_4^-$), hydrogensulfate ion ($HSO_4^-$), p-toluenesulfonate ion ($CH_3C_6H_4SO_3^-$), benzenesulfonate ion ($C_6H_5SO_3^-$), methanesulfonate ion ($CH_3SO_3^-$), trifluoromethanesulfonate ion ($CF_3SO_3^-$), acetate ion ($CH_3COO^-$), trichloroacetate ion ($CCl_3COO^-$), or trifluoroacetate ion ($CF_3COO^-$).

Furthermore, in order to attain the above-described object, a method of controlling light in accordance with an exemplary embodiment of the present invention of the present invention comprises using a photo-element comprising a photo-responsive composition containing at least one kind of phthalocyanine compounds represented by the following Formulas 4 through 11 as said photo-element in the method of controlling light in accordance with the present invention.

(formula 4)

(4)

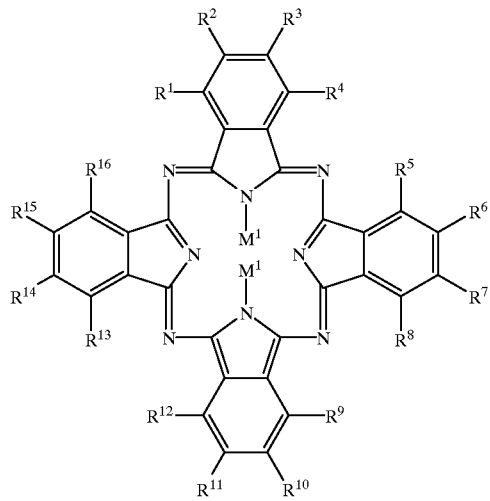

(in Formula 4, $M^1$ represents one hydrogen atom or one monovalent metal atom, including cases wherein a neutral ligand is coordinated to $M^1$.

$R^1$ through $R^{16}$ represent hydrogen atom, or a monovalent substitute derived from compounds of elements of IV group (C, Si, Ge, Sn and Pb), V group (N, P, As, Sb and Bi), VI group (O, S, Se, Te, and Po) or VII group (F, Cl, Br and I), including cases wherein these substituents are different from each other, or wherein two adjacent substituents combine to each other to form a ring.)

(Formula 5)

(5)

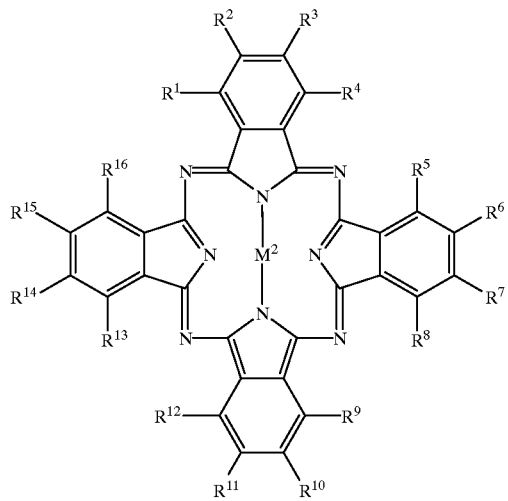

(in Formula 5, $M^2$ represents one divalent metal atom, including the case wherein a neutral ligand is coordinated to $M^2$.

$R^1$ through $R^{16}$ represent the same as described in the case of Formula 4.)

(Formula 6)

(6)

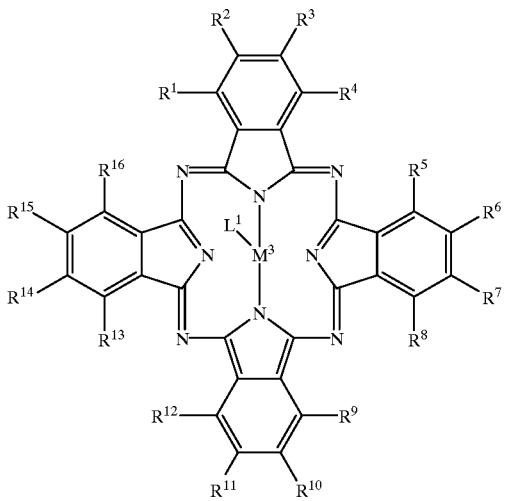

(in Formula 6, $M^3$ represents one trivalent metal atom, including the case wherein a neutral ligand is coordinated to $M^3$.

$L^1$ represents a monovalent substitute or a monovalent anion derived from compounds of elements of IV group (C, Si, Ge, Sn and Pb), V group (N, P, As, Sb and Bi), VI group (O, S, Se, Te and Po) or VII group (F, Cl, Br and I), and $R^1$ through $R^{16}$ represent the same as described in the case of Formula 4.)

(Formula 7)

(7)

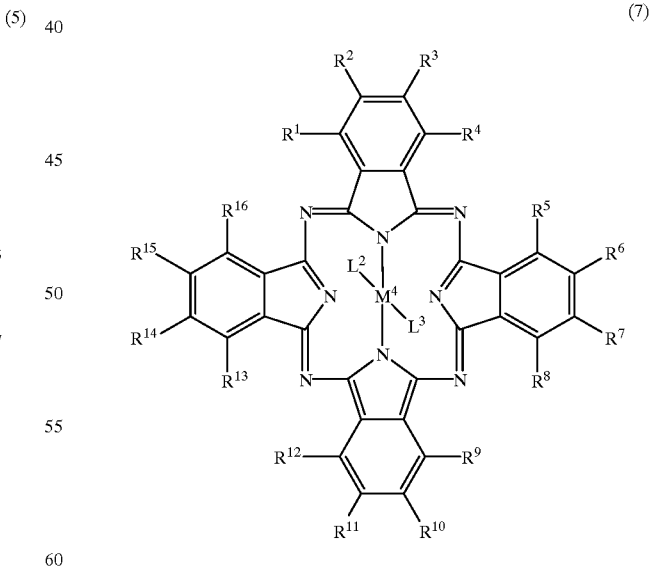

(in Formula 7, $M^4$ represents one tetravalent metal atom, $L^2$ and $L^3$ are synonymous with $L^1$ in Formula 6, respectively, including the case wherein $L^2$ and $L^3$ are combined to each other to form a ring, and $R^1$ through $R^6$ are synonymous with those in the case of Formula 4.)

(Formula 8)

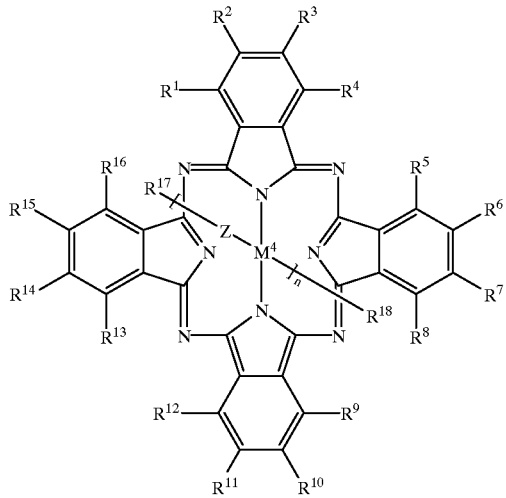

(in Formula 8, $M^4$ represents one tetravalent metal atom, n is an integer higher than 1, Z is a divalent group represented by —O— or —O—R—O—, wherein R represents a divalent group derived from compounds comprising elements of IV group (C, Si, Ge, Sn and Pb), and $R^1$ through $R^{18}$ are synonymous with $R^1$ through $R^{16}$ described in Formula 4.)

(Formula 9)

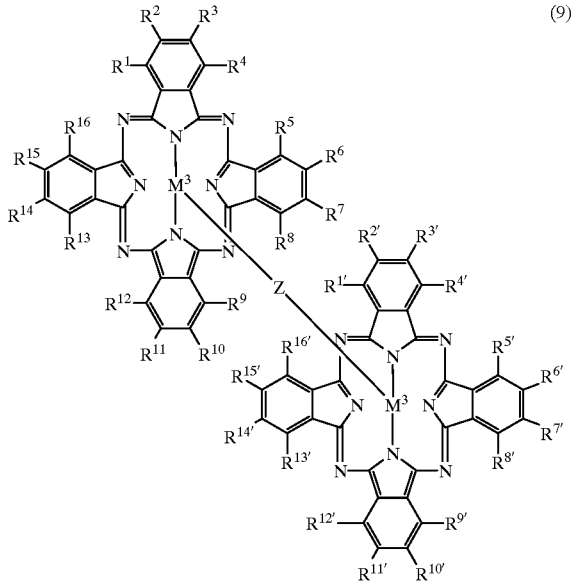

(in Formula 9, $M^3$ represents one trivalent metal atom, including the case wherein a neutral ligand is coordinated to $M^3$, Z is synonymous with that in Formula 8, and $R^1$ through $R^{16}$, and $R^{1'}$ through $R^{16'}$ are synonymous with $R^1$ through $R^{16}$ described in Formula 4.)

(Formula 10)

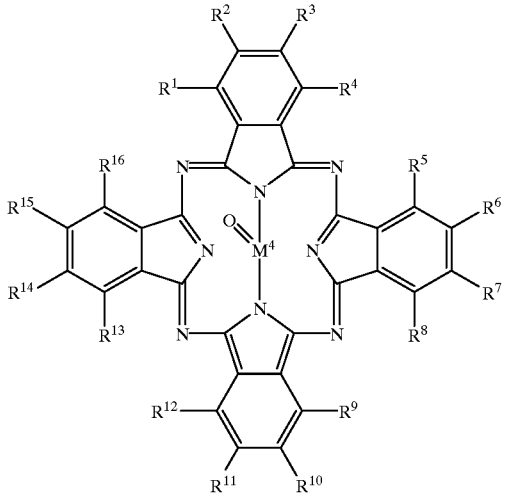

(in Formula 10, $M^4$ represents one tetravalent metal atom, including the case wherein a neutral ligand is coordinated to $M^4$, and $R^1$ through $R^{16}$ are synonymous with those described in the case of Formula 4.)

(Formula 11)

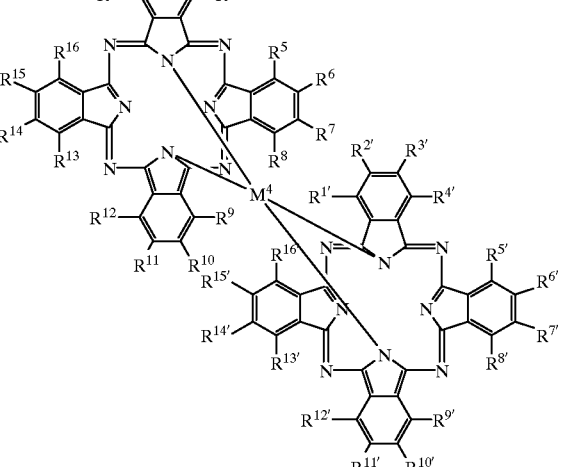

(in Formula 11, $M^4$ represents one tetravalent metal atom, including the case wherein a neutral ligand is coordinated to $M^4$, and $R^1$ through $R^{16}$, and $R^{1'}$ through $R^{16'}$ are synonymous with $R^1$ through $R^{16}$ described in Formula 4.)

In the above-described Formula 4, the monovalent metal atom ($M^1$) may be exemplified by, for example, alkali metals such as lithium, sodium, potassium, rubidium and cesium.

In the above-described Formula 5, the divalent metal atom ($M^2$) may be exemplified by, for example, alkaline earth metals such as beryllium, magnesium, calcium, strontium and ballium, etc., transition metals such as molybdenum, tungsten, manganese, iron, ruthenium, osmium, cobalt, rhodium, iridium, nickel, palladium, platinum, copper, silver, etc., and typical metals such as zinc, cadmium, mercury, lead, etc.

In the above-described Formulas 6 or 9, the trivalent metal atom ($M^3$) is exemplified by, for example, transition metals such as scandium, ittrium, chromium, manganese, iron, rhodium, gold, etc., typical metals such as aluminum, gallium, indium, thallium, antimony, etc., and lanthanide metals such as praseodymium, neodymium, europium, gadolinium, terbium, dysprosium, holmium, erbium, thulium, ytterbium, etc.

In the above-described Formulas 7, 8, 10 or 11, the tetravalent metal atom ($M^4$) is exemplified by, for example, transition metals such as titanium, zirconium, hafnium, vanadium, niobium, tantalum, etc., typical metals such as silicon, germanium, tin, etc., lanthanide metals such as ruthenium, and actinoid metals such as thorium, protactinium, uranium, etc.

In the above-described Formulas 4 through 11, the neutral ligand is exemplified by, for example, water, oxygen molecule, carbon monoxide, tetrahydrofuran, acetonitrile, pyridine, 4,4'-bipyridine, pyrazine, pyrimidine, pyridazine, morpholine, etc.

In the above-described Formulas 4 through 11, the monovalent substituent ($R^1$ through $R^{18}$, $R^{1'}$ through $R^{16'}$, and $L^1$ through $L^3$) derived from compounds of Group IV (C, Si, Ge, Sn and Pb) is exemplified by, for example, methyl group, ethyl group, propyl group, isopropyl group, cyclopropyl group, n-butyl group, tell-butyl group, n-pentyl group, cyclopentyl group, cyclohexyl group, n-hexyl group, n-heptyl group, neo-pentyl group, n-octyl group, isooctyl group, n-nonyl group, n-decyl group, n-undecyl group, n-dodecyl group, n-octadecyl group, vinyl group, 2-propenyl group, benzyl group, phenyl group, biphenyl group, 2,4-dimethoxyphenyl group, naphthyl group, methoxy group, ethoxy group, n-butoxy group, n-pentoxy group, n-hexyloxy group, n-heptoxy group, n-octyloxy group, n-nonyloxy group, n-decyloxy group, n-undecyloxy group, n-dodecyloxy group, n-octadecyloxy group, benzyloxy group, phenoxy group, acetyl group, methoxycarbonyl group, trimethylsilyl group, dimethylphenylsilyl group, trimethylsiloxy group, trimethylgermyl group, methyldiphenylgermyl group, trimethyltin group, triethyllead group, etc.

In the above-described Formulas 4 through 11, the monovalent substituent ($R^1$ through $R^{18}$, $R^{1'}$ through $R^{16'}$, and $L^1$ through $L^3$) derived from compounds of Group V (N, P, As, Sb and Bi) is exemplified by, for example, dimethylamino group, diethylamino group, methylpropylamino group, dibenzylamino group, ethylphenylamino group, 4-(dimethylamino)butyl group, 6-(diethylamino)hexyloxy group, N-methylacetylamino group, diphenylphosphinyl group, diphenylarsenyl group, diphenylsutibinyl group, diphenylbisumutinyl group, etc.

In the above-described Formulas 4 through 11, the monovalent substituent ($R^1$ through $R^{18}$, $R^{1'}$ through $R^{16'}$, and $L^1$ through $L^3$) derived from compounds of Group VI (O, S, Se, Te and Po) is exemplified by, for example, hydroxy group, methoxy group, n-butoxy group, n-pentoxy group, n-hexyloxy group, n-heptoxyl group, n-octyloxy group, n-nonyloxy group, n-decyloxy group, n-undecyloxy group, n-dodecyloxyl group, n-octadecyloxy group, benzyloxy group, phenoxy group, mercapto group, methylthio group, ethylthio group, 2-furyl group, 2-thiophenyl group, 2-selenophenyl group, 2-tellurophenyl group, etc.

In the above-described Formulas 6, 7 or 11, the monovalent anion ($L^1$, $L^2$ or $L^3$) is exemplified by, for example, acetate ion ($CH_3COO^-$), chloroacetate ion ($ClCH_2COO^-$), trifluoroacetate ion ($CF_3COO^-$), hydrogencarbonate ion ($HOCOO^-$), hydrogensulfate ($HSO_4^-$), p-toluenesulfonate ($CH_3C_6H_4SO_3^-$), benzenesulfonate ion ($C_6H_5SO_3^-$), methanesulfonate ion ($CH_3SO_3^-$), trifluoromethanesulfonate ion ($CF_3SO_3^-$), cyanide ion ($CN^-$), cyanate ion ($OCN^-$), isocyanate ion ($NCO^-$), isothiocyanate ion ($NCS^-$), perchlorate ion ($ClO_4^-$), tetrafluoroborate ion ($BF_4^-$), hexafluorophosphorate ion ($PF_6^-$), etc.

In the above-described Formulas 8 or 9, divalent group (R) derived from compounds of Group IV (C, Si, Ge, Sn and Pb) is exemplified by, for example, methylene group, ethylene group, 1,2-propylene group, 2,3-butylene group, 1,4-phenylene group, dimethylsilylene group, methylphenylsilylene group, diphenylgermylene group, etc.

In addition, in order to attain the above-described object, a method for controlling light according to an exemplary embodiment of the present invention comprises using said photo-responsive composition which is liquid and a photocell packed in with said liquid photo-responsive composition in the methods in accordance with the present invention.

Also, in order to attain the above-described object, a method for controlling light according to the present invention of the present invention, wherein said liquid photo-responsive composition contains a volatile solvent in the method for controlling light according to the present invention.

In order to attain the above described objects, an apparatus of controlling light in accordance with an exemplary embodiment of the present invention comprises illuminating the photoelement comprised of photo-responsive composition with the control light having a wavelength to which said photo-responsive composition responds, reversibly changing the transmittance and/or the refractive index of the photoelement in the wave band range different from that of said control light, and modulating the photointencity and/or luminus flux surface density of said signal light transmitting through said photoelement, means for converging said control light and said signal light respectively, aligning the light paths of said control light and said signal light such that the regions with the highest photon density in the vicinity of the focal points of said control light and signal light respectively are overlapped each other, and laying out said photo-responsive composition within said photoelement such that the regions with the highest photon density in the vicinity of the focal points of said control light and signal light respectively are overlapped each other.

Furthermore, in order to attain the above described objects, an apparatus of controlling light in accordance with an exemplary embodiment of the present invention comprises wherein the light path is aligned such that said control light and said propagate on essentially the same light path within said photo-element in the light-controlling apparatus in accordance with the present invention.

In addition, in order to achieve the above described object, an light-controlling apparatus in accordance with an exemplary embodiment of the present invention comprising means for differentiating and extracting the bundle of rays of the signal light in the region which have undergone the profound modulation of said photointencity and/or said luminous flux density out of the bundle of rays of diverging signal light after transmitting said photo-responsive composition within said photoelement in the apparatus of controlling light in accordance with the present invention.

Furthermore, in order to attain the above-described object, an apparatus of controlling light in accordance with an exemplary embodiment of the present invention comprises means for differentiating and extracting the bundle of rays of signal light in the region which have undergone the profound modulation of said photointencity and/or said luminous flux density wherein said means comprises using means for converging with a smaller angular aperture than that of the means for converging used at the time of converging and illuminating said signal light to said photo-element in the apparatus for controlling light in accordance with the present invention.

Also, in order to attain the above-described object, an apparatus of controlling light in accordance with an exemplary embodiment of the present invention comprises as means for differentiating and extracting the bundle of rays of signal light in the region which have undergone the profound modulation of said photointencity and/or said luminous flux density, using an aperture stop in the apparatus of controlling light in accordance with the present invention.

Also, in order to attain the above-described object, an apparatus of controlling light in accordance with an exemplary embodiment of the present invention comprises moving means for changing the positional relationship between the focal points of said control light and said signal light respectively and the position of said photo-element, and, by using said moving means, and, by using said moving means, selecting and extracting the photo-responses either in the direction of decreasing the apparent photointencity of said signal light transmitting said photo-element after the illumination of said control light, or in the direction of increasing the apparent photointencity of said signal light in the apparatus of controlling light in accordance with the present invention.

In addition, in order to attain the above-described object, an apparatus of controlling light in accordance with an exemplary embodiment of the present invention comprises means for of separating a mixture of the signal light and control light which has transmitted through said photo-responsive composition within said photo-element into the component signal light and control light in the apparatus of controlling light in accordance with the present invention.

Furthermore, in order to attain the above-described object, the apparatus of controlling light in accordance with an exemplary embodiment of the present invention comprises a structure wherein means for converging said control light and said signal light, and/or means for differentiating and extracting the bundle of ray of the signal light in the region which has undergone the profound modulation of said photointencity and/or said luminous flux density out of the bundle of rays of the diverging signal light, and/or means of separating a mixture of signal light and control light transmitting said photo-responsive composition within said photo-element into the component signal light and control light are incorporated into said photo-element in the apparatus of controlling light in accordance with the present invention.

Also, in order to attain the above-described object, an apparatus of controlling light in accordance with an exemplary embodiment of the present invention wherein said photo-responsive composition comprises the dye in the apparatus of controlling light in accordance with the present invention.

Furthermore, in order to attain the above-described object, an apparatus of controlling light in accordance with claim 22 of the present invention wherein said photo-responsive composition comprises at least one kind of the dye of triarylmethane series represented by the above-described Formula 1 in the apparatus of controlling light in accordance with any one of claims 13 through 20.

Also, in order to attain the above-described object, an apparatus of controlling light in accordance with an exemplary embodiment of the present invention wherein said photo-responsive composition comprises at least one kind of the dye of triarylmethane series represented by the above-described Formula 2 in the apparatus of controlling light in the apparatus of controlling light in accordance with the present invention.

Also, in order to attain the above-described object, an apparatus of controlling light in accordance with claim 24 of the present invention wherein said photo-responsive composition comprises at least one kind of polymethine dyes represented by the above-described Formula 3 in the apparatus of controlling light in accordance with the present invention.

Also, in order to attain the above-described object, an apparatus of controlling light in accordance with an exemplary embodiment of the present invention wherein said photo-responsive composition comprises at least one kind of phthalocyanine compounds represented by any one of the above-described Formulas 4 through 11 in the apparatus of controlling light in accordance with the present invention.

Also, in order to attain the above-described object, an apparatus of controlling light in accordance with an exemplary embodiment of the present invention wherein said photo-responsive composition is liquid and a photocell filled in with said liquid photo-responsive composition is used as said photo-element in the apparatus of controlling light in accordance with the present invention.

Also, in order to attain the above-described object, an apparatus of controlling light in accordance with an exemplary embodiment of the present invention wherein said liquid photo-responsive composition comprises a volatile solvent in the apparatus of controlling light in accordance with the present invention.

Combination of Photo-responsive Composition and Wavelength Band Regions of Signal Light and Control Light A suitable combination of the photo-responsive composition, the wavelength band region of signal light and wavelength band region of control light used in the method of controlling of the present invention can be selected according to the purpose of use.

As a practical procedure of establishing the combination, for example, the wavelength or wavelength band region of signal light may first be determined according to the purpose of use, and then a most suitable combination of photo-responsive composition and wavelength of control light for controlling said signal light may be selected. Alternatively, after the combination of wavelengths of signal light and control light are determined according to the purpose of use, a suitable photo-responsive composition for said combination may be selected.

As to the constituent of photo-responsive composition used in the present invention and the lengths of optical path of signal light and control light transmitting the photo-element comprised of said photo-responsive composition, they can be established as a combination thereof based on the transmittance of the control light and signal light transmitting said photo-element. For example, first the concentration of a particular constituent of the photo-responsive composition which absorbs the control light or signal aoe light is determined, then the lengths of optical paths of signal light and control light transmitting the photo-element can be decided such that the transmittance of the control light and signal light transmitting the photo-element become specific values. Alternatively, for example, after the length of an optical path is first set at a specific value according to the requirement for designing the apparatus, the constituents of the photo-responsive composition can be adjusted such that the transmittance of the control light and signal light transmitting the photo-element becomes a specific value.

The object of the present invention is to provide the method and apparatus of controlling light which derive a sufficiently large and speedy photoresponse from the photoelement comprised of photo-responsive constituents with as low light power as possible, and the most suitable values of transmittance of the control light and signal light transmitting the photoelement to attain said object are as follows, respectively.

In the method and apparatus of controlling light of the present invention, it is recommended to set up the concentration and the existing condition of photo-absorbing component in the photo-responsive composition, and the optical path length such that the transmittance of the control light transmitting the photoelement becomes less than 90% at most.

Herein, when the photo-response in the direction of decreasing the transmittance of signal light by illuminating the control light is utilized, it is recommended to set up the concentration and the existing condition of photo-absorbing component in the photo-responsive composition and the optical path length such that the transmittance of the signal light transmitting the photoelement becomes more than at least 10%.

Photoresponsive Composition

Various known materials can be used as the photoresponsive composition used for the photoelement of the present invention which reversibly modulates the transmittance and/or refractive index of the signal light in the different wavelength region from that of the control light when illuminated with said control light.

In the present invention, as said photo-responsive composition, solid, glassy or gummy, and liquid materials can be used in the respective temperature range to be used.

Furthermore, the photo-responsive composition used in the present invention may contain antioxidants, ultraviolet light absorbent, single oxygen quencher, suspending agent, etc. to improve its processability and stability and/or durability as the photoelement so far as its function is not deteriorated.

Solid, Glassy or Gummy Photoresponsive Compositions

Solid, glassy or gummy photoresponsive compositions are exemplified by single crystals of semiconductor comprised of compounds of GaAs, GaAsP, GaAlAs, Inp, InSb, InAs, PbTe, InGaAsP, ZnB, etc., fine particles of said compound semiconductor dispersed in matrix materials, single crystals of halogenated metals (for example, potassium bromide, sodium chloride, etc.) doped with different metal ions, fine particles of said halogenated metals (for example, copper bromide, copper chloride, cobalt chloride, etc.) dispersed in matrix materials, single crystals of cadmium calcogenides such as CdS, CdSe, CdSeS, CdSeTe, etc. doped with different metal ions such as copper, fine particles of said cadmium calcogenides dispersed in matrix materials, single crystalline film, polycrystalline film porous film of semiconductors comprised of silicon, germanium, selenium, tellurium, etc., fine particles of semiconductors comprised of silicon, germanium, selenium, tellurium, etc. dispersed in matrix materials, fine particles of precious metals such as platinum, gold, palladium, etc. dispersed in matrix materials, single crystals corresponding to jewels such as ruby, alexandrite, garnet, Nd:YAG, sapphire, Ti:sapphire, Nd:YLF doped with metal ion (so-called laser crystals), potent dielectric crystals such as lithium niobate ($LiNbO_3$), $LiB_3O_5$, $LiTaO_3$, $KTiOPO_4$, $KH_2PO_4$, $KNbO_3$, $BaB_2O_2$, etc. doped with metal ions (for example, iron ion), glasses such as quartz glass, soda glass, borosilicate glass, etc. doped with metal ions (for example, neodymium ion, erbium ion, etc.) and dyes dissolved or dispersed in solid, glassy or gummy matrix materials, and can be preferably used.

Among them, dyes dissolved or dispersed in solid, glassy, or gummy matrix materials can be especially preferably used in the present invention, because they provide a wide range of selection of matrix materials and dyes, and can be easily processed to form photoelements.

Any substance can be employed as a solid, glassy, or gummy matrix material used in the present invention so far as it fulfills the following conditions:

1. it is in solid, glassy or gummy states in the entire temperature range to be used;
2. it has high transmittance in the wavelength region of the light used in the light controlling system used in the present invention;
3. it can dissolve or disperse said dyes used in the present invention; and
4. it can preserve the shape as the photoelement.

As inorganic matrix materials, for example, low-melting point glass materials manufactured by the so-called sol-gel transformation method can be used.

Also, as organic matrix materials, various organic polymers can be used, and exemplified by polystyrene, poly(α-methylstyrene), polyindene, poly(4-methyl-1-pentene), polyvinylpyridine, polyvinylformal, polyvinylacetal, polyvinylbutyral, poly(vinyl acetate), polyvinylalcohol, poly(vinyl chloride), poly(vinylidene chloride), poly (vinylmethyl ether), poly(vinylethyl ether), poly (vinylbenzyl ether), polyvinylmethylketone, poly(N-vinylcarbazol), poly(N-vinylpyrrolidone), poly(methyl acrylate), poly(ethyl acrylate), poly(acrylic acid), polyacrylonitrile, poly(methyl methacrylate), poly(ethyl methacrylate), poly(butyl methacrylate), poly(benzyl methacrylate), poly(cyclohexyl methacrylate), poly (methacrylic acid), polymethacrylamide, polymethacrylonitrile, polyacetaldehyde, polychloral, poly (ethylene oxide), poly(propylene oxide), poly(ethylene telephthalate), poly(butylene telephthalate), polycarbonates (bisphenols+carbonate), poly(diethylene glycol bisarylcarbonate), 6-nylon, 6,6-nylon, 12-nylon, 6,12-nylon, poly(ethyl asparaginate), poly(ethyl glutaminate), polylysine, polyproline, poly(γ-benzyl-L-glutamate), methyl cellulose, ethyl cellulose, benzyl cellulose, hydroxyethyl cellulose, hydroxypropyl cellulose, acetyl cellulose, cellulose triacetate, cellulose tnbutylate, resins such as alkyd resin (phthalic anhydride+glycerine), fatty acid-modulated alkyd resin (fatty acid+phthalic anhydride+glycerine), unsaturated polyester resin (maleic anhydride+phthalic anhydride+propylene glycol), epoxy resin (bisphenols+epichlorohydrin), polyurethane resin, phenol resin, urea resin, melamine resin, xylene resin, toluene resin, guanamine resin, etc., organic polysilane such as poly (phenylmethylsilane), polygermane, and the copolymer and copolycondensation products thereof. In addition, polymeric compounds obtained by plasma polymerization of compounds which do not polymerize under usual conditions such as carbon disulfide, carbon tetrafluoride, ethylbenzene, perfluorobenzene, perfluorocyclohexane, etc. may be used.

Furthermore, these organic polymers which are condensed with dye groups as the monomer unit side chains, cross-linig-groups, copolycondensation product monomer units, or polymerization initiation terminus may also be used as matrix materials.

Any published methods can be used to dissolve or disperse dyes in these solid, glassy or gummy matrix materials. For example, the following methods can be preferably used: wherein dye and matrix material are dissolved and mixed in a common solvent, and then the solvent is removed by distillation; wherein dye is dissolved or dispersed in a solution of inorganic matrix raw materials and then the matrix material is formed; wherein dye is dissolved or dispersed in the monomer of organic polymeric matrix materials using a solvent if necessary, and then said monomer is polymerized or polycondensed to form matrix materials, and wherein after a solution of dye and organic polymeric matrix material dissolved in a common solvent is added dropwise into another solvent in which both dye and plastic organic polymeric matrix material are insoluble, precipitates thus formed are filtered, dried, and processed by heating and melting. Since it is known that "H aggregate"

and "J aggregate" can be formed by aggregating dye by the elaboration of a combination of dye and matrix material as well as the method of processing thereof, dye molecule in matrix materials may be used under the conditions to create such aggregating or associating states.

Any published methods can be used to disperse said various fine particles in these matrix materials. For example, the following methods can be preferably used: wherein after said fine particles are dispersed in a solution of matrix materials or a solution of precursors thereof, the solvent is removed; wherein after said fine particles are dispersed in the monomer of organic polymeric matrix materials using a solvent if necsay said monomer is polymerized or polycondensed to form matrix materials; wherein after metal salts such as cadmium perchlorate and gold chloride as the precursor of fine particles are dissolved or dispersed in organic polymeric matrix materials, fine particles of cadmium sulfide are precipitated out by the treatment with hydrogen sulfide gas or fine particles of gold are precipitated out the thermal treatment in the matrix materials, respectively; a chemical gas phase growing method; and a spattering method. Liquid photo-responsive compositions Liquid photo-responsive compositions are exemplified by, for example, hyperfine particles of semiconductors comprised of compounds of GaAs, GAsP, GaAlAs, InP, InSb, InAs, PbTe, InGaAsP, ZnSe, etc. colloidally dispersed in liquid matrix materials, hyperfine particles of metal chlorides (for example, potassium bromide, sodium chloride, etc.) doped with different metal ions or said metal halogenides (for example, copper bromide, copper chloride, cobalt chloride, etc.) colloidally dispersed in liquid matrix materials, hyperfine particles of cadmium calcogenides such as CdS, CdSe, CdSeS, CdSeTe, etc. doped with different metal ions such as copper colloidally dispersed in liquid matrix materials, hyperfine particles of semiconductors comprised of silicon, germanium, selenium, tellurium, etc. colloidally dispersed in liquid matrix materials, hyperfine particles of precious metals such as platinum, gold, palladium, etc. colloidally dispersed in liquid matrix materials, complexes of metal ions (for example, neodymium ion, erbium ion, etc.) dissolved or colloidally dispersed in liquid matrix materials, and, in addition, dyes dissolved or colloidally dispersed in liquid matrix materials, and can be preferably used.

Among these, dyes dissolved or colloidally dispersed in liquid matrix materials can be especially preferably used in the present invention, because they provide a wide range of selection of matrix materials and dye, and can be easily processed to form photoelements.

Any substance can be employed as liquid matrix materials used in the present invention so far as it fulfills the following conditions:

1. it remains a liquid in the entire range of temperature and/or pressure to be used;
2. it has high transmittance in the wavelength region of light used in the light controlling system of the present invention;
3. it can dissolve or colloidaily disperse said dyes, etc. used in the present invention; and
4. it can preserve the constituents of photo-responsive composition as the photoresponsive composition.

As inorganic matrix materials, for example, water, water glass (a concentrated aqueous solution of alkali metal salts of silicic acid), hydrochloric acid, sulfuric acid, nitric acid, aqua regia, chlorosulfonic acid, methanesulfonic acid, trifluoromethanesulfonic acid, etc. can be used.

In addition, as organic matrix materials, various organic solvents and liquid organic polymeric substances can be used.

As the volatile organic solvents, the following substances can be used: for example, alcohols such as methanol, ethanol, isopropyl alcohol, n-butanol, amyl alcohol, cyclohexanol, benzyl alcohol, etc., polyalcohols such as ethylene glycol, diethylene glycol, glycerin, etc., esters such as ethyl acetate, n-butyl acetate, amyl acetate, isopropyl acetate, etc., ketones such as acetone, methyl ethyl ketone, methyl isobutyl ketone, cyclohexanone, etc., ether such as diethyl ether, dibutyl ether, methoxyethanol, ethoxyethanol, butoxyethanol, carbitol, cyclic ethers such as tetrahydrofuzan, 1,4-dioxane, 1,3-dioxolane, etc., halogenated hydrocarbons such as dichloromethane, chloroform, carbon tetrachloride, 1,2-dichloroethane, trichlene, bromoform, dibromomethane, diiodomethane, etc., aromatic hydrocarbons such as benzene, toluene, xylene, chlorobenzene, o-dichlorobenzene, nitrobenzene, anisole, α-chloronaphthalene, etc., aliphatic hydrocarbons such as n-pentane, n-hexane, n-heptane, cyclohexane, etc., amides such as N,N-dimethylformamide, N,N-dimethylacetamide, hexamethylphosphorus triamide, etc., cyclic amides such as N-methylpyrrolidone, etc., urea derivatives such as tetramethyl urea, 1,3-dimethyl-2-imidazolidinone, etc., sulfoxides such as dimethylsulfoxide, etc., carbonic acid esters such as ethylene carbonate, propylene carbonate, etc., nitrites such as acetonitrile, propionitrile, benzonitrile, etc., N-containing heterocyclic compounds such as pyridine, quinoline, etc., amines such as triethylamine, triethanolamine, diethylaminoalcohol, aniline, etc., organic acids such as chloroacetic acid, trichloroacetic acid, trifluoroacetic acid, acetic acid, etc., and, in addition, solvents such as nitromethane, carbon disulfide, sulfolane, etc.

These solvents may be also used as in combination.

Any published methods can be used to dissolve or colloidally disperse dyes in these liquid matrix materials. For example, the following methods can be preferably used: wherein dye is dissolved in organic solvent and water glass; wherein after dye and non-volatile liquid matrix material are dissolved and mixed in a common volatile solvent, the solvent is removed by distillation; wherein after dye is dissolved or dispersed in the monomer of a liquid organic polymeric matrix raw materials, using a solvent if necessary, said monomer is polymerized or polycondensed to form liquid matrix materials. Since it is known that the specific aggregate designated "H aggregate" and "J aggregate" can be formed by aggregating dye elaborating a combination of dye and liquid matrix material as well as the method of processing thereof, dye molecule in liquid matrix materials may be used under the conditions to create such aggregation or association states.

Any published methods can be used to colloidally disperse said various hyperfine particles in liquid matrix materials. For example, the following methods can be preferably used: a method wherein said hyperfine particles are formed in liquid matrix materials; a chemical gas phase growing method; a spattering method; a method wherein hyperfine particles prepared by the gas phase method such as an inert gas evaporation method are trapped in the liquid matrix materials, using a dispersing agent, if necessary.

Photoelements

In the present invention, solid, glassy, or gummy photo-responsive compositions are processed to form photoelements in an appropriate shape prior to use. In this case, said compositions may be used in combination with optical materials such as optical glass, quartz glass, organic glass, etc.

The shape of photoelements used in the present invention, according to the construction of the apparatus of controlling light of the present invention, can be appropriately selected out of thin film, thick film, plate-shape, block-shape, column-shape, semicircular column-shape, square post-shape, triangular post-shape, convex lens-shape, concave lens-shape, microlens alley-shape, fibrous, microchannel alley-shape and optical waveguide-shape. The method of preparing photoelements used in the present invention is arbitrarily selected according to the shape of photoelements and the type of light-responsive composition, and any published methods can be used.

For example, when thin film-shaped photoelements are prepared from dye and solid, glassy or gummy matrix materials, they are coated, for example, on a glass plate by the following coating methods including a method wherein a solution of solid, glassy or gummy matrix material is applied, for example, to a glass plate, a blade-coating method, a roller-coating method, a spin-coating method, a dipping method, a spraying method, etc., or printed on a glass plate by the following printing methods including planographic process, relief printing process, intaglio process, porous planographic process, a screen printing process, transcription printing process, etc. In this case, a method of preparing inorganic matrix materials by the sol-gel transformation method may be used.

For example, when the organic polymeric matrix material is of thermoplasticity, the film photoelement, either thin or thick, can be formed using the hot-pressing method (Japanese Patent Laid-open Publication No. Hei 4-99609) or an elongation method.

When photoelements in the shape of plate, block, column, semicircular column, square pole, triangular pole, convex lens, concave lens or microlens alley are prepared, they can be formed, for example, by the casting method and reaction-injection molding method using the dye dissolved or dispersed in the monomer of organic polymeric matrix raw materials. Also, when organic polymeric matrix materials with the thermo-plasticity are used, pellets or powder wherein the dye is dissolved or dispersed may be melted by heating, and then processed by an injection molding method.

Fibrous photoelements can be formed, for example, by a method for fibrinizing melted and drawn-out quartz glass doped with metal ion, a method for polymerizing the dye dissolved or dispersed in the monomer of organic polymeric matrix raw materials by pouring it into a glass capillary, or sucking up therein by the capillary phenomenon, or a method wherein a column, socalled preform of organic polymeric matrix materials with the dye dissolved or dispersed therein is heated up to the temperature higher than that of glass transformation, drawn and then cooled.

Photoelements of the microchannel alley type may be prepared also by bundling many fibrous photoelements prepared as described above, and, after adhering or welding them, slicing them into thin slices or plates.

Photoelements of the optical waveguide type may be prepared, for example, by a method of pouring the dye dissolved or dispersed in the monomer of organic polymeric matrix raw materials into the grooves made on the substrate and polymerizing them, or a method of etching the thin film photoelements prepared on the substrate to form a "core" pattern, and then making a "clad" with matrix materials containing no dye.

In the present invention can be used a single-structured photoelement wherein means for converging said control light and said signal light, and/or means for differentiating and extracting the bundle of rays of signal light in the region which have undergone the profound modulation of said photointencity and/or said luminous flux density out of the bundle of rays of the signal light diverging after transmitting said photo-responsive composition, and/or a means for separating a mixture of signal light and control light transmitting said photo-responsive composition into the component signal light and control light are incorporated in said photoelement.

Photocells

In the present invention, when said photo-responsive composition is liquid, photocells filled in with said liquid photo-responsive composition are used as photoelements.

Photocells used in the present invention are to comprise a function of retaining liquid photo-responsive composition, and the function effectively to give a certain shape to the liquid photo-responsive composition, frrthermore, the function to receive the converged and illuminated signal light and control light and propagate said signal light and said control light to said photo-responsive composition, and the function to propagate and radiate said diverging signal light after its transmittance through said photo-responsive composition.

The shape of photocells used in the present invention can be roughly divided into their external and internal shapes.

The external shapes of photocells are used, according to the construction of the apparatus of controlling light of the present invention, in the shape of plate, cube, rectangular parallelepiped, circular column, semicircular column, square pole, triangular pole, etc.

The internal shape of photocells is namely in the shape of cavity for filling up photo-responsive composition, efficiently endowing the liquid photo-responsive composition with a certain shape. Specifically, the internal shape of the photocells is, according to the apparatus of controlling light of the present invention, appropriately selected, for example, out of thin film, thick film, plate-shape, column-shape, semicircular column-shape, square pole-shape, triangular pole-shape, convex lens-shape, concave lens-shape, etc.

The construction and materials of photocells can be arbitrarily selected so far as they fulfil the following conditions:

1. they can precisely maintain the external and internal shapes described above under the conditions used;
2. they are inert to the photo-responsive composition,
3. they can prevent changes in the composition due to the discharge, transmission and permeation of constituents composed of the photo-responsive composition, and
4. they can prevent the deterioration of photo-responsive composition due to its reaction with oxygen and water present in the experimental environment.

In addition, of the above-described conditions, the function to prevent the constituent change and deterioration of the photo-responsive composition is sufficient if it is manifested within the range of designing life span as the photoelement.

Dyes

In the present invention, the dye used may be any known dye.

As the practical example of dyes usable in the present invention, for example, the following dyes are preferably employed: xanthene dyes such as rhodamine B, rhodamine 6G, eosin, phloxine B, etc., acrydine dyes such as acrydine orange, acrydine red, etc., azo dye such as ethyl red, methyl red, etc., porphyrin dyes, phthalocyanine compounds, cyanine dyes such as 3,3-diethylthiacarbocyanine iodide, 3,3-diethyloxadicarbocyanine iodide, etc., triarylmethane dyes such as brilliant green, victoria blue-R, etc.

In the present invention, these dyes can be used singly or in a combination of more than two kinds thereof.

Triarylmethane Dyes

In the present invention, as the triarylmethane dyes represented by the above-described Formulas 1 or 2 can be used any known ones.

Structures of the abovedescribed triarylmethane dyes are shown in FIGS. 1 through 5. Also, these chemical formulas are to describe one of the ultimate structural formulas representing the exemplified dyes, respectively. For example, in the case of the dye represented by the following Formula 12 (common name, brilliant green), plural ultimate structural formulas can be described as shown in the following Formula 13.

(Formula 12)

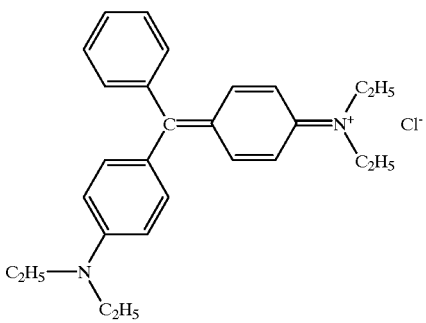

(Formula 13)

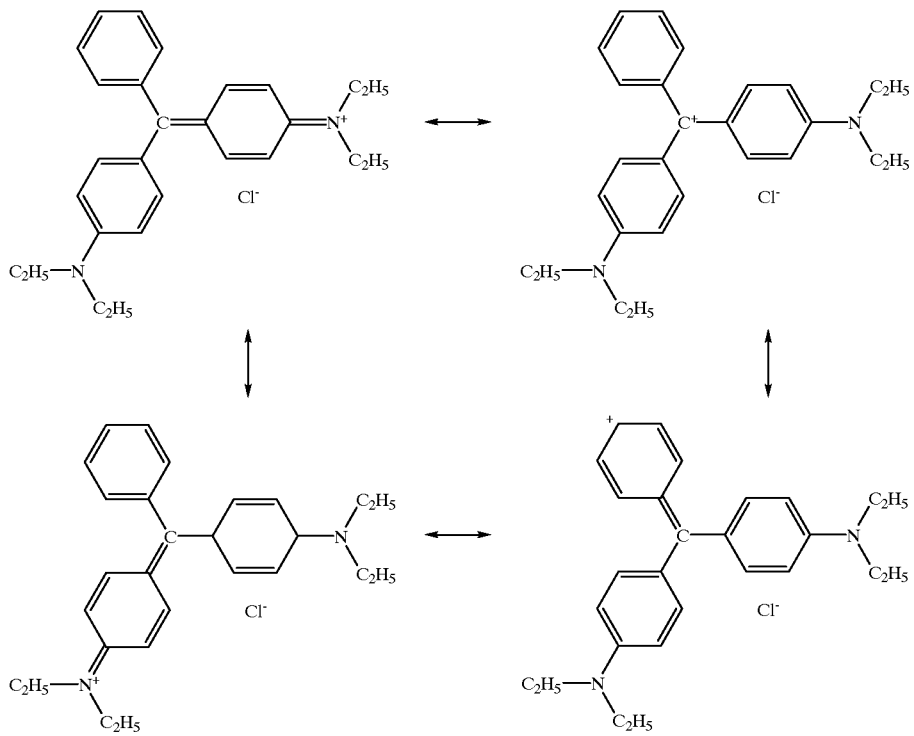

Although these dyes are exemplified by the case wherein the anionic moiety is chloride ion (Cl⁻), the chloride ion may be replaced with bromide ion (Br⁻), iodide ion (I⁻), perchlorate ion (ClO$_4^-$), tetrafluorborate ion (BF$_4$), hexafluorophosphorate ion (PF$_6^-$) sulfate ion (SO$_4^{2-}$), hydrogensulfate ion (HSO$_4^-$), p-toluenesulfonate ion (CH$_3$C$_6$H$_4$SO$_3^-$), benzenesulfonate ion (C$_6$H$_5$SO$_3^-$), methianesulfonate ion (CH$_3$SO$_3^-$), trifluoromethanesulfonate ion (CF$_3$SO$_3^-$), acetate ion (CH$_3$COO⁻), trichloroacetate ion (CCl$_3$COO⁻), or trifluoroacetate ion (CF$_3$COO⁻), etc.

Also, these dyes may comprise a mixture of plural kinds of anions, form double salt with metal salt such as zinc chloride (ZnCl$_2$, etc., or form a complex with salts of polyvalent metals such as chromium, etc.

Furthermore, the anionic moiety may be in the form of carboxylic acid group or sulfonate group binding to the triarylmethane dye as the substituent to form an intramolecular salt, or may bind to polymeric matrix materials.

Polymethine Dyes

In the present invention, any known polymethine dyes represented by the above-described Formula 3 can be used.

Examples of the above-described polymethine dyes are shown in the chemical formulas FIGS. 6 through 15. Although these dyes are exemplified by the case wherein the anionic moiety is iodide ion (I⁻), the iodide ion may be replaced with various ions such as chloride ion (Cl⁻), bromide ion (Br⁻), perchlorate ion (ClO$_4^-$), tetrafluorborate ion (BF$_4^-$), hexafluorophosphorate ion (PF$_6^-$), sulfate ion (SO$_4^{2-}$), hydrogensulfate ion (HSO$_4^-$), p-toluenesulfonate ion (CH$_3$C$_6$H$_4$SO$_3^-$), benzenesulfonate ion (C$_6$H$_5$SO$_3^-$), methanesulfonate ion (CH$_3$SO$_3^-$), trifluoromethanesulfonate ion (CF$_3$SO$_3^-$), acetate ion (CH$_3$COO⁻), trichloroacetate ion (CCl$_3$COO⁻), or trifluoroacetate ion (CF$_3$COO⁻), etc.

Also, these dyes may comprise a mixture of plurality of anion types.

Furthermore, the anionic moiety may be in the form of carboxylic acid group or sulfonate group binding to the polymethine dye as the substituent to form an intramolecular salt, or may bind to polymeric matrix materials.

Phthalocyanine Compounds

In the present invention, any known phthalocyanine compounds represented by the above-described Formulas 4 through 11 can be used.

The above-described phthalocyanine compounds are exemplified by chemical structures shown in FIGS. 16 through 30.

DETAILED DESCRIPTION OF PREFERRED EMBODIMENTS

In the following, preferred embodiments of the present invention will be described with reference to the drawings.

EMBODIMENT 1

Figure 31:
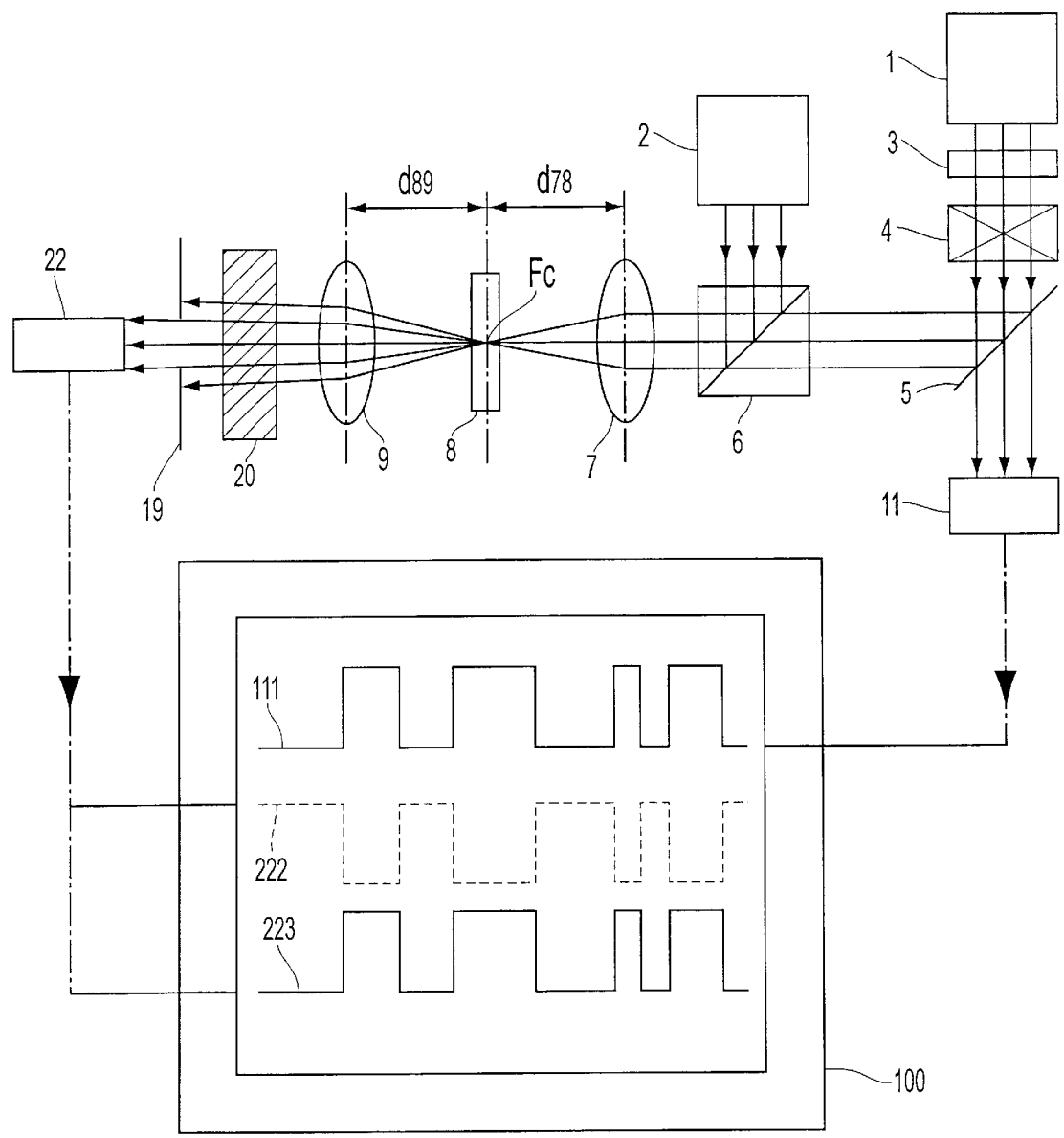
FIG. 31 is a block diagram showing the configuration of the first embodiment of the apparatus used for carrying out the present invention.

In FIG. 31 is shown a schematic configuration of an apparatus of controlling light according to a first embodiment. In addition to the case wherein a film photoelement 8 is used as shown in FIG. 31, such configuration and layout of the apparatus of controlling light 1 can be preferably employed also in the cases wherein a fibrous photoelement (not shown in the figure) is used, wherein a photocell of the optical waveguide type is used, wherein a photocell of the microchannel alley type (not shown in the figure) is used, and also wherein a photocell filled in with the liquid light-responsive composition is used.

Herein, the film photoelement 8 can be prepared, for example, by the following processes. In an experimental example, as the phthalocyanine compound, a mixture of four kinds of tetra(tert-butyl)oxyvanadium phthalocyanine (2,6, 10,14-, 2,6,10,15-, 2,6,11,15-, and 2,7,10,15-substituted derivatives) represented by the following Formula 14 (6.81 mg) and benzyl polymetacrylate (1993.2 mg) were dissolved in tetrahydrofuran (200 ml), and poured into

[Formula 14]

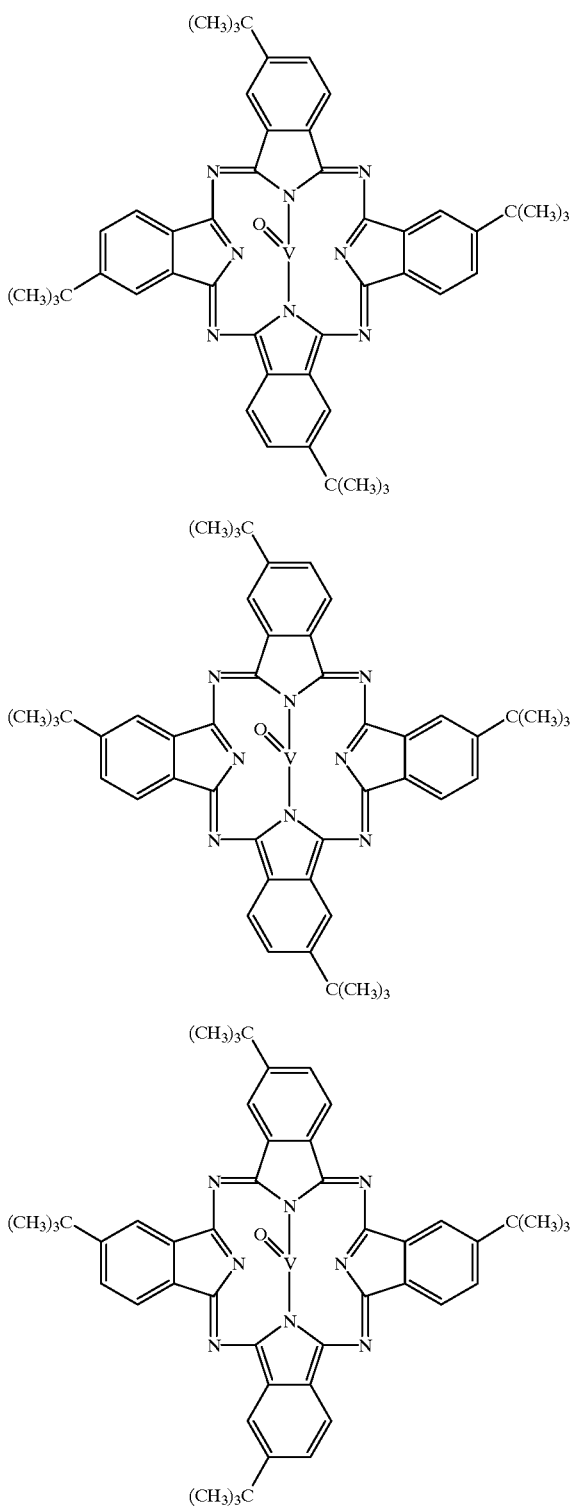

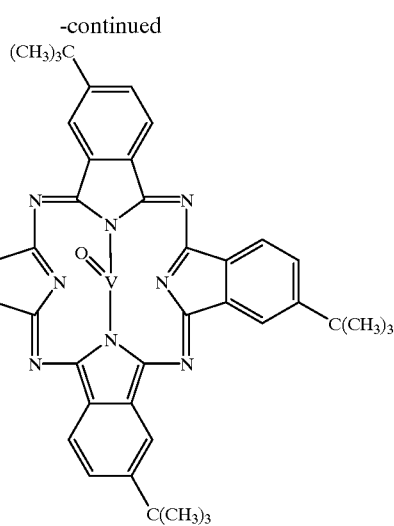

water (1,000 ml) while stirring. Precipitates (a mixture of phthalocyanine compound and polymer) formed were collected by filtration, washed with water, dried in vacuo, and then pulverized. By beating the mixed powder of phthalocyanine compound and polymer thus obtained continuously under ultra-high vacuum less than $10^{-5}$ Pa at 40° C. for 2 days, the volatile fraction such as the remaining solvent, etc. was completely removed to obtain powders of the photoresponsive composition. This powder (20 mg) was placed between a slide glass (25 mm×76 mm×1.150 mm thick) and a cover glass (18 mm×18 mm×0.150 mm), heated at 150° C. in vacuo, and a thin film of phthalocyanine compound/polymer (50 μm thick) was formed between said slide glass/said cover glass using a method of pressing and adhering two glass plates (vacuum hot pressing method). The concentration of phthalocyanine in the film of phthalocyanine compound/polymer is calculated to be $5.0×10^{-3}$ mol/l with the density of phthalocyanine compound/polymer being taken as 1.18.

Figure 32:
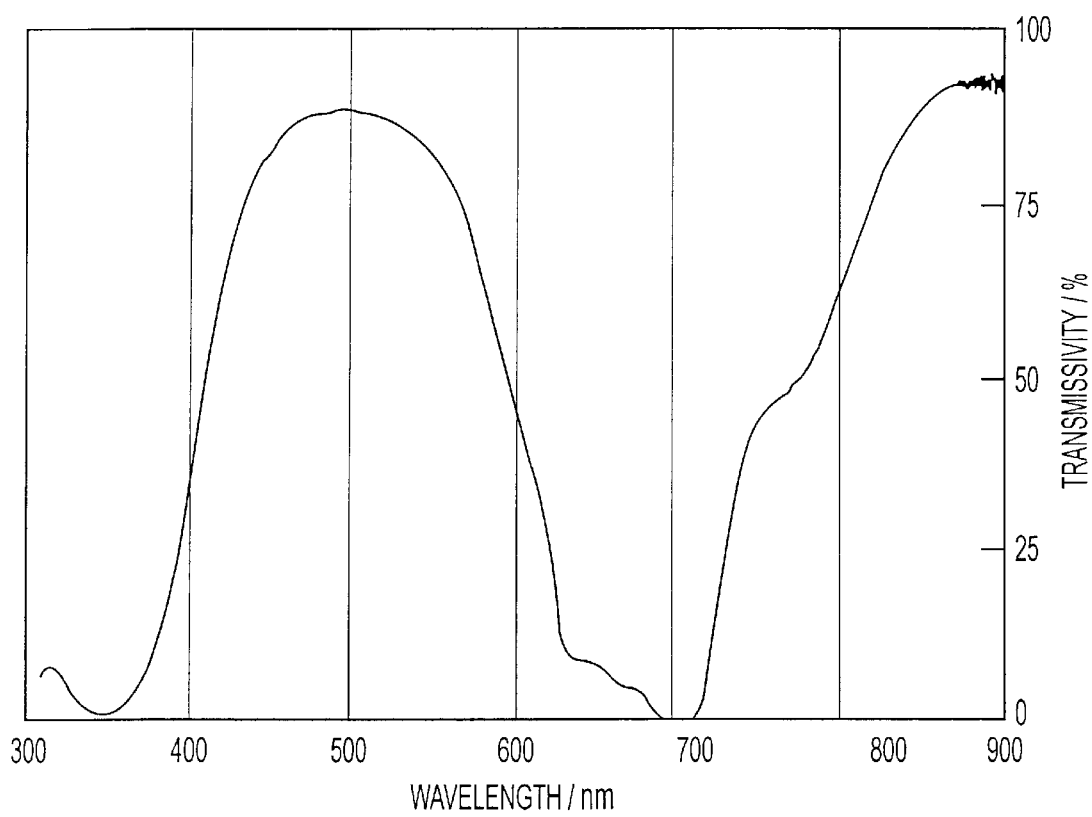
FIG. 32 is a drawing showing the transmittance spectrum of the film photo-element of the first embodiment.

The transmittance spectrum of the filmy optical element thus prepared is shown in FIG. 32. The transmittance of this film was 8.8% for the wavelength (633 nm) of the control light, and 84% for the wavelength (830 nm) of the signal light.

The apparatus of controlling light the schematic diagram of which is shown in FIG. 31 comprises a light source of control light 1, a light source of signal light 2, an ND filter 3, a shutter 4, a semitransparent mirror 5, an optical mixer 6, a converging lens 7, a film photoelement 8, a collimate lens 9, a band-pass filter 20, an aperture stop 19, photodetectors 11 and 22, and an oscilloscope 100. Of these optical elements and optical components, the light source of control light 1, the light source of signal light 2, the optical mixer 6, the converging lens 7, the film photoelement 8, the collimate lens 9, and the band-pass filter 20 are the essential apparatus construction elements for performing the method of controlling light of the present invention with the configuration of apparatus shown in FIG. 31. Herein, the ND filter 3, the shutter 4, the semitransparent nirror 5 and the aperture stop 19 are equipped whenever they are necessary. In addition, although the photodetectors 11 and 22, and the oscilloscope 100 are not necessarily required for performing the method of controlling light in accordance with the present invention, they are employed as the electronic device to confirm the light-controlling operation whenever necessary.

Next, characteristics and actions of each component will be described.

As the light source of control light 1, a laser apparatus is preferably used. Its wavelength and power are appropriately selected according to the wavelength of signal light which is the object of the light-controlling method of the present invention and the responding characteristics of the photo-responsive composition used therein. There are no particular restrictions on the method of laser oscillation, and any apparatus of arbitrary type may be used according to the band region of oscillation wavelength, power, and cost. Also, the light from the laser light source may be used after its wavelength is modulated by a nonlinear photoelement. More specifically, gas lasers such as argon ion laser (oscillation wavelength 457.9 to 514.5 nm), helium-neon laser (633 nm), etc., solid laser such as ruby laser and Nd:YAG laser, dye laser, semiconductor laser, etc. can be preferably used. As the light source of signal light 2 can be used not only the coherent light but also the non-conherent light. Furthermore, in addition to the light source emitting the monochromatic light such as laser apparatus, light emitting diode, neon discharge tube, etc., the continuous spectral light from tungsten electric bulb, metal halide bulb, xenon discharge tube, etc. may be used after the wavelength thereof is selected with optical filter or monochromator.

The photoresponsive composition, wavelength band region of signal light, and wavelength band region of control light are, as a combination thereof, selected as the suitable combination according to the purpose of the use, and employed. In the following is described an embodiment wherein a combination of a semiconductor laser (Gaussian beam having the oscillation wavelength 830 nm, continuous oscillation output 5 mW and about 8 mm in diameter after the beam shaping) used as the light source of signal light 2, a helium-neon laser (Gaussian beam having the oscillation wavelength 633 nm and 2 mm in diameter) used as the light source of control light 1 and the film photoelements 8 composed of the above-described photo-responsive composition is employed.

Although the ND filter 3 is not necessarily required, it is useful to prevent the incidence of unnecessarily high powered laser beam into the optical components and photoelements constructing the apparatus and to increase/decrease the photointensity of control light for testing the photoresponding capability of photoelements used in the present invention. In this embodiment, several kinds of ND filters were exchanged to use for the latter purpose.

The shutter 4 is to be used to turn on and off the continuous oscillation laser pulsewise when it is used as the control light, and not an essential component of the apparatus for performing the method of controlling light of the present invention. That is, the shutter 4 may not be equipped when the light source of control light 1 is a pulse-oscillation laser and of a type its pulse width and oscillation interval of which can be regulated, and when the laser beam which has been previously pulse-modulated by a suitable means is used as the light source 1.

When the shutter 4 is used, one of any arbitrary type can be employed. For example, optical chopper, mechanical shutter, liquid crystal shutter, light Kerr-effect shutter, Pochels cell, acoustoptic (AO) modulator, etc. can be suitably selected and used considering the action speed of the shutter itself.

The semitransparent mirror S is to be used to constantly estimate the photointencity of the control light for testing the action of the method of controlling light of the present invention in this embodiment, and the optical division ratio can be arbitrarily set up. The photodetectors 11 and 22 are used for electrically detecting and inspecting the mode of modulation of the optical intensity by the light-light-control of the present invention, and testing the function of photoelements of the present invention. The photodetectors 11 and 22 are of any arbitrary type, can be appropriately selected and used considering the responding speed of the detector itself, and, for example, a photoelectron multiplier, photodiode, phototransistor, etc. can be used.

The detected light signal of said photodetectors 11 and 22 can be monitored by a combination of A/D converter and a computer (not shown in the figure), in addition to the oscilloscope 100.

The optical mixer 6 is to be used to regulate the optical paths of control light and signal light propagating in said photoelement, and one of the important elements of apparatus for operating the method and apparatus of controlling light of the present invention. Any one of a polarization beam splitter, non-polarized beam splitter, or dichroic mirror can be used, and the optical division ratio can be arbitrarily set.

The converging lens 7, as a common means of converging the signal light and control light, is for converging the signal light and control light the optical paths of which are adjusted to become the same and illuminate them to said photoelement, and one of the essential apparatus construction elements for performing the method and apparatus of controlling light of the present invention. Any lens with arbitrary specifications as to their focal length, numerical, aperture, F-value, lens construction, lens surface coating, etc. can be used.

In this embodiment, the converging lens 7 may be used a microscope objective of 40 magnifications, 5 mm focal length and 0.65 numerical aperture.

The collimate lens 9 is a means of converting back the signal light and control light which have been converged, illuminated to the film photoelement 8, and transmitted said element to the parallel and/or converged beam, and can differentiate and extract the signal light which has undergone a sufficient high modulation of the photointencity and/or the luminous flux density by the change in the emitting angle of convergence or divergene of the outgoing beam from the film photoelement 8 with a good reproducibility. In this embodiment, as the collimate lens 9 may be used, for example, a microscope lens of 20 magnifications with an numerical aperture value 0.4. That is, it becomes possible to differentiate and extract, out of the bundle of rays of the signal light, those in the range which have undergone a profound modulation of the photointencity and/or the luminous flux density by making the numerical aperture of the collimate lens 9 smaller than that of the converging lens 7, and detect the signal light which has undergone a sufficiently large modulation with a good reproducibility. Needless to say, it is also preferable to insert the aperture stop 19 even though the numerical aperture value is large, or make essentially the numerical aperture value smaller by projecting only the central portion of the luminous flux to the photodetector 22. Also, it is possible to use a concave mirror in place of the converging lens 7 and the collimate lens 9 (see Embodiment 4).

Figure 1:
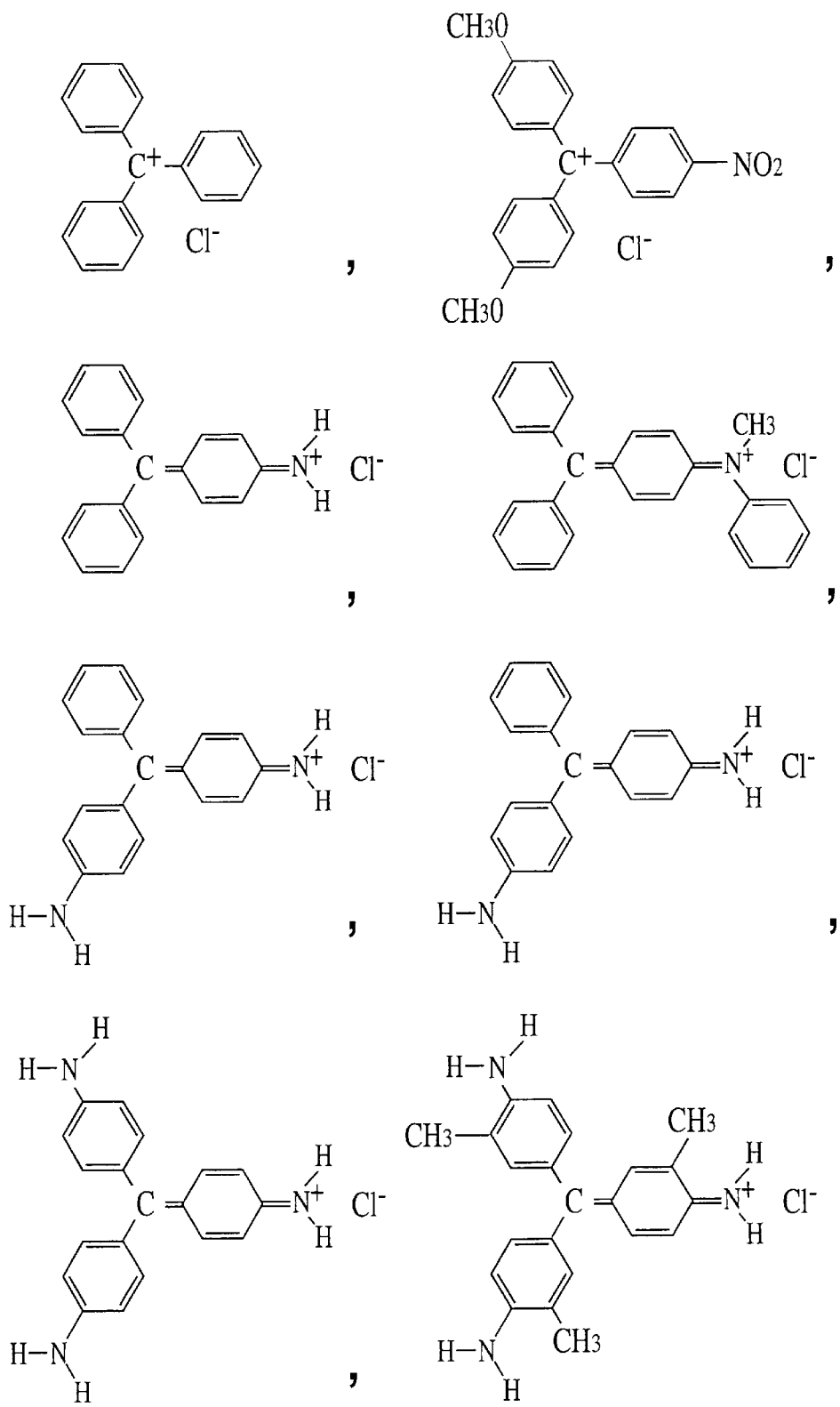
FIG. 1 is a drawing exemplifying the structure of triarylmethane dye used in the present invention.
Figure 2:
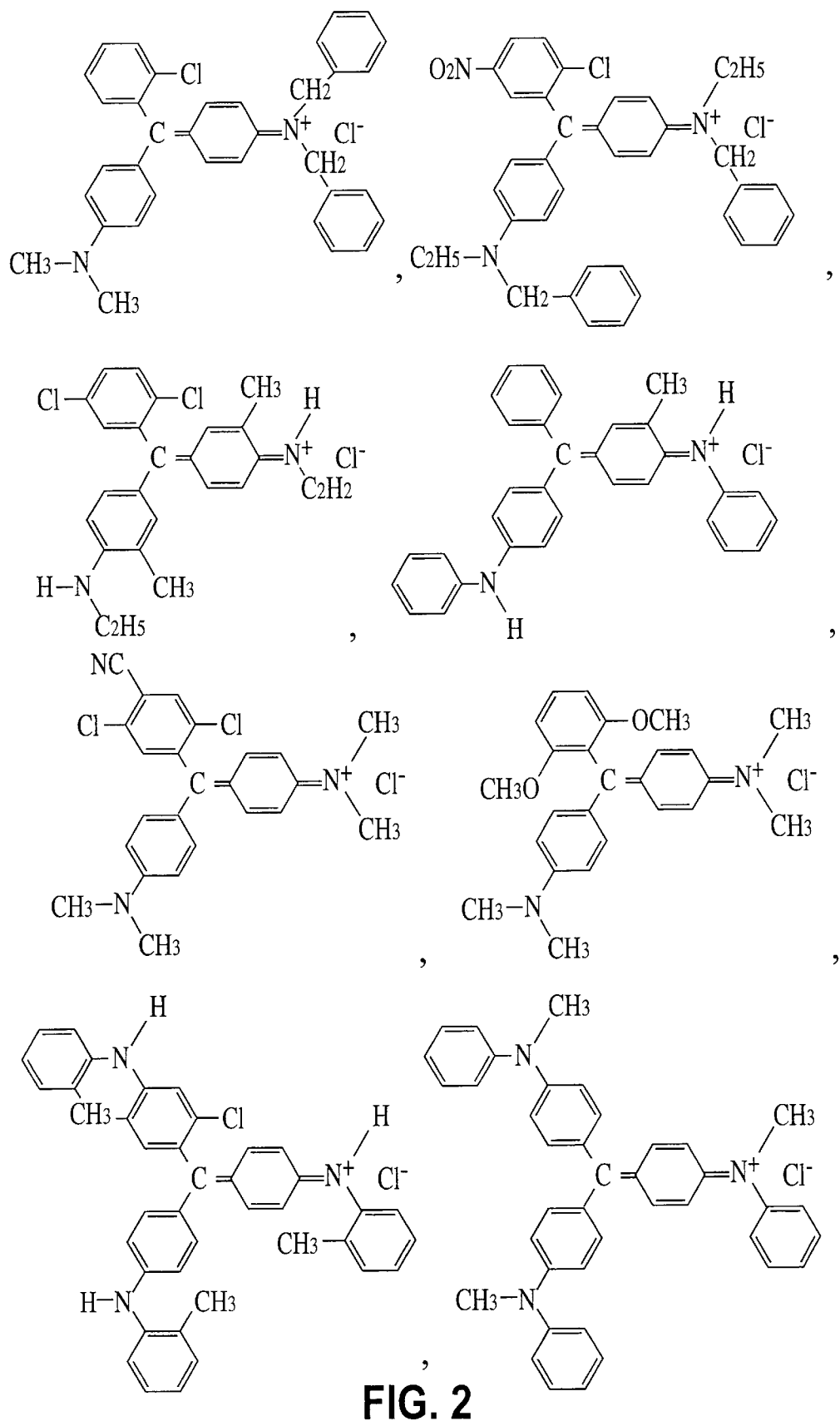
FIG. 2 is a drawing exemplifying the structure of triarylmethane dye used in the present invention.
Figure 3:
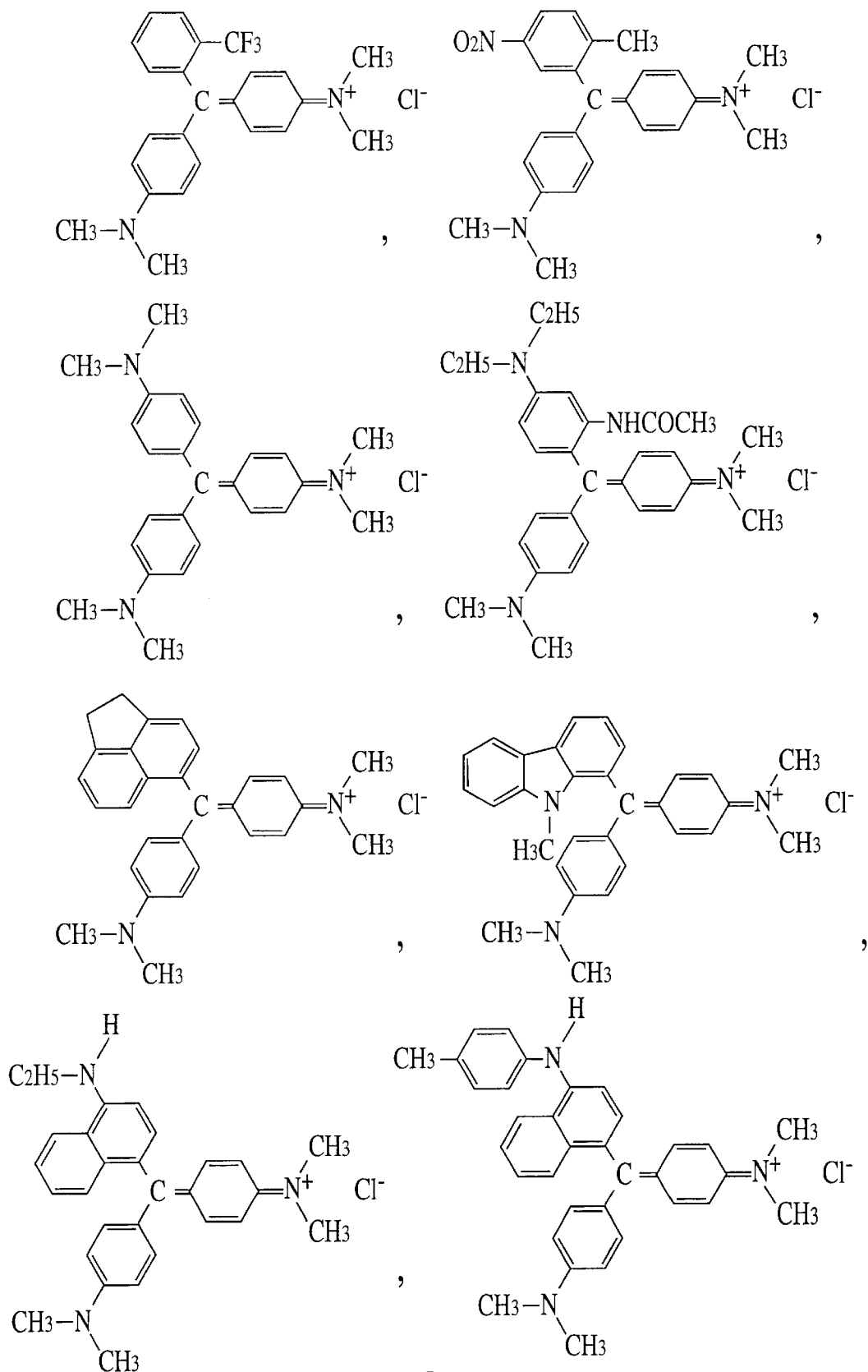
FIG. 3 is a drawing exemplifying the structure of triarylmethane dye used in the present invention.
Figure 4:
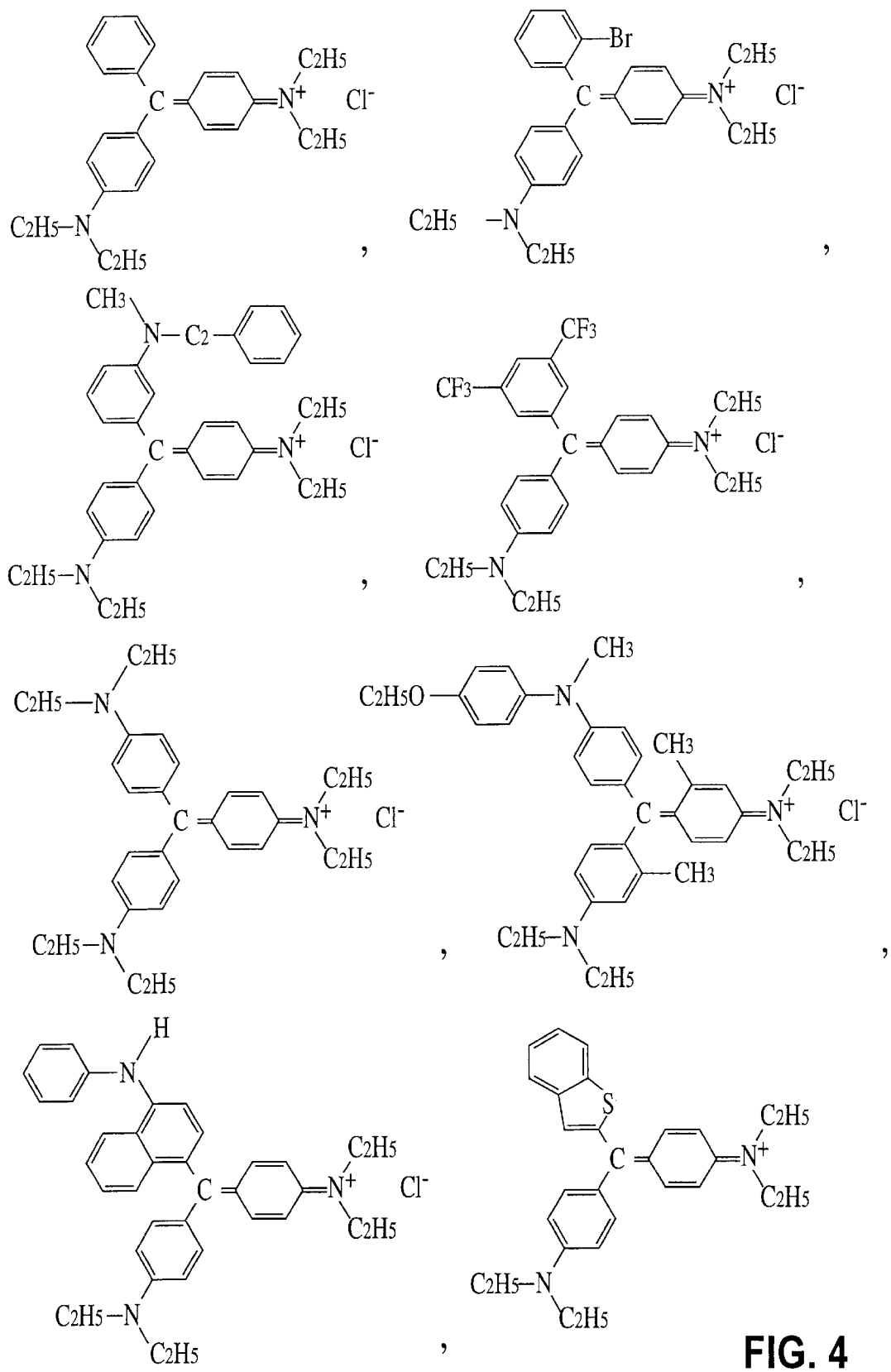
FIG. 4 is a drawing exemplifying the structure of triarylmethane dye used in the present invention.
Figure 5:
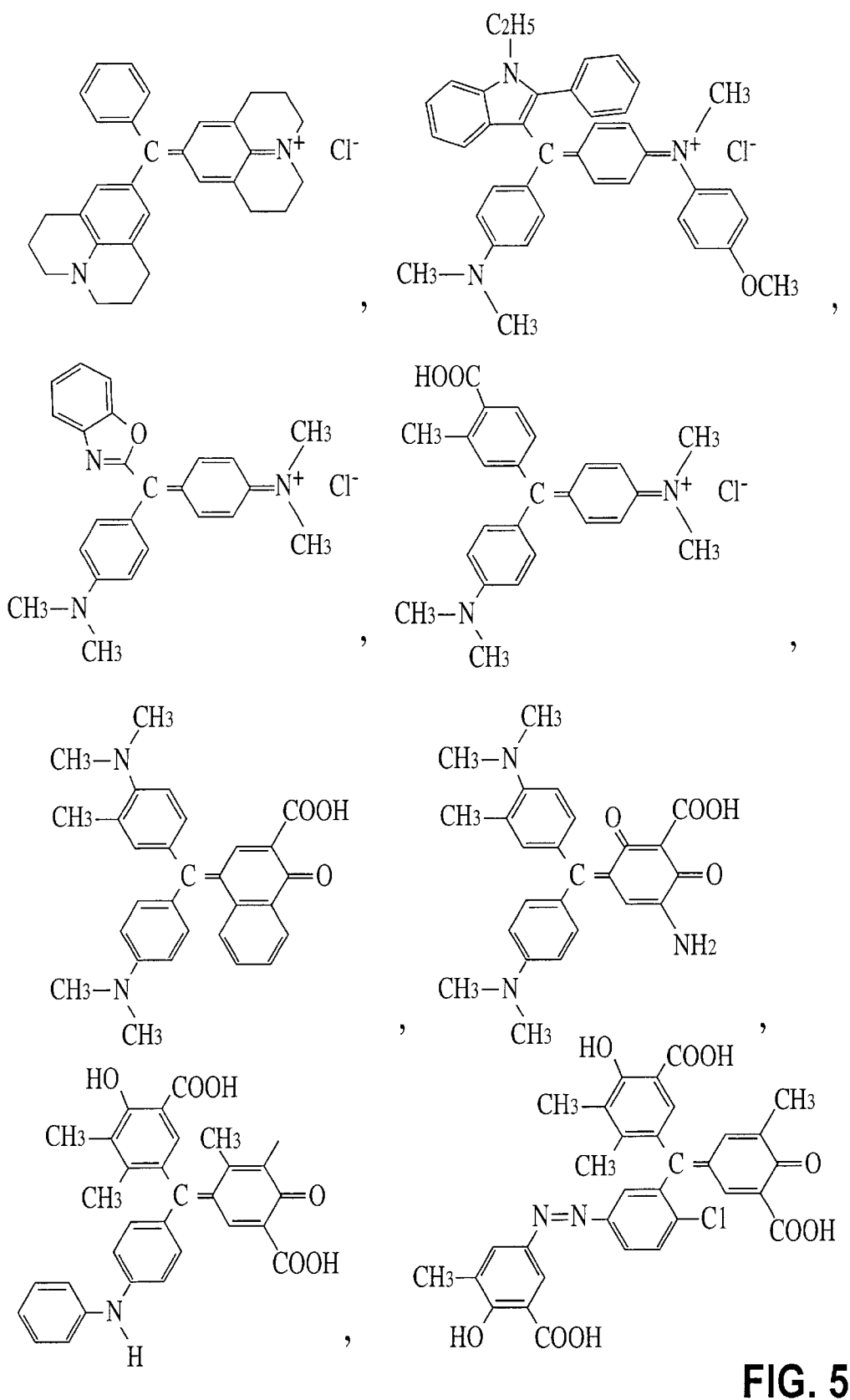
FIG. 5 is a drawing exemplifying the structure of triarylmethane dye used in the present invention.
Figure 6:
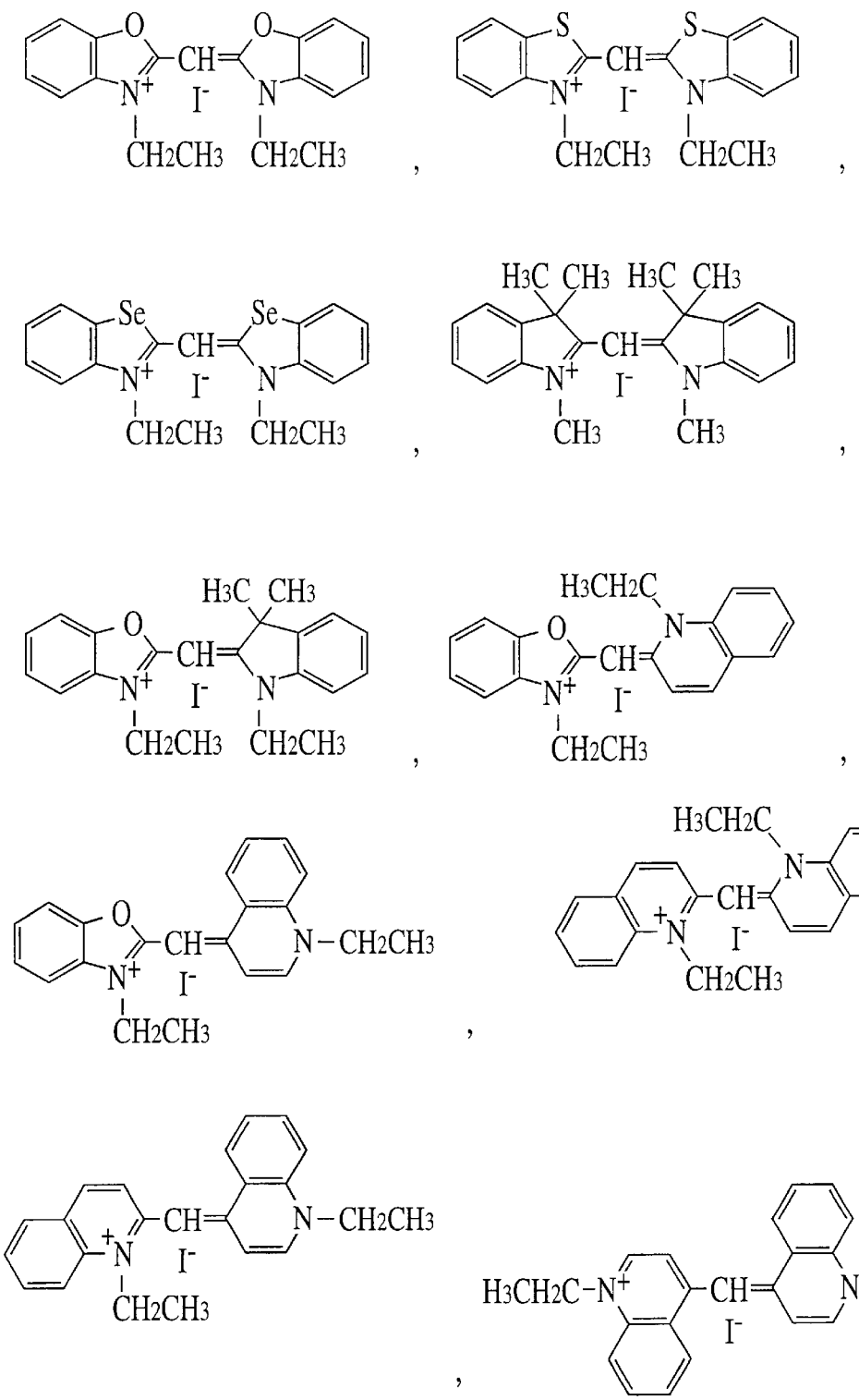
FIG. 6 is a drawing exemplifying the structure of polymethine dye used in the present invention.
Figure 7:
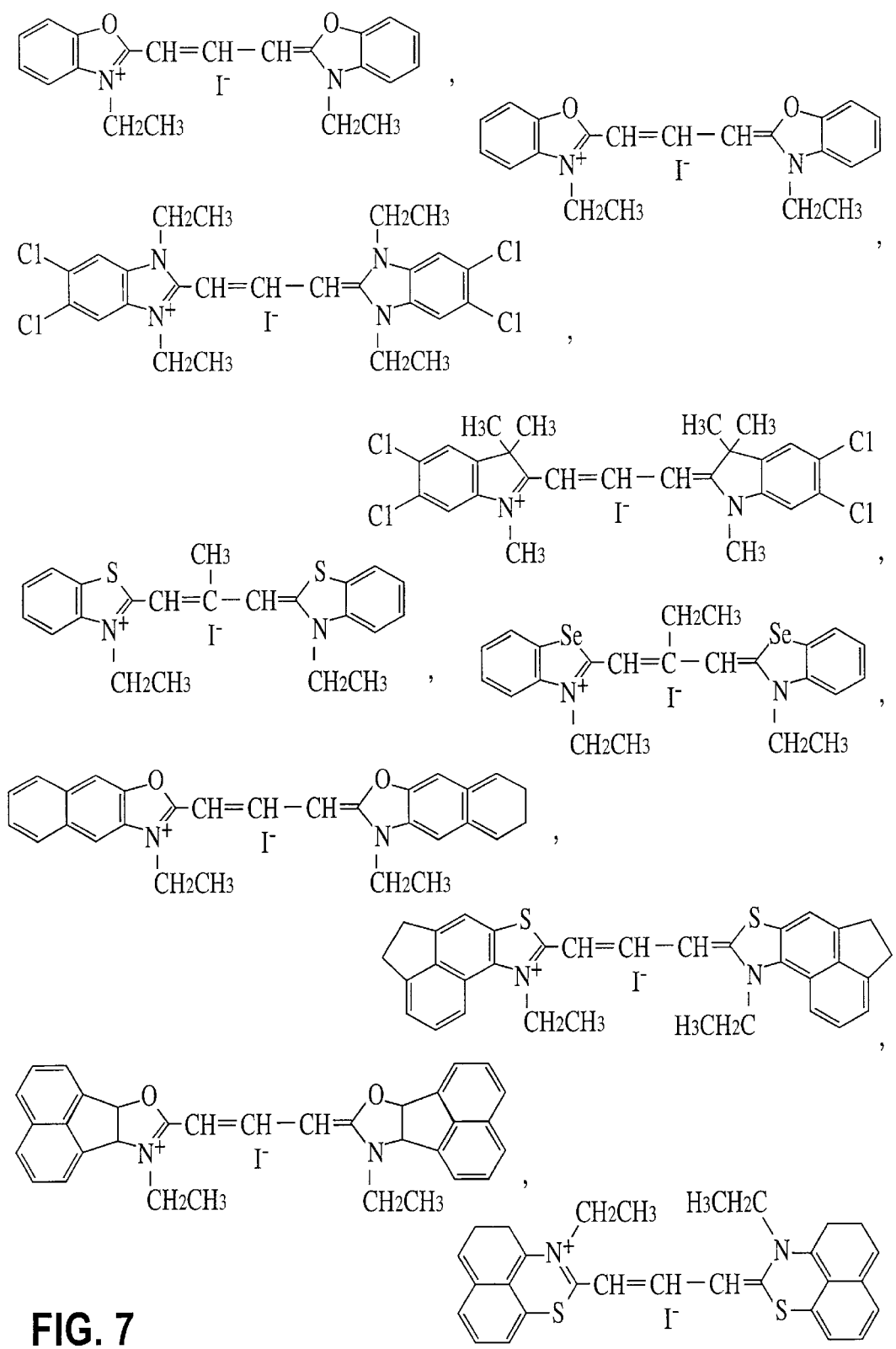
FIG. 7 is a drawing exemplifying the structure of polymethine dye used in the present invention.
Figure 8:
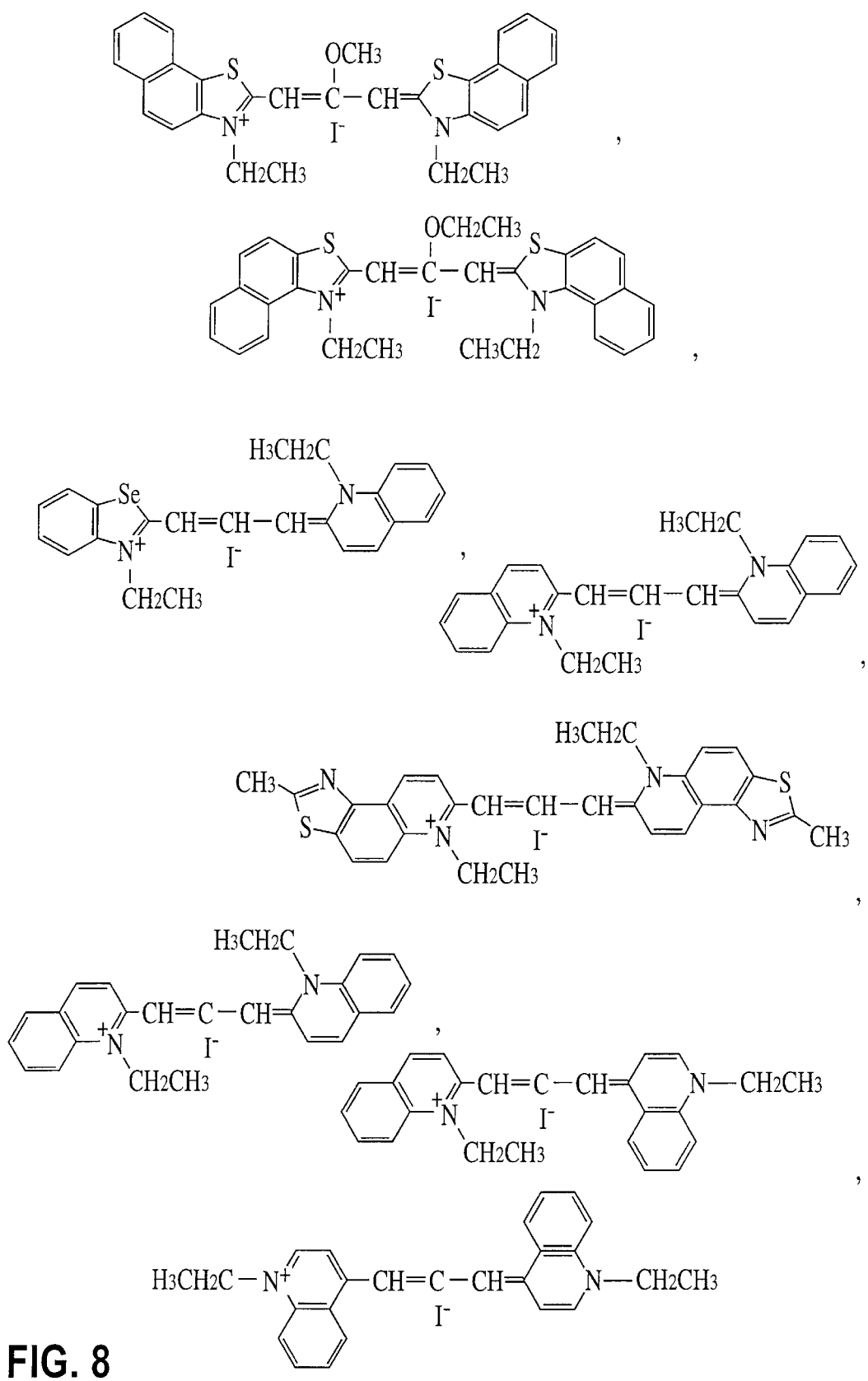
FIG. 8 is a drawing exemplifying the structure of polymethine dye used in the present invention.
Figure 9:
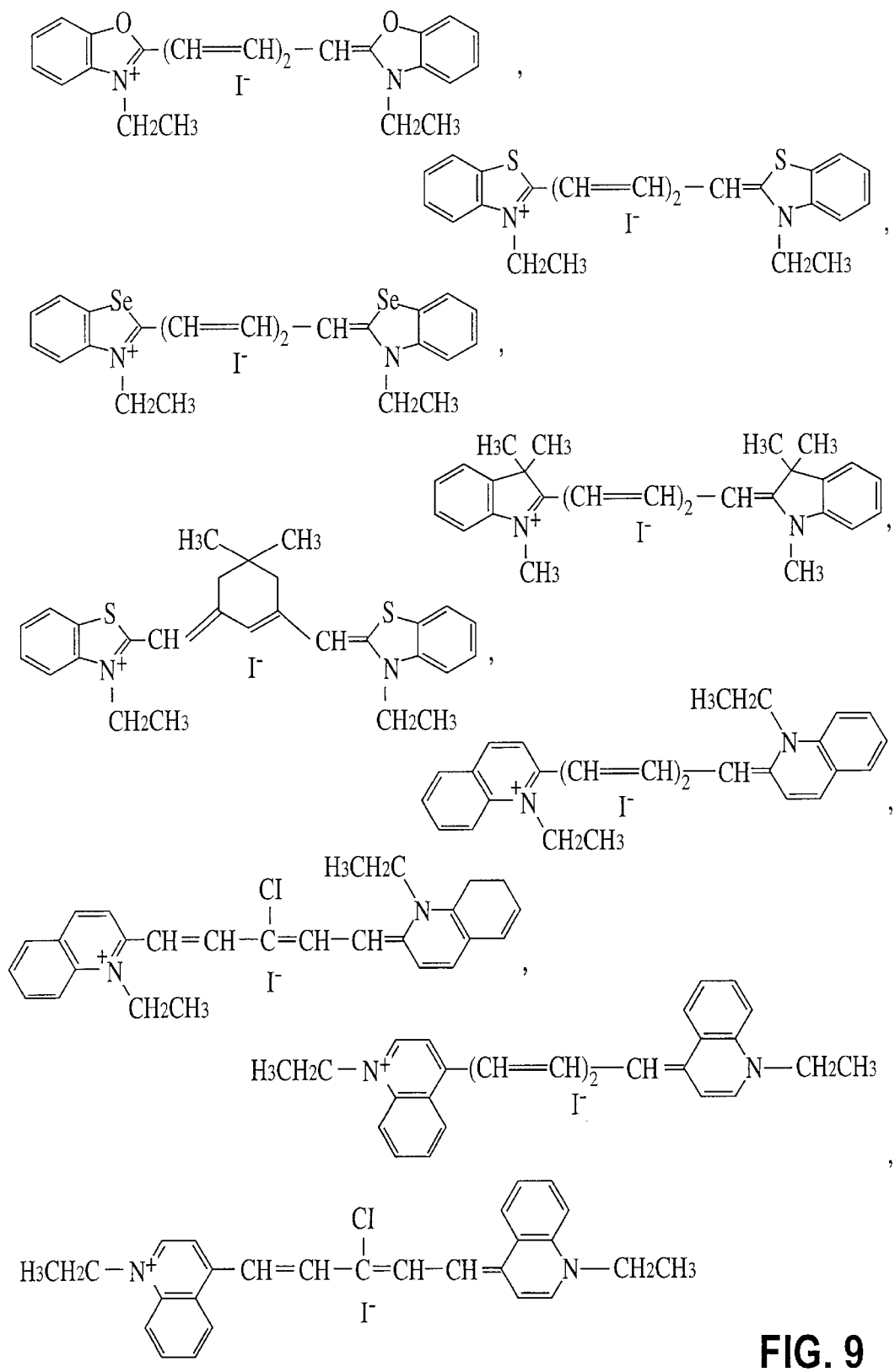
FIG. 9 is a drawing exemplifying the structure of polymethine dye used in the present invention.
Figure 10:
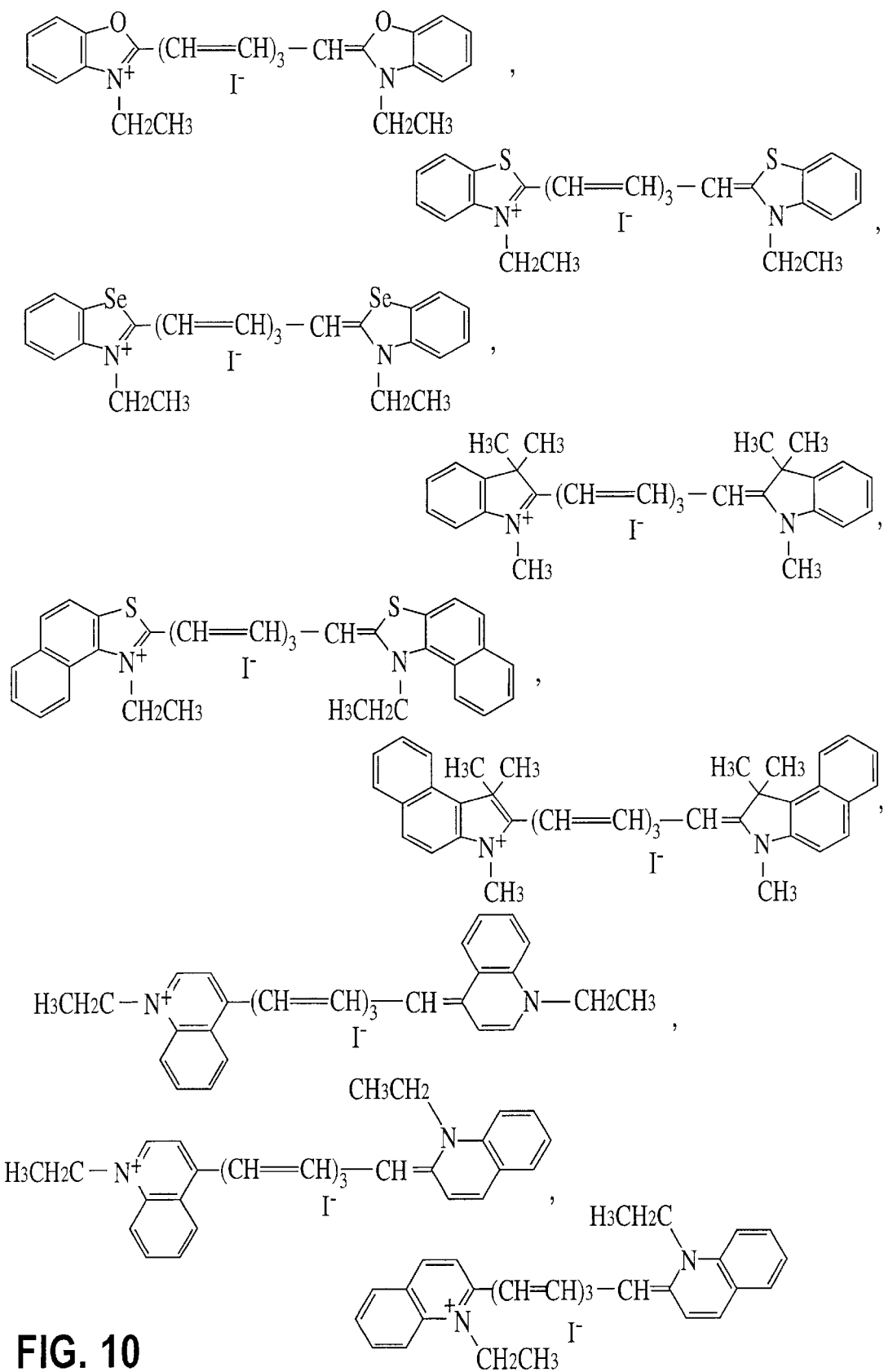
FIG. 10 is a drawing exemplifying the structure of polymethine dye used in the present invention.
Figure 11:
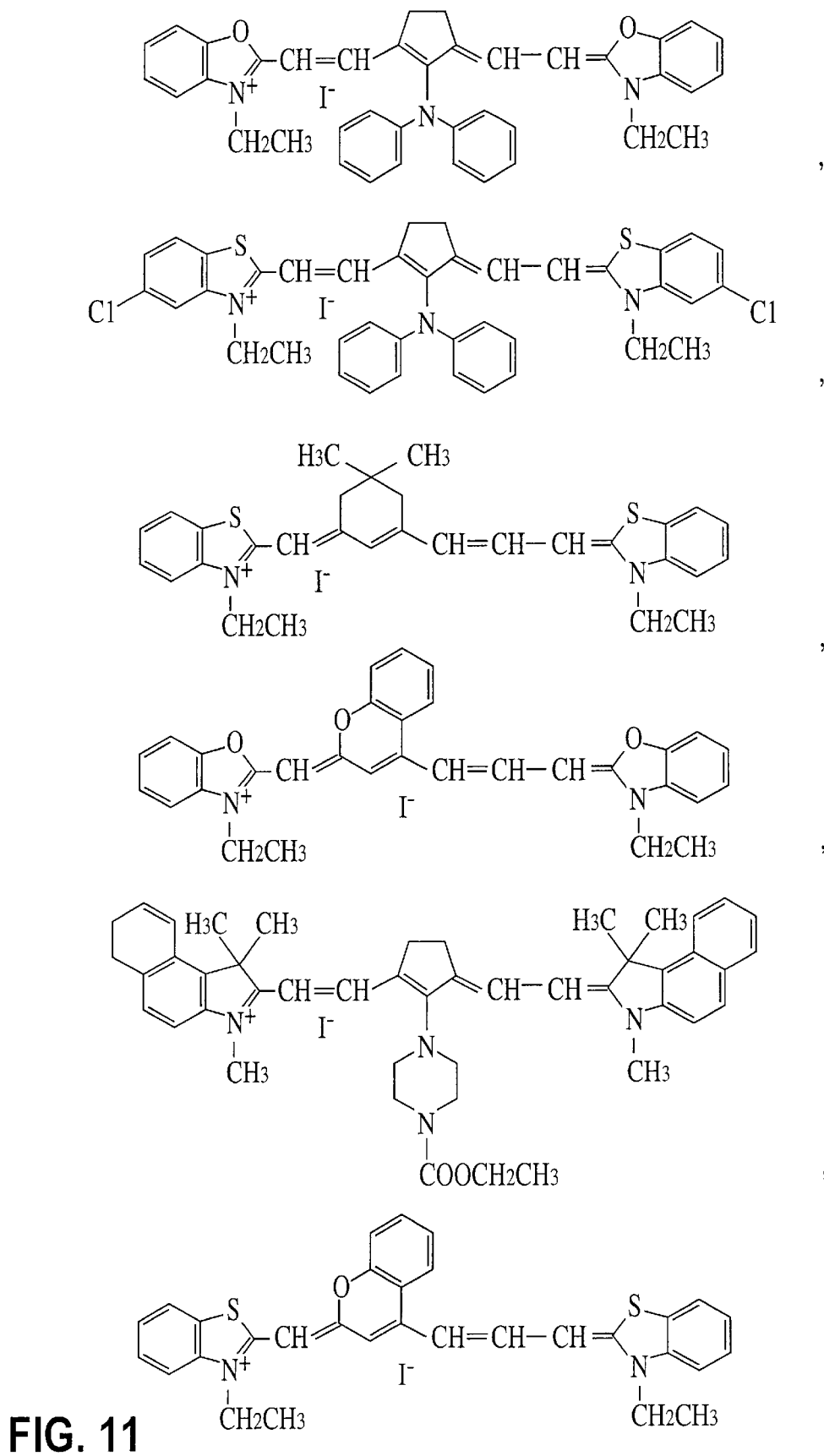
FIG. 11 is a drawing exemplifying the structure of polymethine dye used in the present invention.
Figure 12:
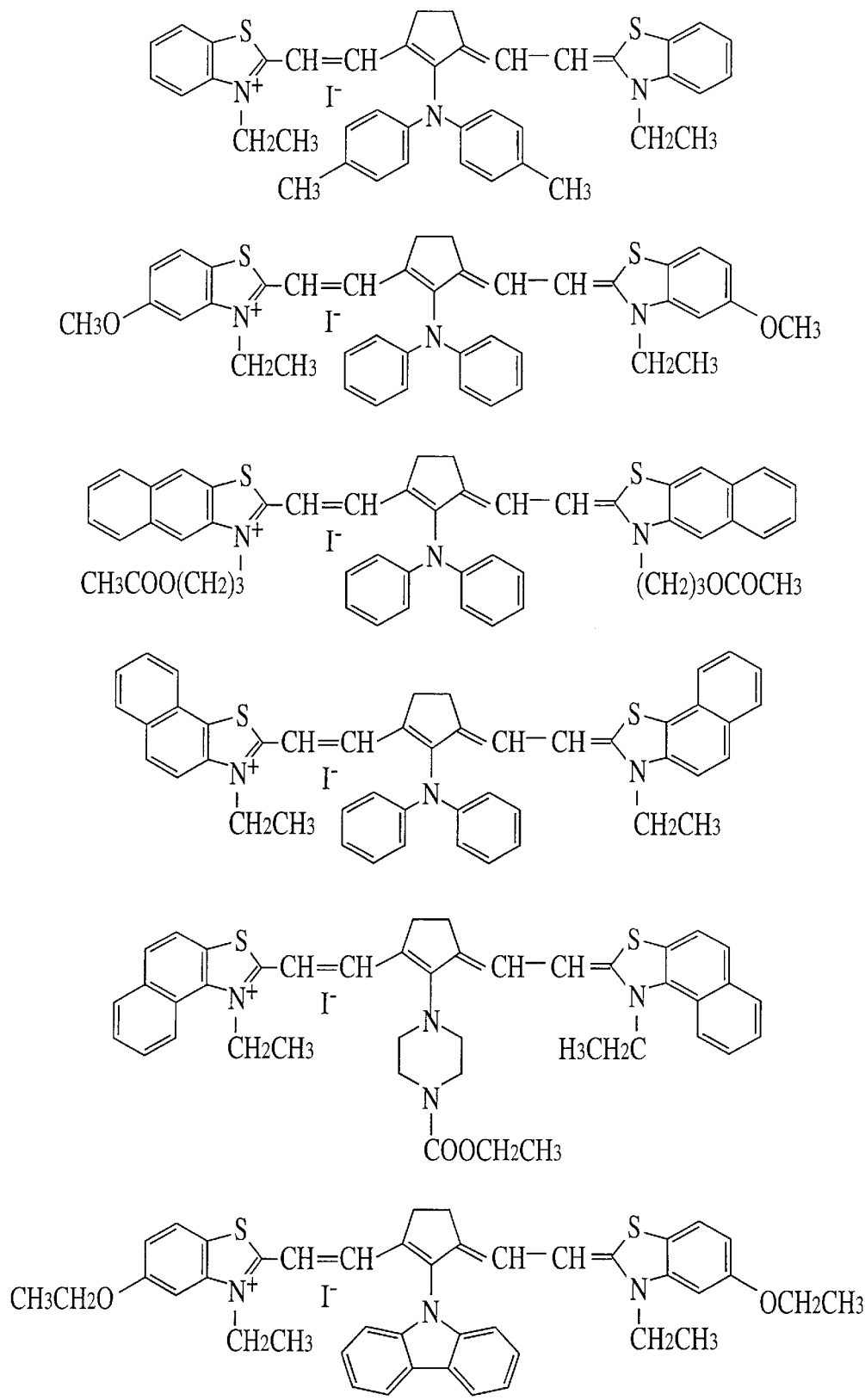
FIG. 12 is a drawing exemplifying the structure of polymethine dye used in the present invention.
Figure 13:
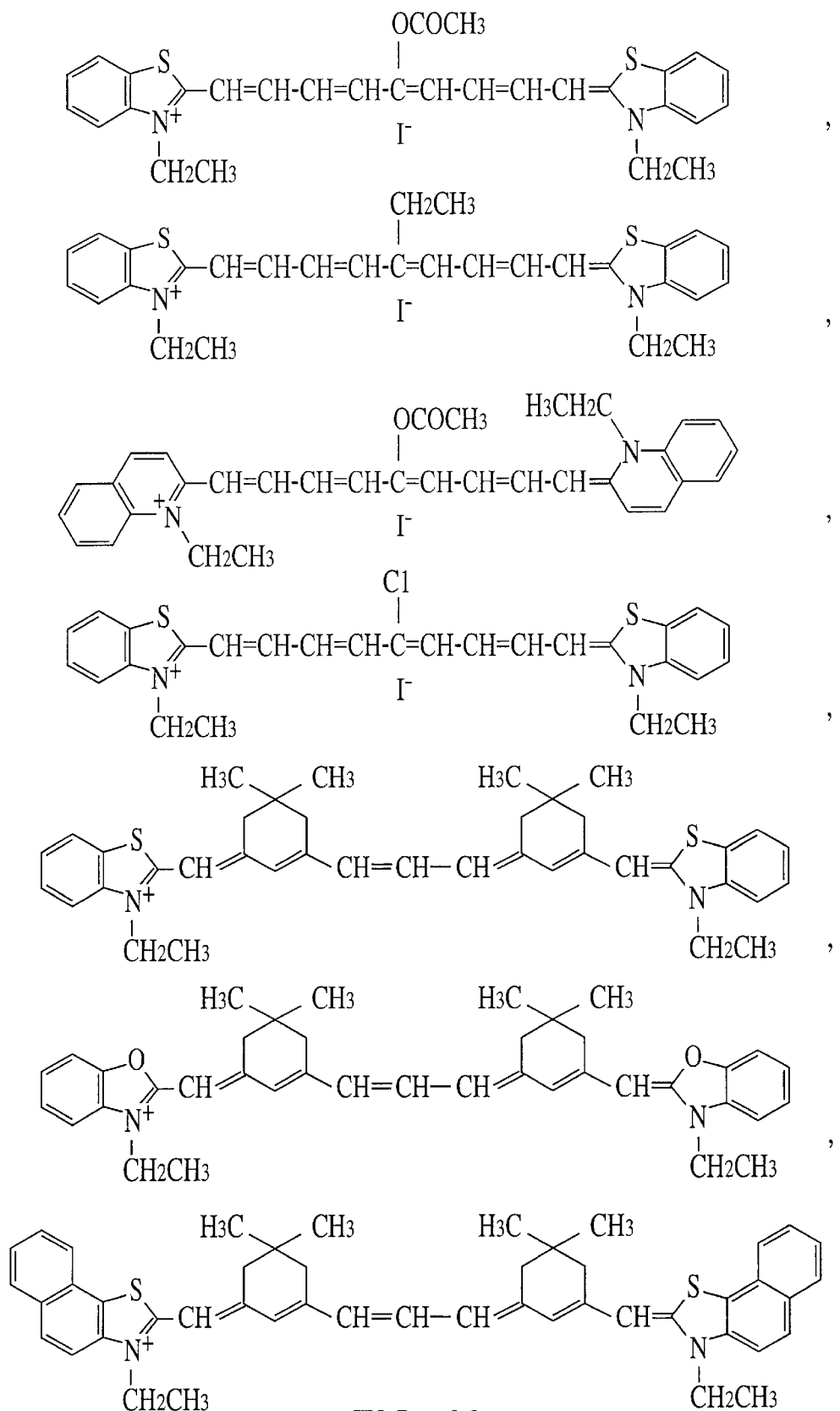
FIG. 13 is a drawing exemplifying the structure of polymethine dye used in the present invention.
Figure 14:
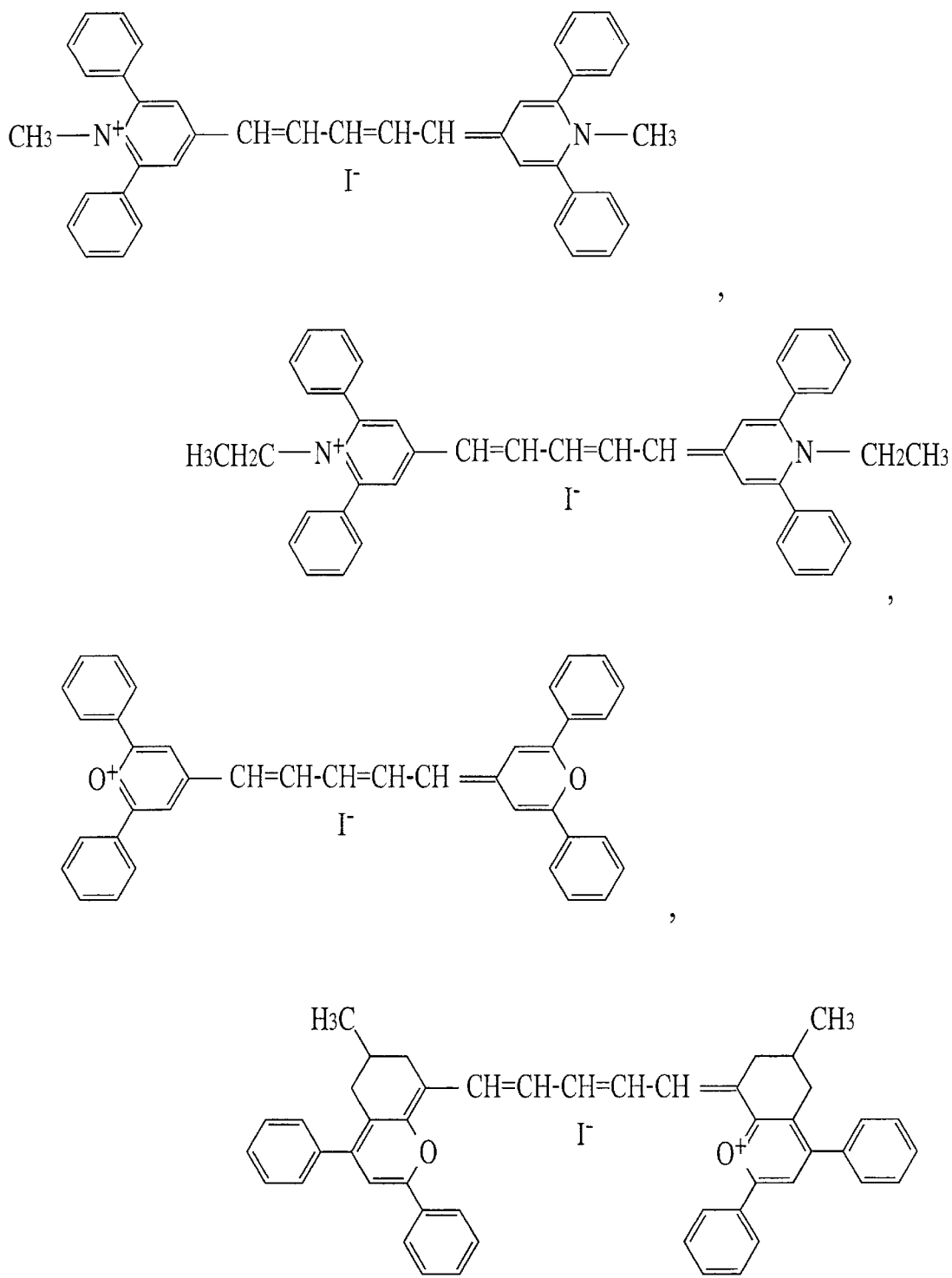
FIG. 14 is a drawing exemplifying the structure of polymethine dye used in the present invention.
Figure 15:
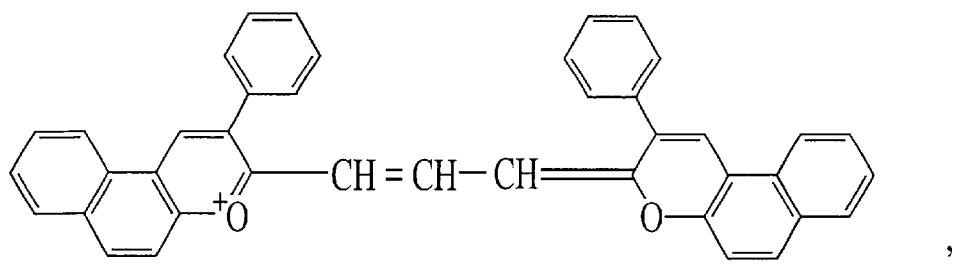
FIG. 15 is a drawing exemplifying the structure of polymethine dye used in the present invention.
Figure 15:
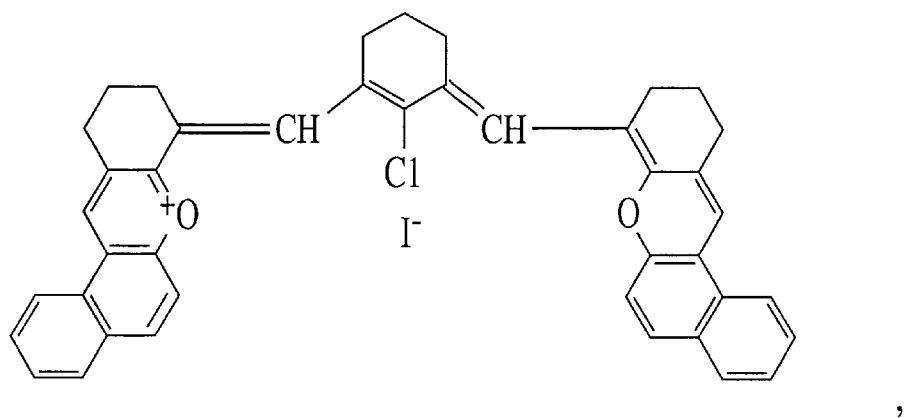
Figure 15:
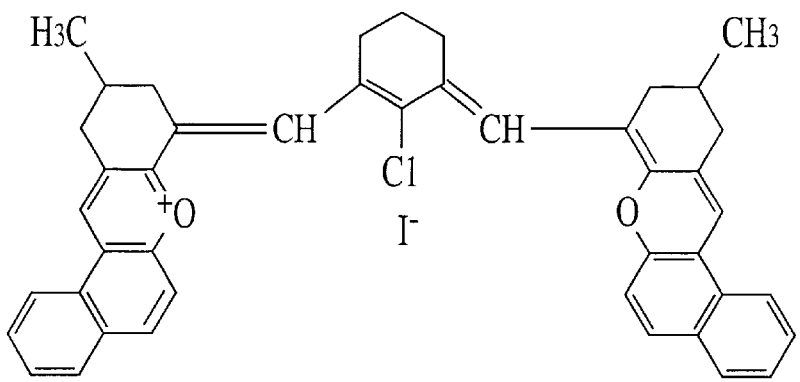
Figure 16:
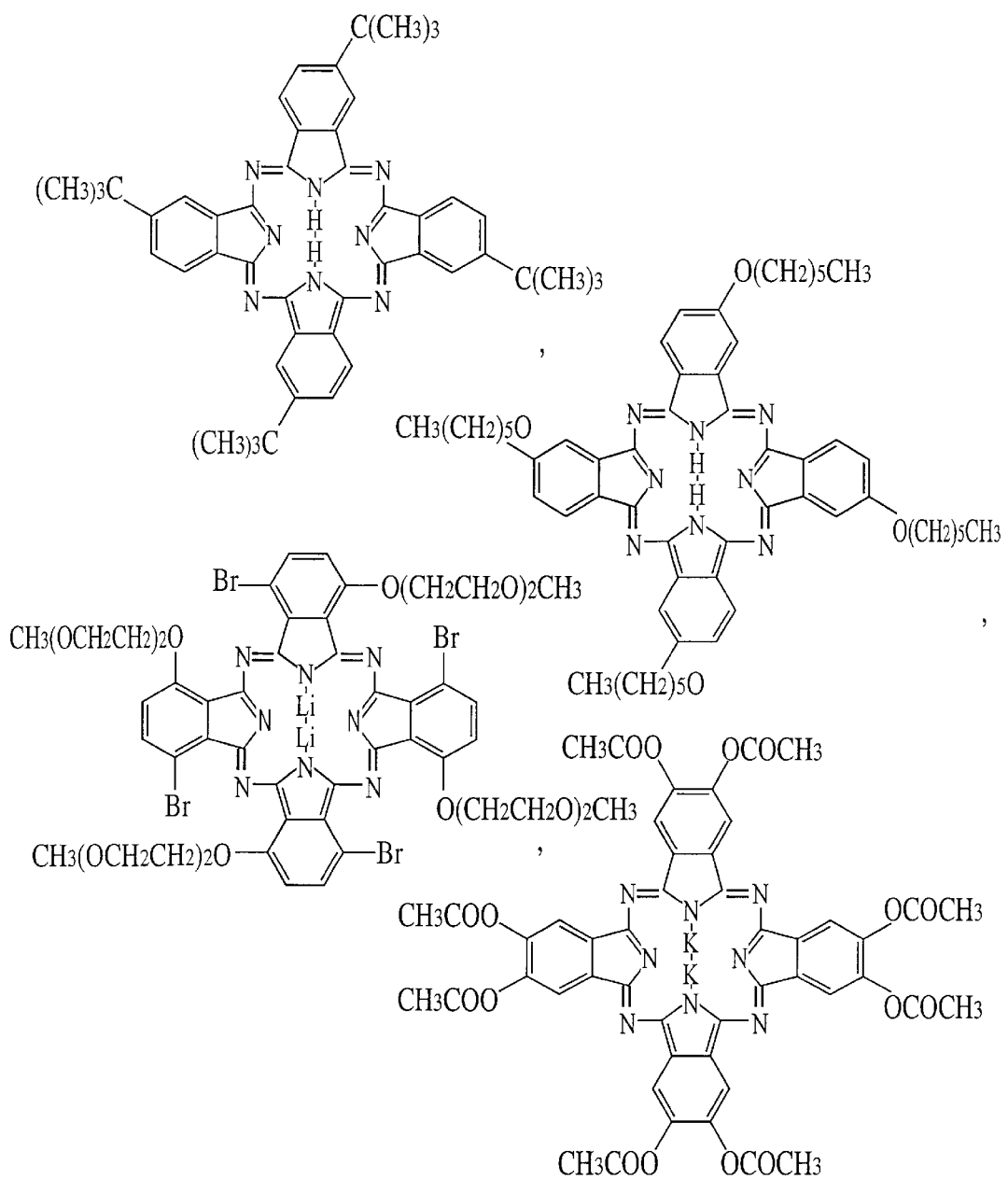
FIG. 16 is a drawing exemplifying the structure of phthalocyanine compound used in the present invention.
Figure 17:
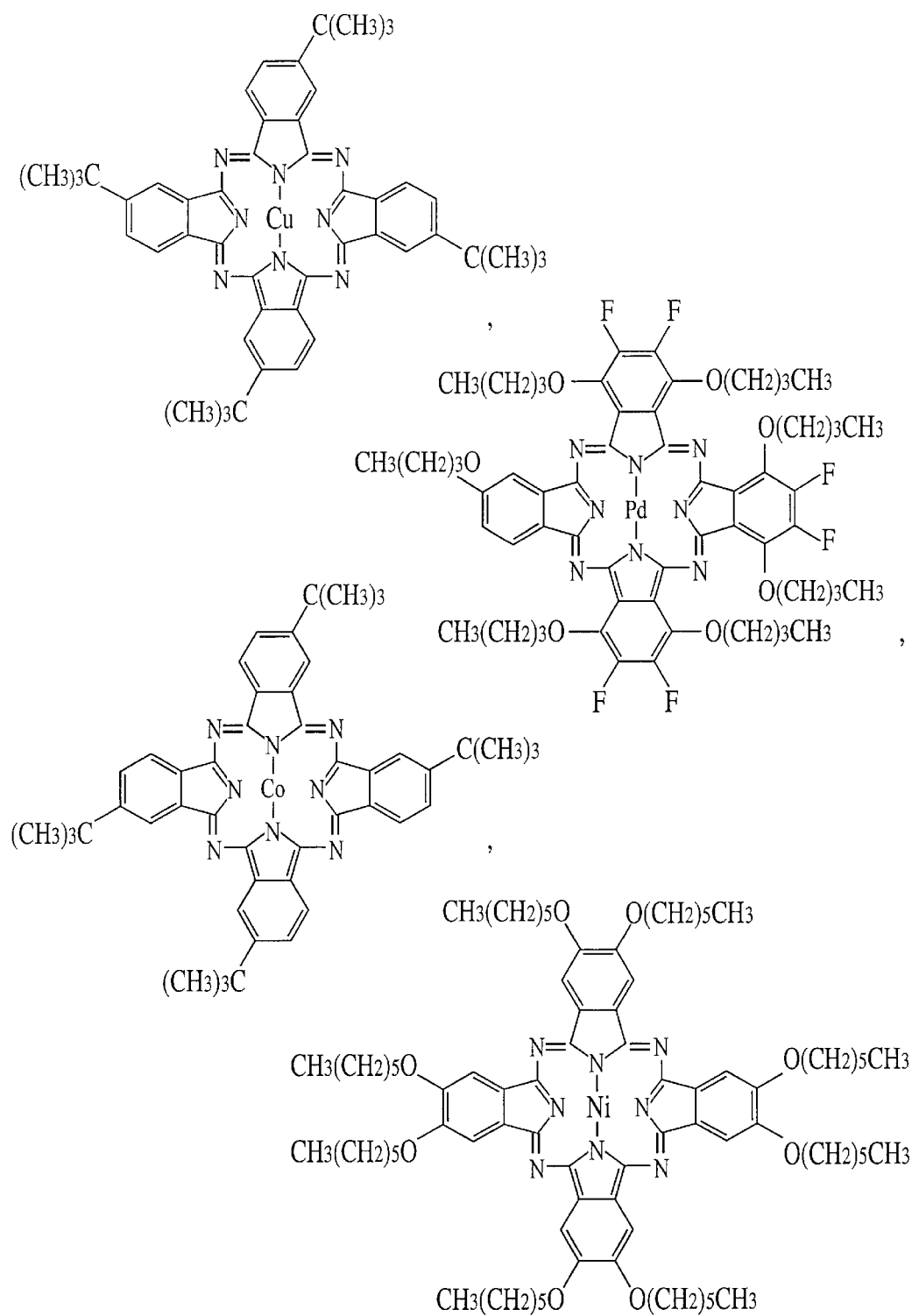
FIG. 17 is a drawing exemplifying the structure of phthalocyanine compound used in the present invention.
Figure 18:
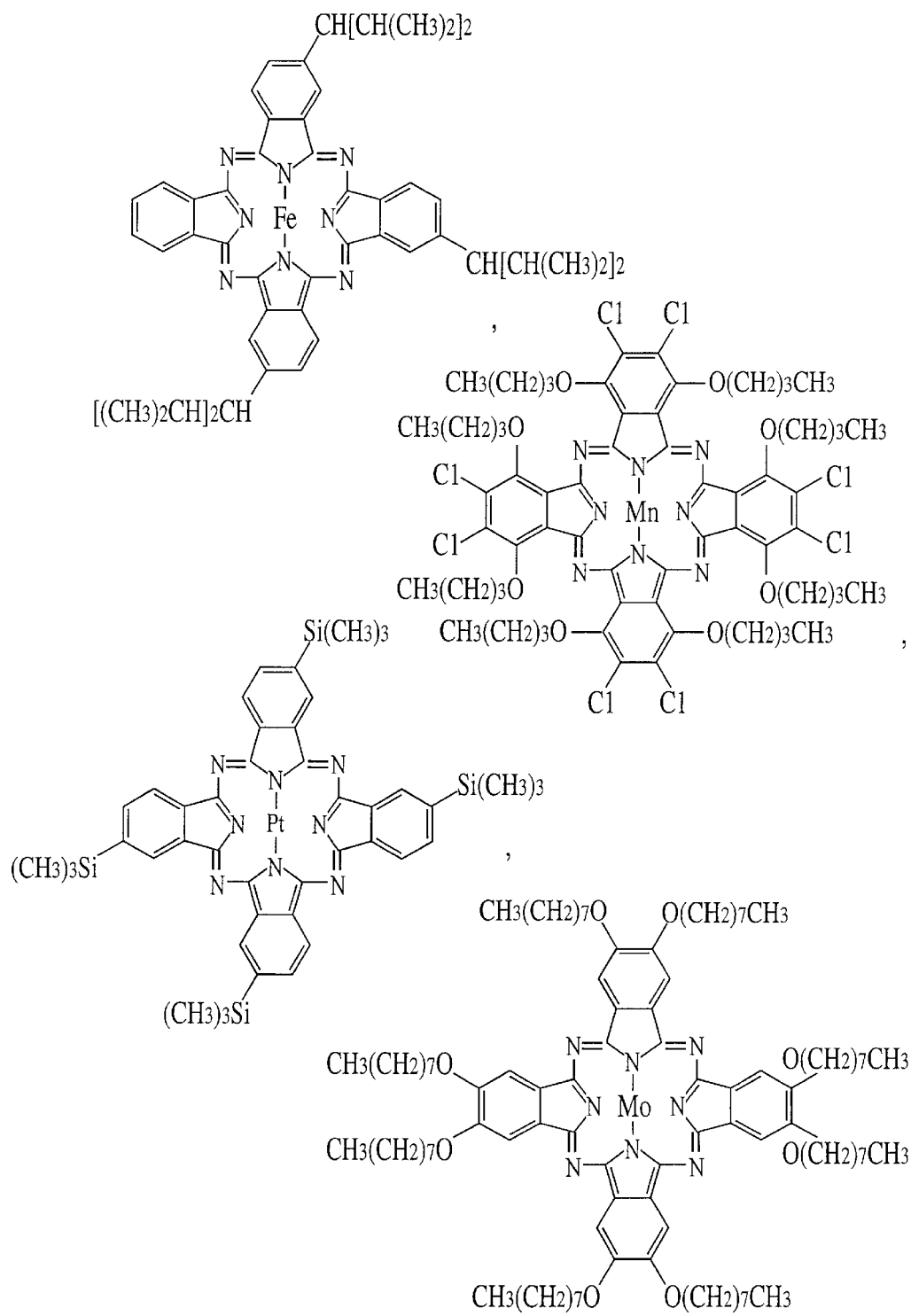
FIG. 18 is a drawing exemplifying the structure of phthalocyanine compound used in the present invention.
Figure 19:
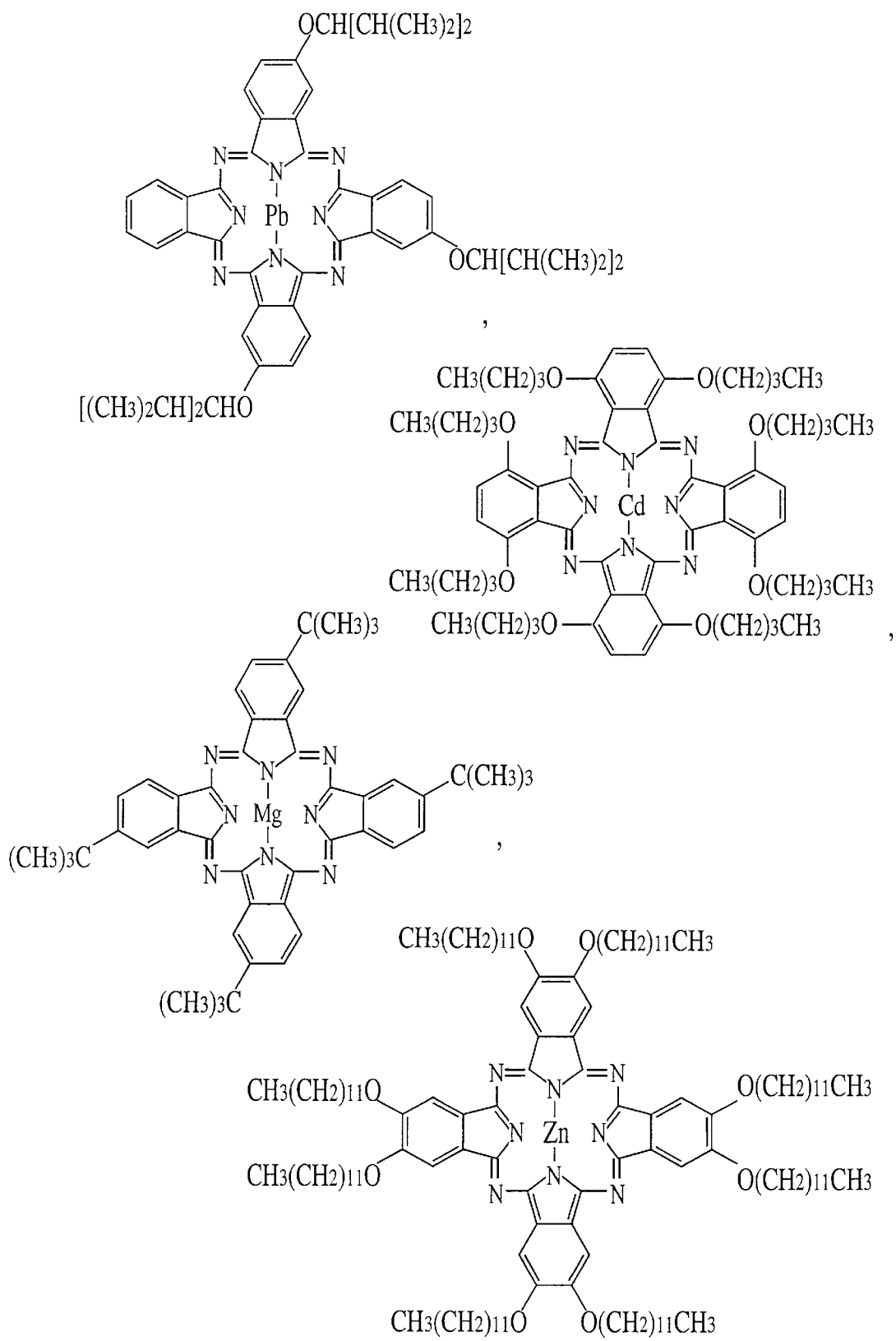
FIG. 19 is a drawing exemplifying the structure of phthalocyanine compound used in the present invention.
Figure 20:
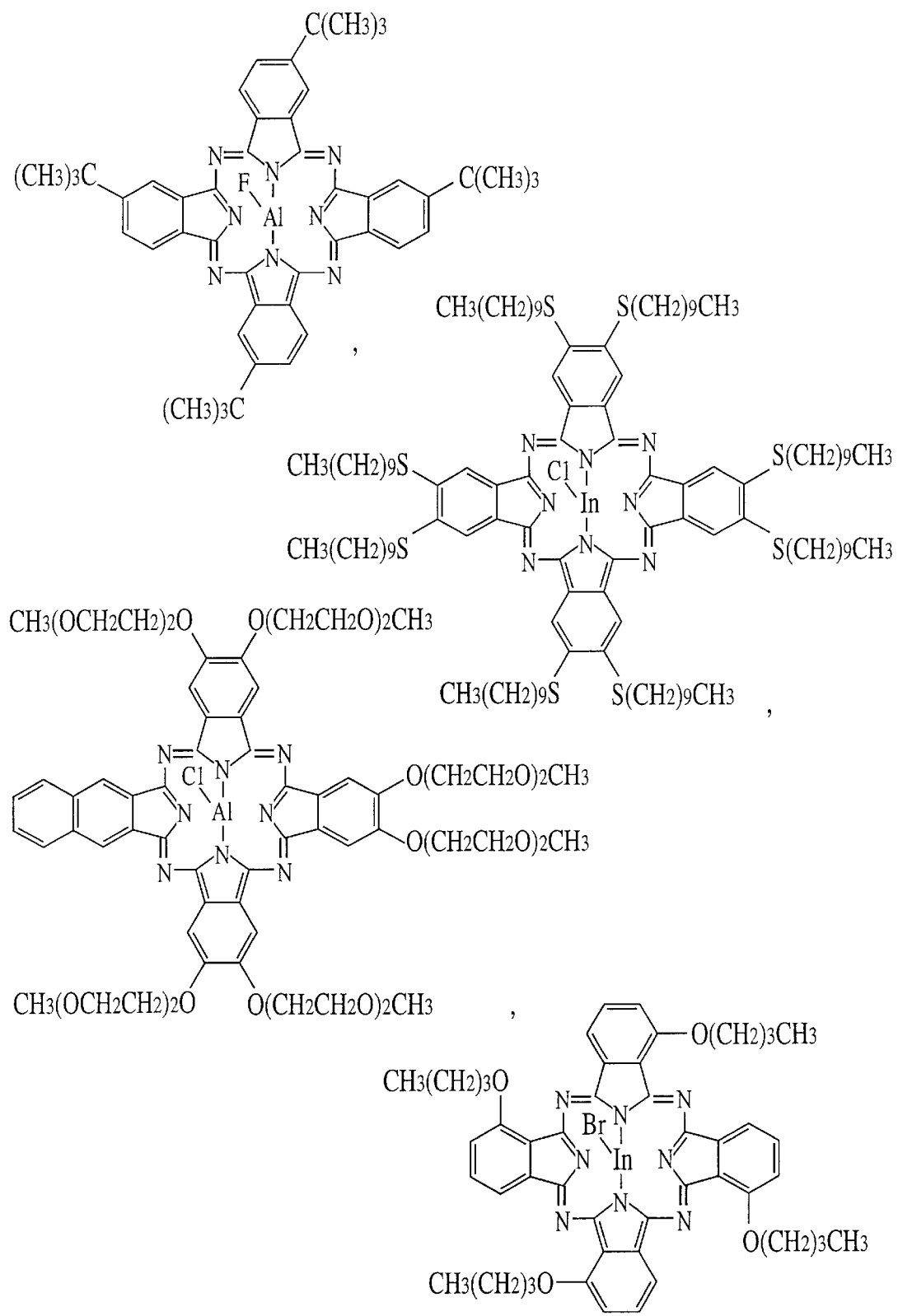
FIG. 20 is a drawing exemplifying the structure of phthalocyanine compound used in the present invention.
Figure 21:
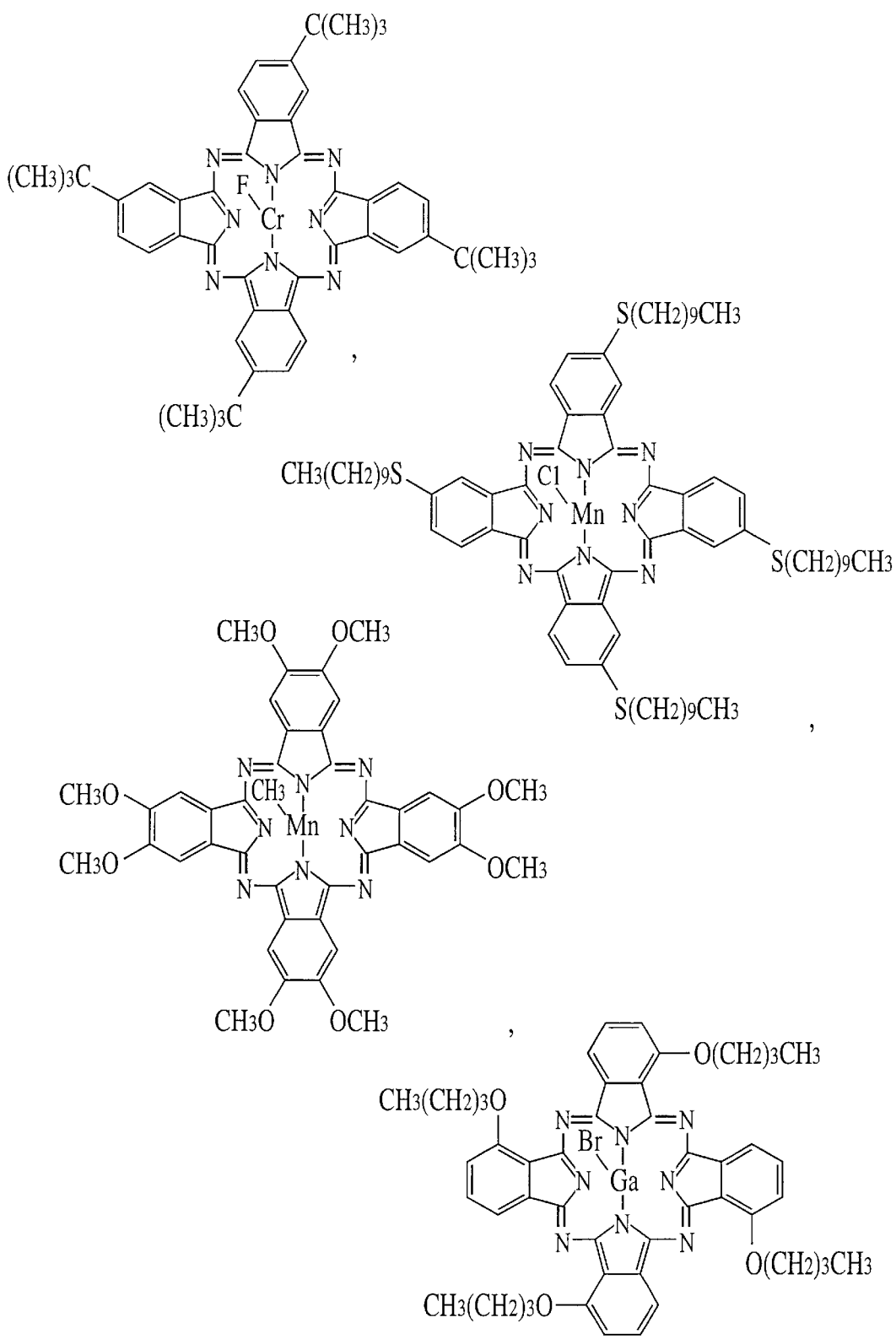
FIG. 21 is a drawing exemplifying the structure of phthalocyanine compound used in the present invention.
Figure 22:
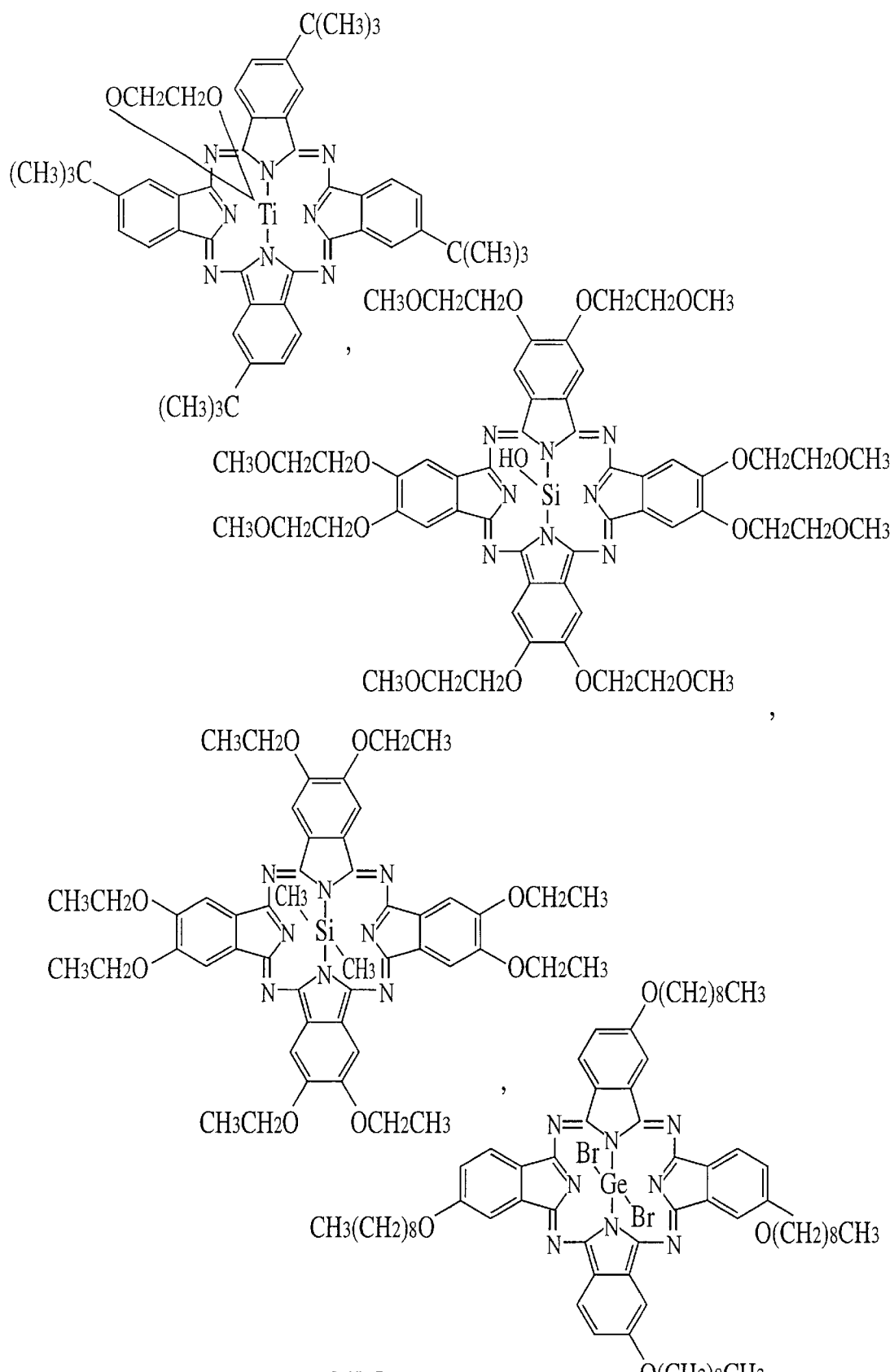
FIG. 22 is a drawing exemplifying the structure of phthalocyanine compound used in the present invention.
Figure 23:
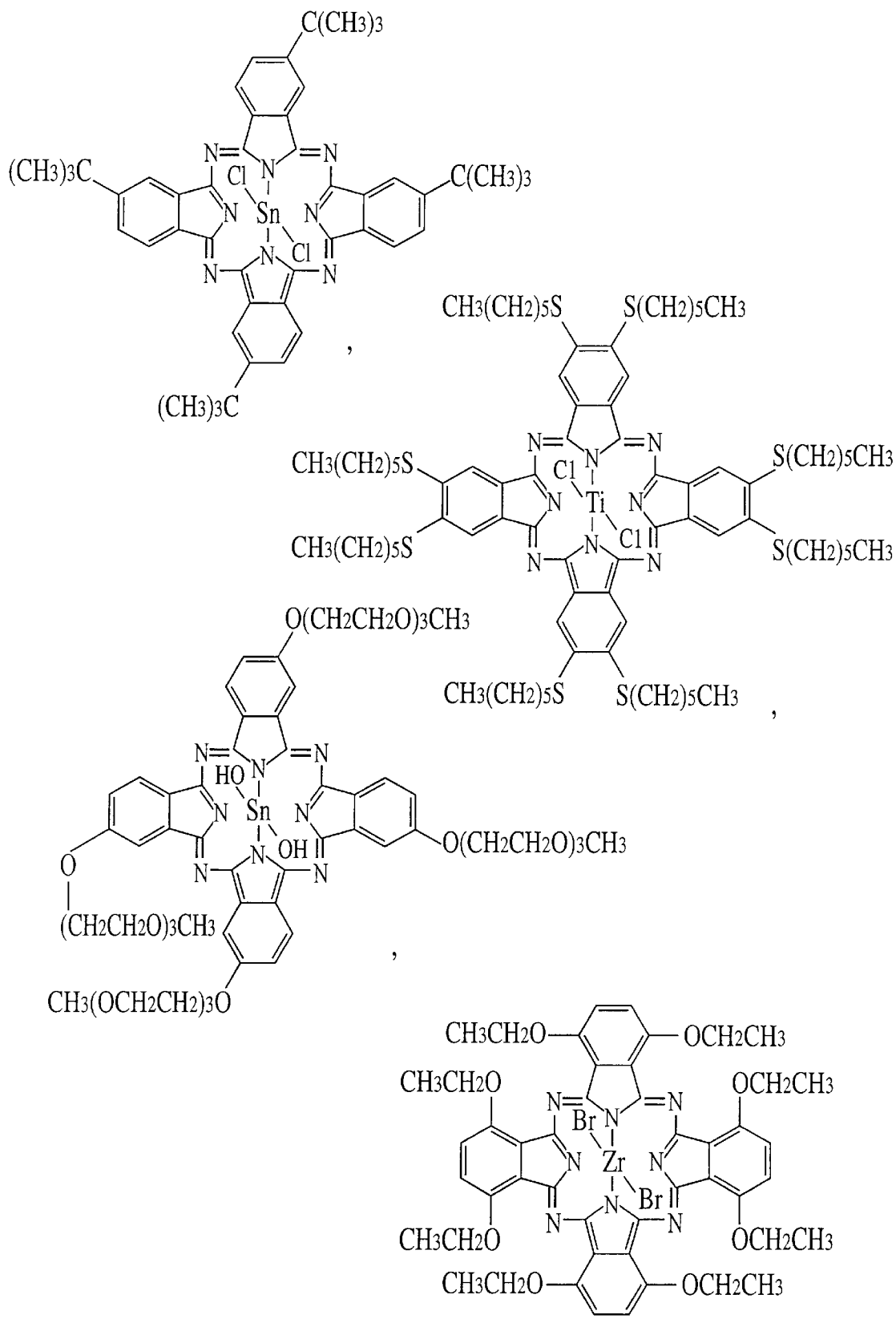
FIG. 23 is a drawing exemplifying the structure of phthalocyanine compound used in the present invention.
Figure 24:
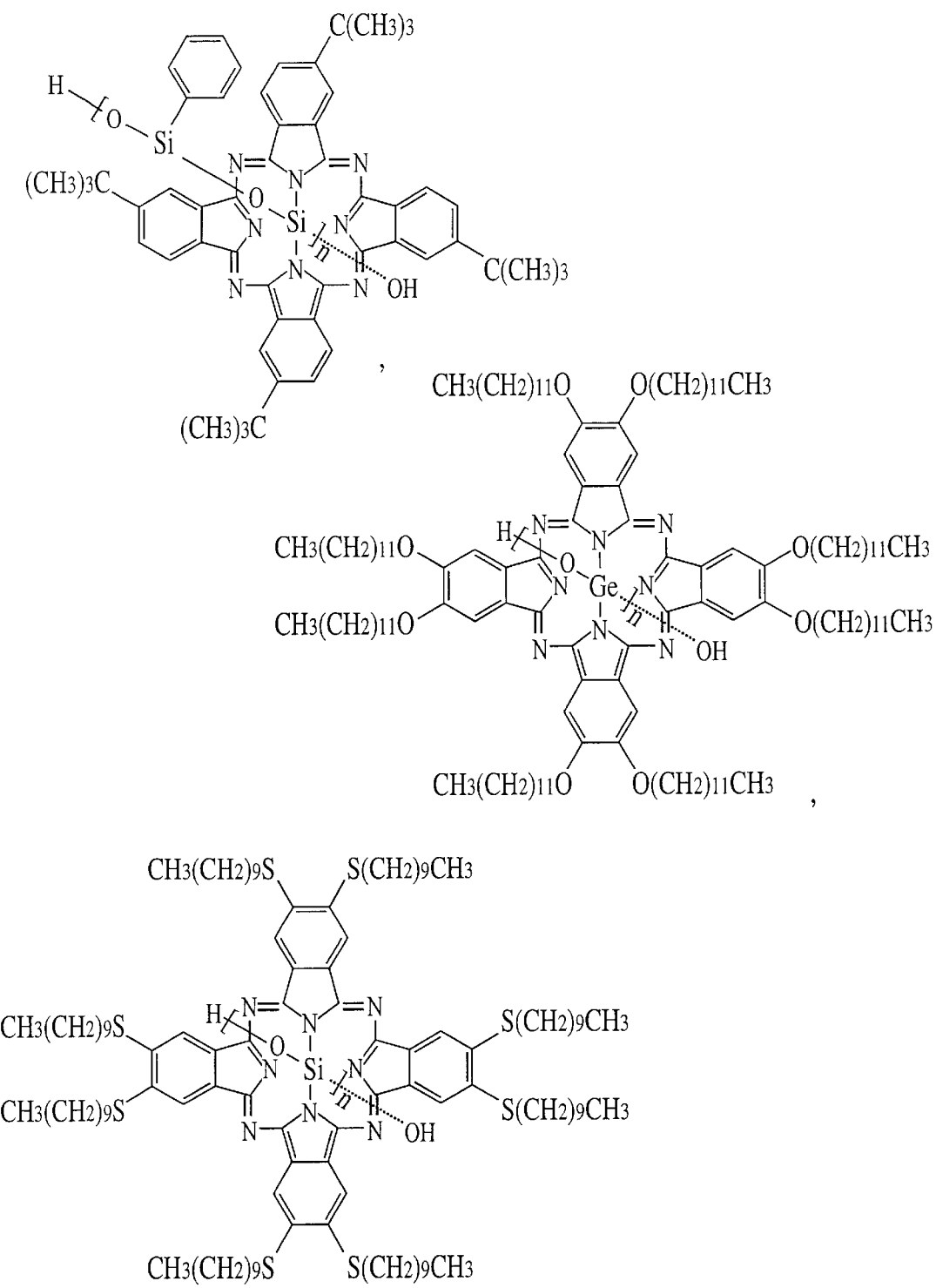
FIG. 24 is a drawing exemplifying the structure of phthalocyanine compound used in the present invention.
Figure 25:
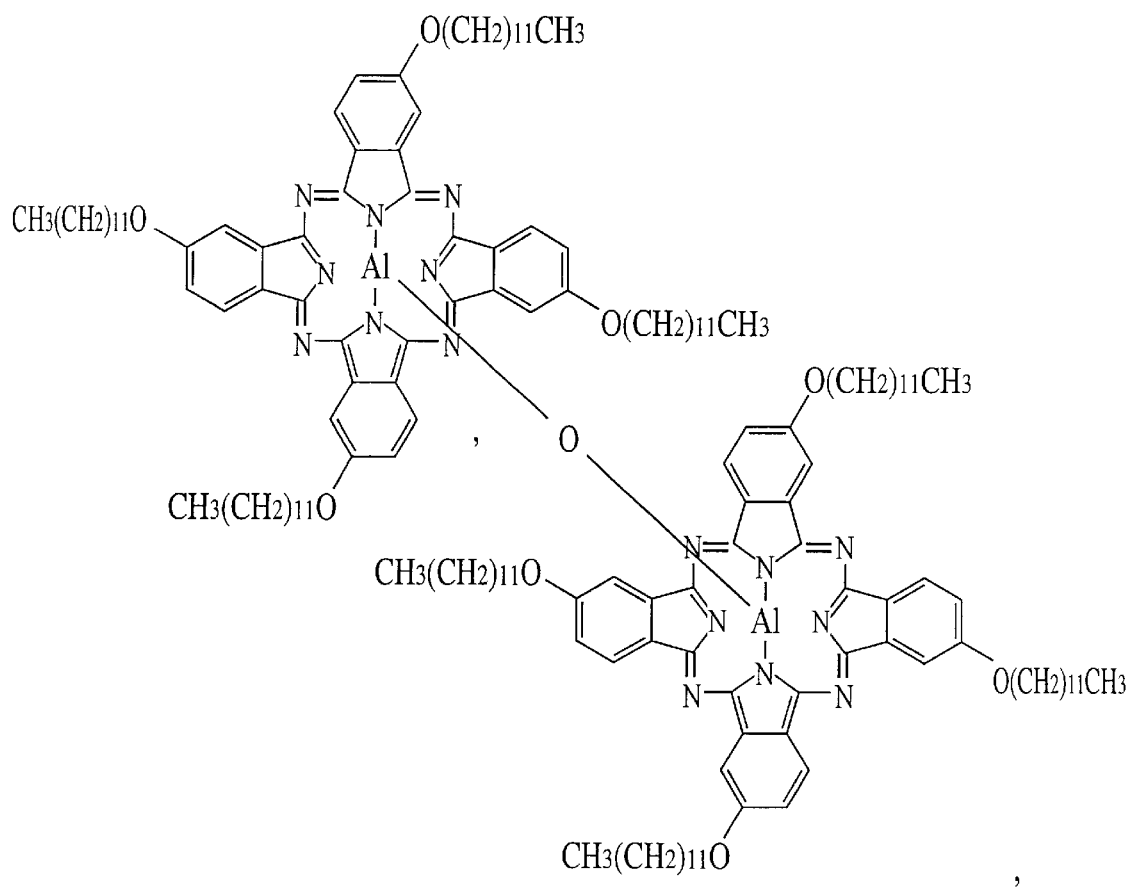
FIG. 25 is a drawing exemplifying the structure of phthalocyanine compound used in the present invention.
Figure 25A:
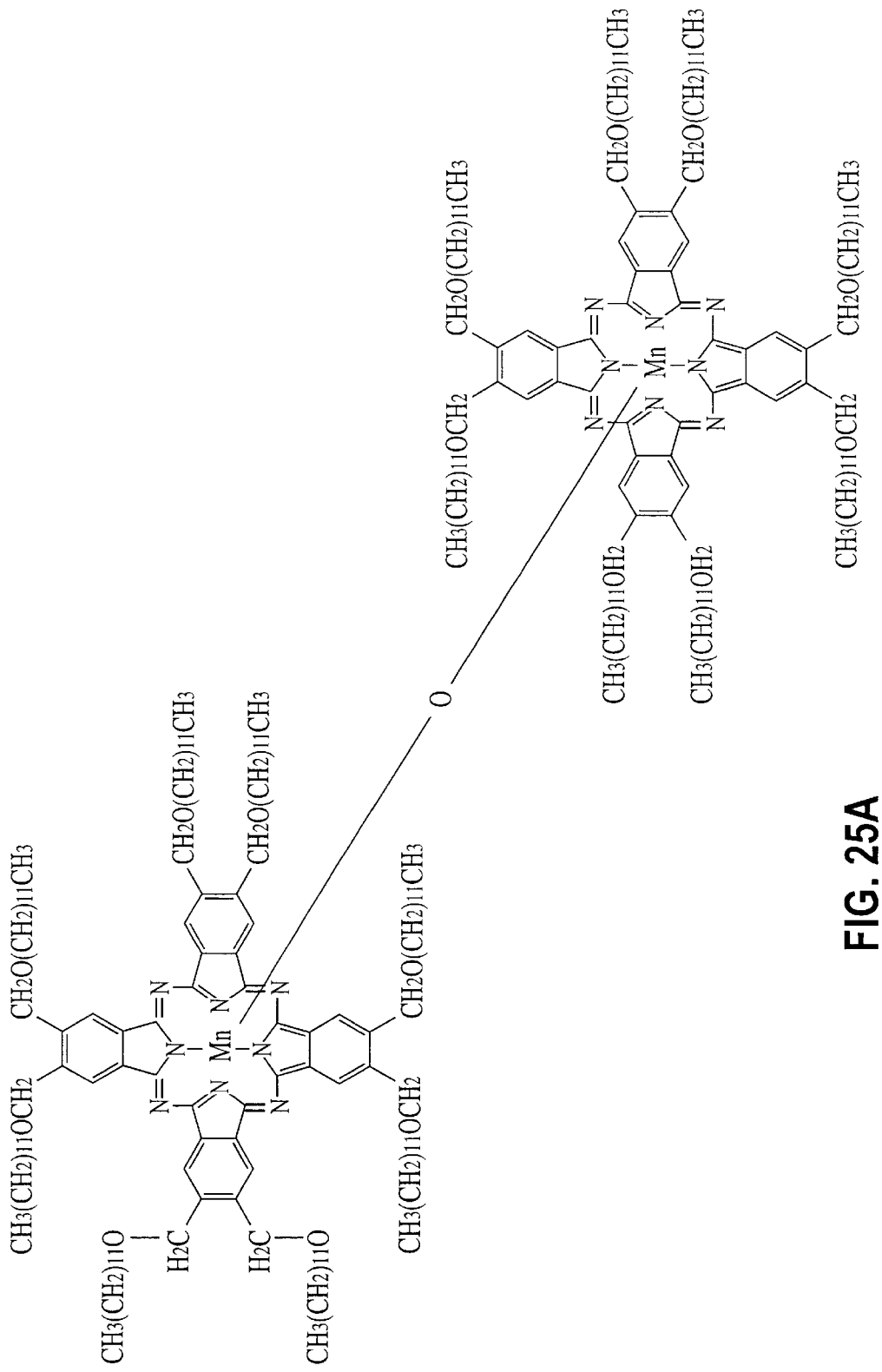
Figure 26:
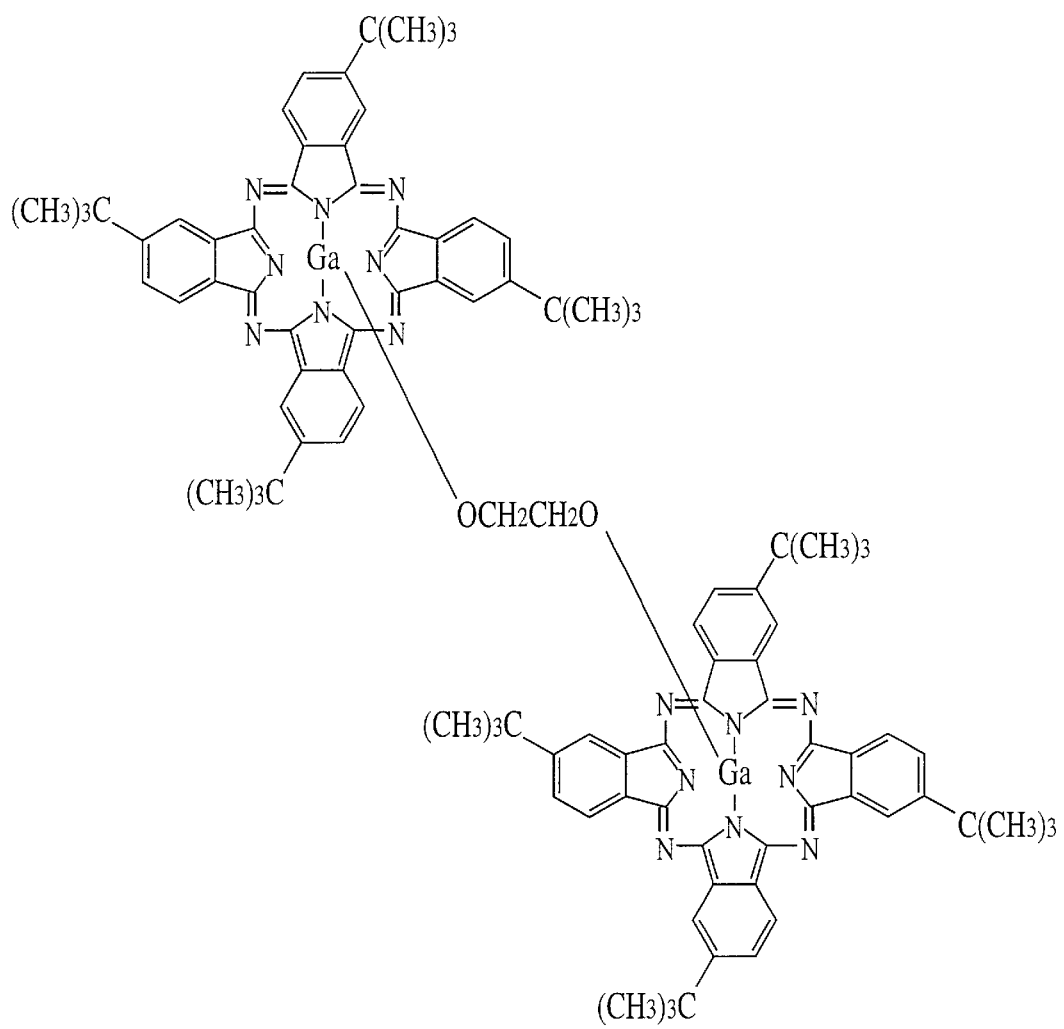
FIG. 26 is a drawing exemplifying the structure of phthalocyanine compound used in the present invention.
Figure 26A:
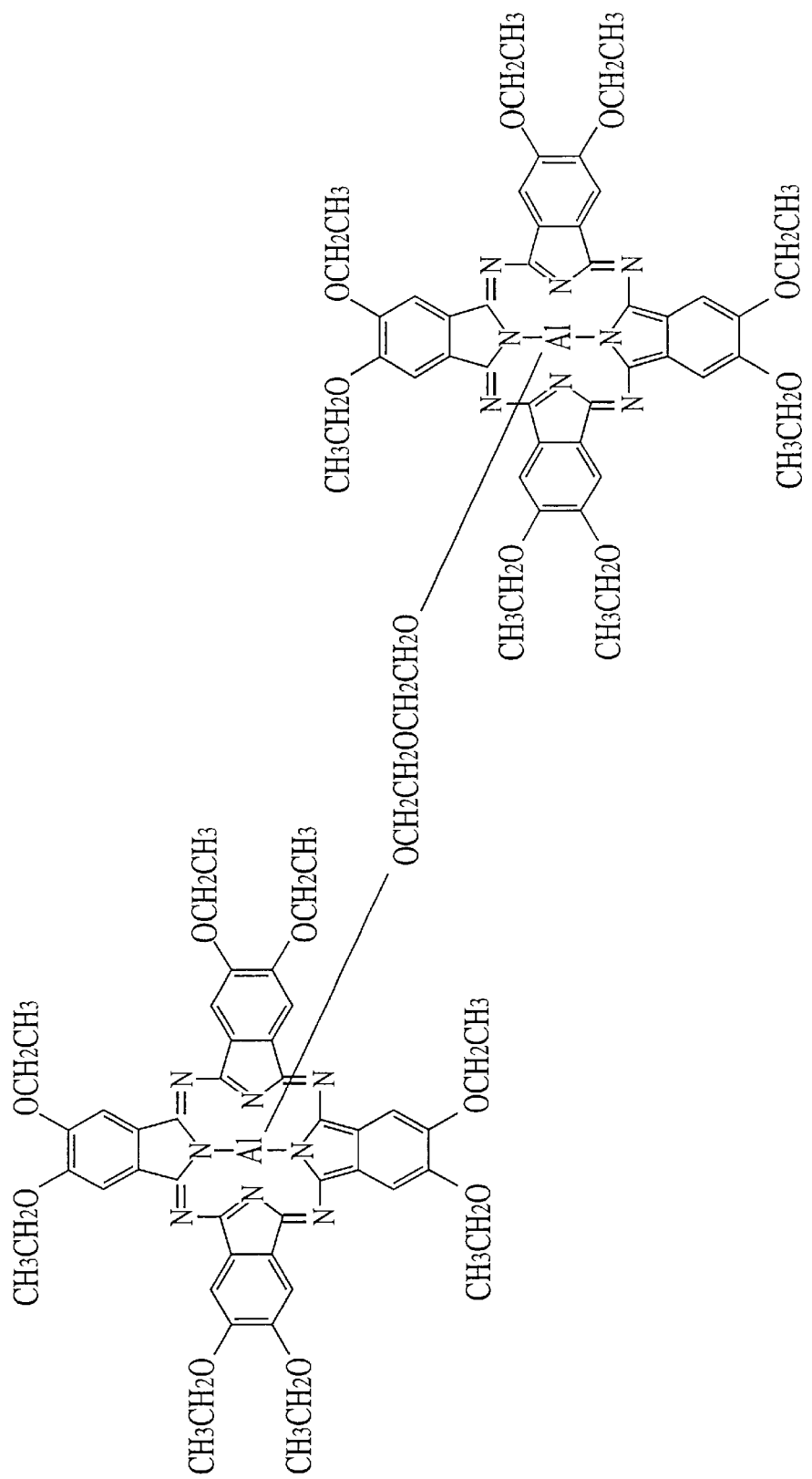
Figure 27:
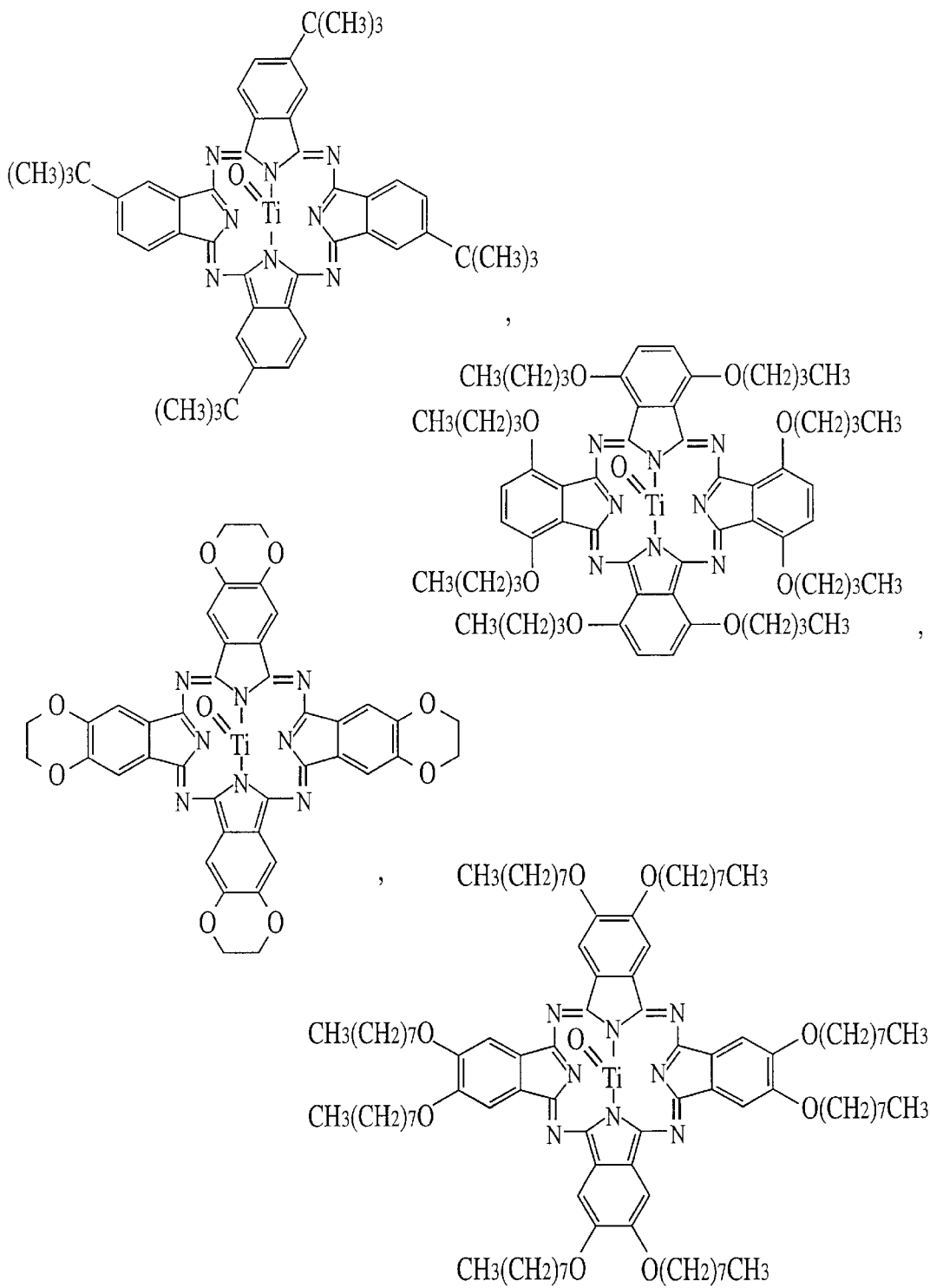
FIG. 27 is a drawing exemplifying the structure of phthalocyanine compound used in the present invention.
Figure 28:
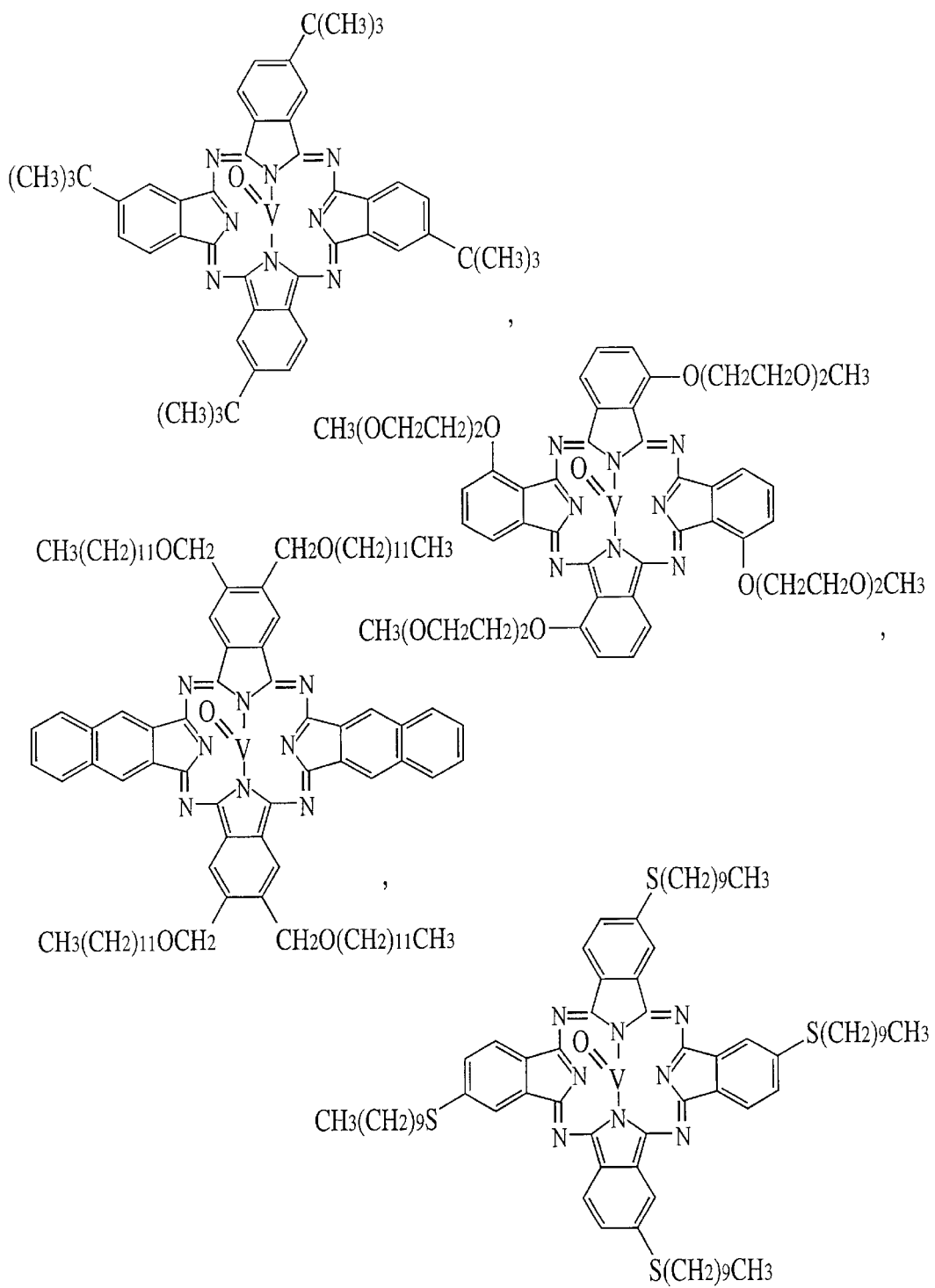
FIG. 28 is a drawing exemplifying the structure of phthalocyanine compound used in the present invention.
Figure 29:
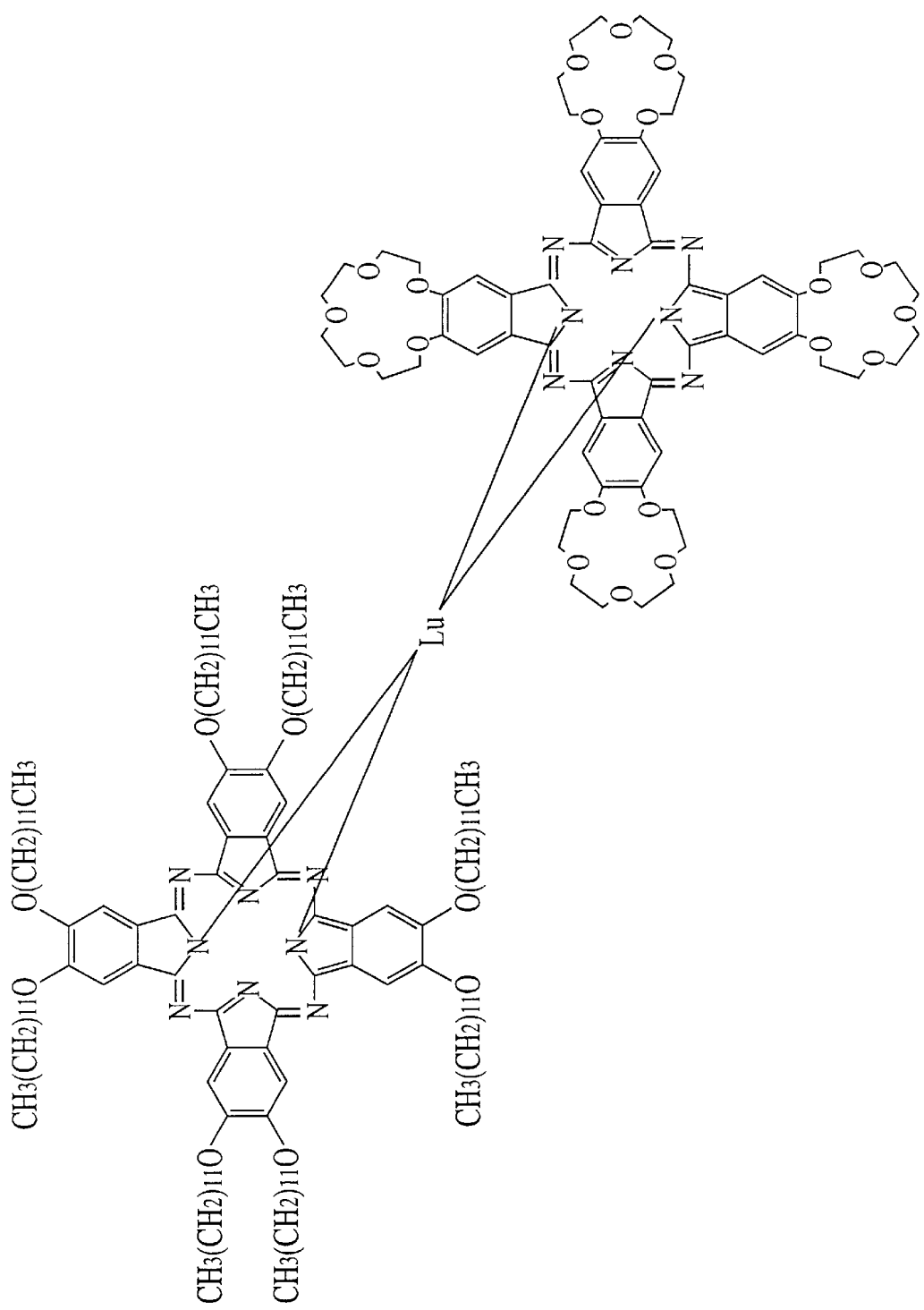
FIG. 29 is a drawing exemplifying the structure of phthalocyanine compound used in the present invention.
Figure 30:
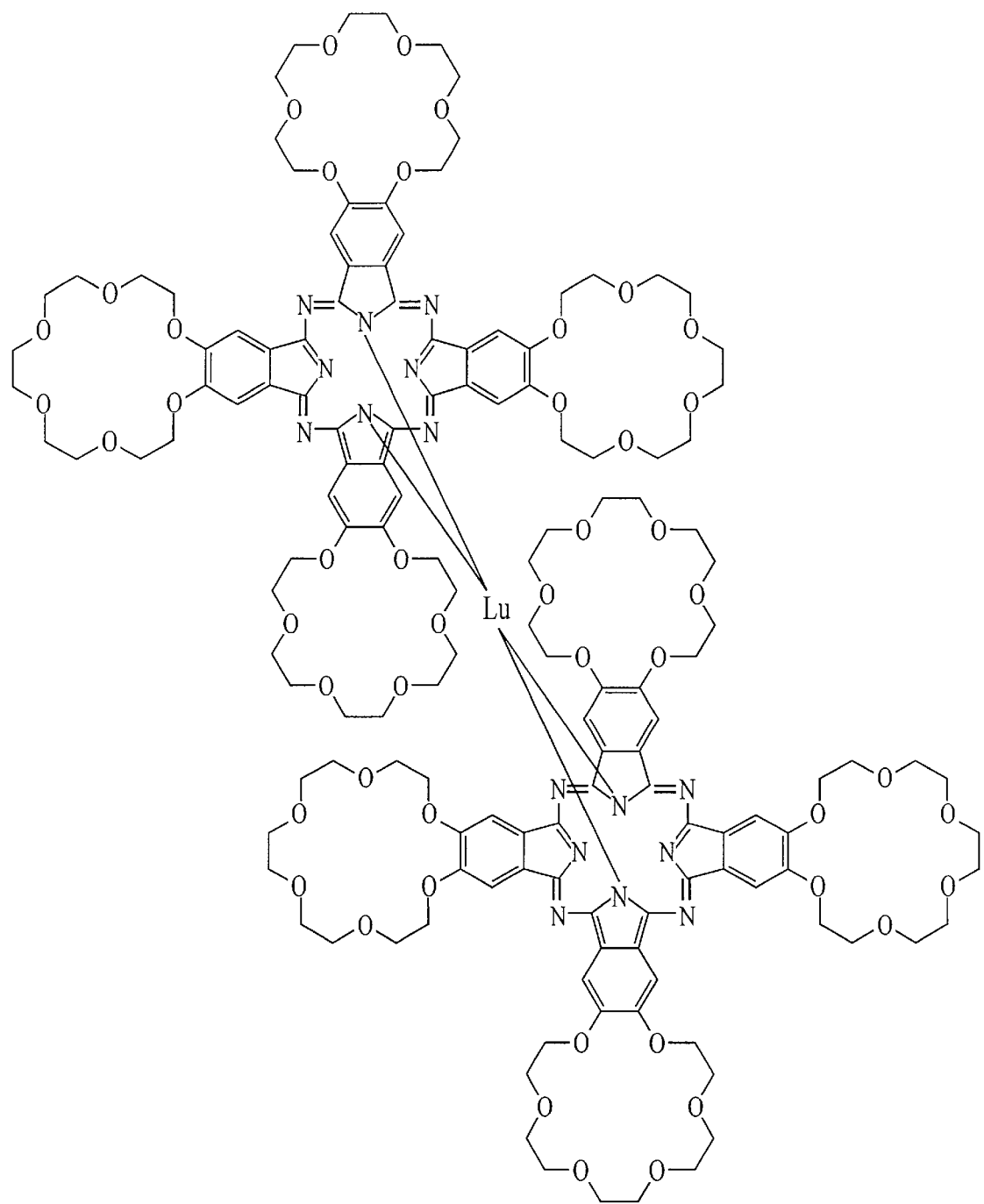
FIG. 30 is a drawing exemplifying the structure of phthalocyanine compound used in the present invention.

The band-pass filter 20 is one of the essential elements of apparatus construction for performing the method of controlling light of the present invention with the apparatus configuration shown in FIG. 3, and used as one of the means for extracting the signal light only out of a mixed beam of the signal light and control light which have propagated on the same optical path within said photoelement.

As other means for separating the signal light and the control light having different wavelengths can be used prism, diffraction grating, dichroic mirror, etc.

As the band-pass filter 20 employed in the apparatus configuration shown in FIG. 31 can be used any known filters arbitrarily so far as they are such band-pass filters as those capable of blocking completely the light in the region of wavelength band of the control light, while transmitting efficiently the light in the region of wavelength band of the signal light. For example, plastic and glass colored with dye, and glass coated with the dielectric multilayer evaporation film can be used.

In an optical apparatus comprised of the above-described construction elements shown in FIG. 31, the light beam of the control light emitted from the light source 1 travels through the ND filter 3 which regulates the photointencity of the transmitting light by adjusting its transmittance, then through the shutter 4 which turns on and off the control light pulse-wise, and is divided by the semitransparent mirror 5.

A portion of the control light divided by the semitransparent mirror 5 is intercepted by the photodetector 11. Herein, if, under the conditions wherein the light source of signal light 2 is turned off, the light source of control light 1 is turned on, and the shutter 4 is fully open, the calibration curve concerning the relationship between the photointencity at the position of light beam illumination to the film photoelement 8 and the photointencity of the photodetector 11 has been made by the previous measurement, the photointencity of the control light entering the film photoelement 8 can be constantly estimate from the photointencity of the photodetector 11. In this embodiment, the power of the incident control light entering the film photoelement 8 was regulated within the range from 0.5 mW to 25 mW with the ND filter 3.

The control light which has been divided and reflected by the semitransparent mirror 5 passes through the photomixer 6 and the converging lens 7, and is converged and illuminated to the film photoelement 8. The light beam of the control light which has transmitted the film photoelement 8 passes through the collimate lens 9, and is blocked by the band-pass filter 20.

The light beam of the signal light emitted from the light source of signal light 2 is mixed by said optical mixer 6 such that it propagates along the same optical path with that of the signal light, is converged and illuminated to the film photoelement 8 via the converging lens 7. The light which has passed through said element passes through the collimate lens 9 and the band-pass filter 20, further the aperture stop 19 provided as the occasion demands, and then it is intercepted by the photodetector 22.

Figure 33:
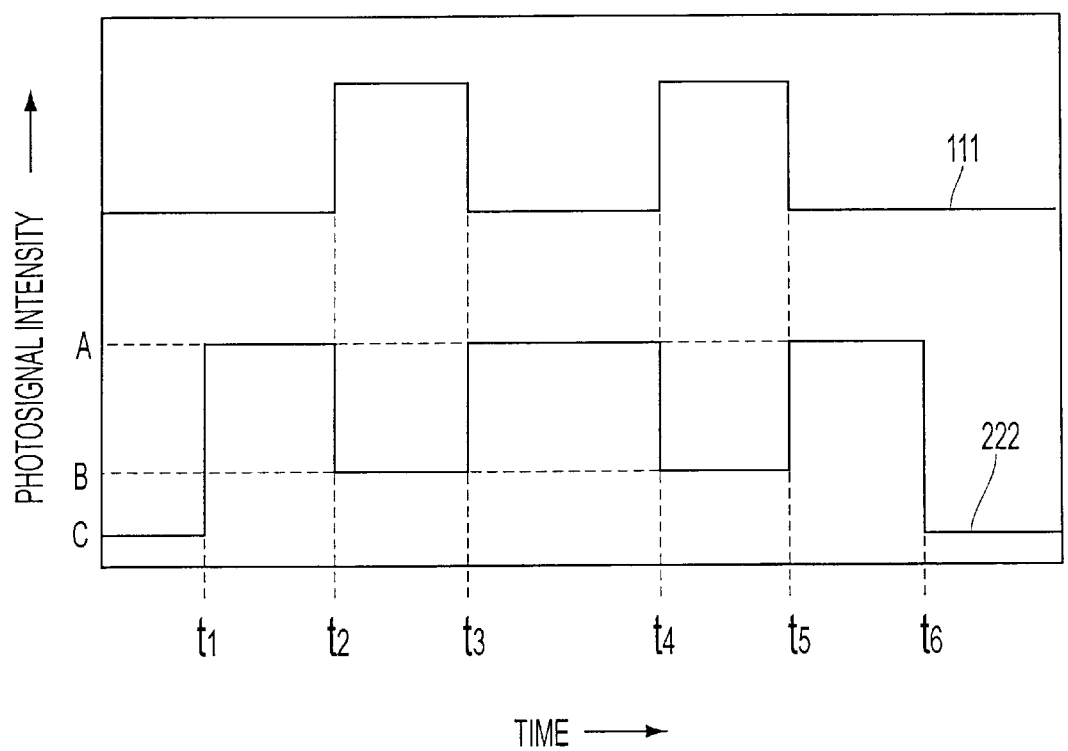
FIG. 33 is a drawing exemplifying a time-ourse variation of the photointencity of the control light and the signal light.
Figure 34:
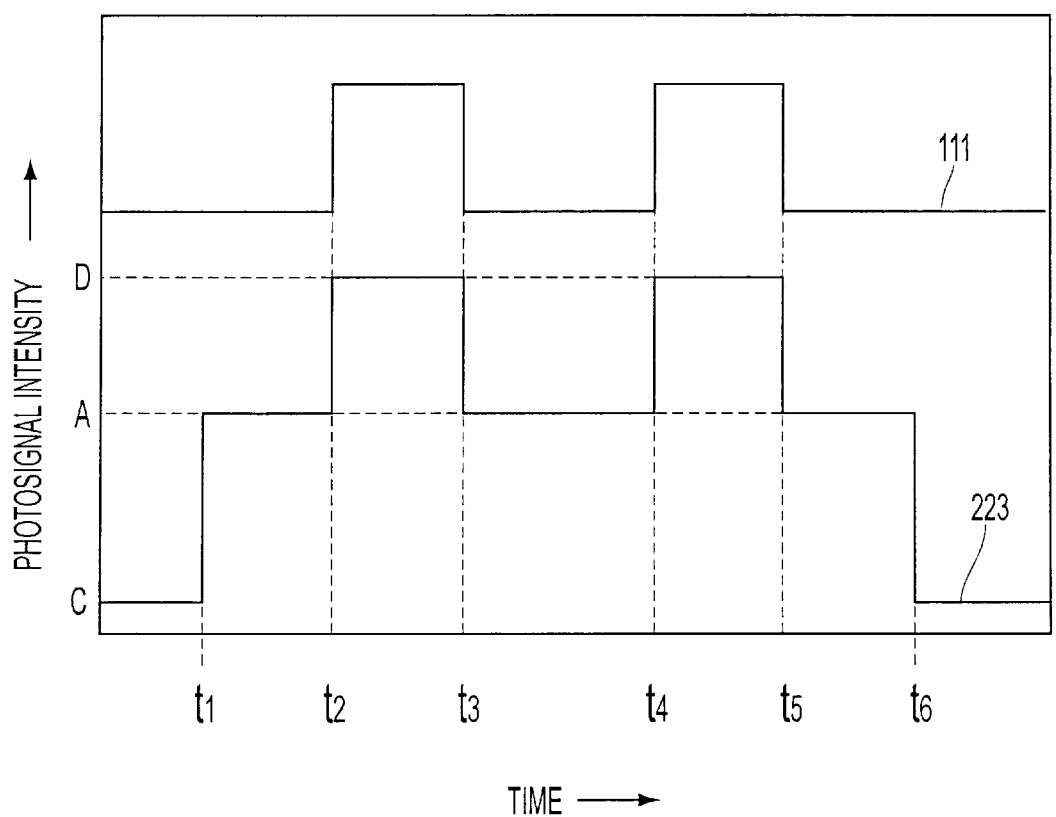
FIG. 34 is a drawing exemplifying a time-course variation of the photointencity of the control light and signal light.

Experiments on the light control were carried out using the optical apparatus shown in FIG. 31, and the changes in the photointencity were measured as shown in FIGS. 33 and 34. In FIGS. 33 and 34, the numeral 111 denotes the intercepted photosignal at the photodetector 11, and the numerals 222 as well as 223 denote the intercepted photosignal at the photodetector 22. The difference between the case wherein the intercepted photosignal 222 is obtained and the case wherein 223 is obtained at the photodetector 22 is as follows.

In the apparatus configuration shown in FIG. 31, the control light and the signal light are converged and introduced to the film photoelement 8. When the position at which the converged beam diameter becomes minimum (the focal point Fc) is set up on the side of the incident light, the photoresponse 222 in the direction of decreasing the apparent photointencity of said signal light transmitting said film photoelement 8 is observed. On the other hand, when the position at which the converged beam diameter becomes minimum (the focal point Fc) is set up in the proximity to the collimate lens 9 (on the side of the radiating light), the photoresponse 223 in the direction of increasing the apparent photointencity of said signal light transmitting said film photoelement 8 is observed.

The detailed mechanism causing such photoresponse has not been fully elucidated, and the careful studies in progress now indicates that it is caused by the alteration of the transmittance, refractive index, etc. of the photoresponsive composition due to the illumination of the control light.

Herein, as methods for altering the positional relationship between the focal points of the converged control and signal lights on the same optical path and the position of the photoelement, for example, a method wherein the film photoelement 8 is installed on a deck equipped with a fine adjusting mechanism using a precision screw, a deck equipped with a piezoelectric actuator, a deck equipped with an ultrasonic actuator, etc. and moved as described above, a method of changing the position of the focal point by altering the power concentration of the control light pulse using a converging lens 7 made of materials with a large non-linear refraction index effect, a method of changing the focal point by altering the temperature by a heating device using the converging lens 7 made of materials with a large coefficient of expansion, etc. may be used.

Experiments on light control were carried out using the optical apparatus shown in FIG. 31, and the changes in the photointencity were measured as shown in FIGS. 33 and 34. Details of the experiments are described below.

First, in order to make the light beam of the control light and that of the signal light meet in the focal point (Fc) in the same region within the film photoelement 8 or in its proximity, the optical path from each light source, the photomixer 6 and converging lens 7 were adjusted. In addition, the photoelement was placed in the direction such that the signal light and the control light enter from the side of the cover glass of said film photoelement 8, and radiate from the side of the slide glass. Then, the function of the band-pass filter 20 was inspected. That is, it was confirmed that no response occurred on the photodetector 22 when the light source 1 was turned on and the shutter 4 was fully open under the conditions wherein the light source 2 was turned off.

In addition, the shifting of the position where the converged beam diameter becomes minimum (focal point) on the film photoelement 8 was carried out by shifting said film photoelement itself. That is, with the distance between the converging lens 7 and the collimate lens 9 ($d_{78}+d_{89}$) being fixed, the distance between the film photoelement 8 and the converging lens 7 is varied such that the positional relationship between the focal point position of the control light as well as the signal light converged on the same optical path and the film photoelement 8 was altered.

First, a case wherein said focal point (Fc) is adjusted to the converging lens 7 side of the film photoelement 8 will be described. The response waveform 222 of the signal beam corresponding to the waveform 111 of the control beam in this case is shown in FIG. 33.

With the shutter 4 closed, the light source of the control light 1 was turned on, and the light source 2 was turned on at the time $t_1$ to radiate the signal light to the film photoelement 8, the photointencity at the photodetector 22 increased from the level C to the level A.

When the shutter 4 was opened at time $t_2$ and the control light was converged and illuminated on the same optical path along which the signal light inside of the film photoelement 8 was propagating, the photointencity at the photodetector 22 decreased from the level A to the level B. That is, the photoresponse in the direction of decreasing the apparent photointencity of signal light was observed. The response time required for this change was less than 2 microseconds.

When the shutter 4 was closed at the time $t_3$ to terminate the illumination of the control light to the film photoelement 8, the photointencity at the photodetector 22 returned from the level B to the level A. The response time required for this change was less than 3 microseconds.

When the shutter 4 was opened at the time $t_4$ and then closed at the time $t_5$, the photointencity at the photodetector 22 decreased from the level A to the level B, subsequently returned to the level A.

When the light source 2 was turned off at the time $t_6$, the output from the photodetector 22 decreased, returning to level C.

Next, the case wherein said focal point is adjusted to the collimate lens 9 side of the film photoelement 8 will be described. The response waveform 223 of the signal beam corresponding to the waveform 111 of the control beam in this case is shown in FIG. 34.

When, with the shutter 4 being closed, the light source of the control light 1 was turned on, then the light source of 2 was turned on at the time $t_1$ to radiate the signal light to the film photoelement 8, the photointencity at the photodetector 22 increased from the level C to the level A.

When the shutter 4 was opened at time $t_2$ and the control light was converged and illuminated to the same optical path along which the signal light inside of the film photoelement 8 was propagating, the photointencity at the photodetector 22 increased from the level A to the level D. That is, the photoresponse in the direction of increasing the apparent photointencity was observed. The response time required for this change was less than 2 microseconds.

When the shutter 4 was closed at the time $t_3$ to terminate the illumination of the control light to the film photoelement 8, the photointencity at the photodetector 22 returned from the level D to the level A. The response time required for this change was less than 3 microseconds.

When the shutter 4 was opened at the time $t_4$ and then closed at the time $t_5$, the photointencity at the photodetector 22 increased from the level A to the level D, subsequently returned to the level A.

When the light source of signal light 2 was turned off at the time $t_6$, the output from the photodetector 22 decreased, returning to the level C.

In summary, when the control light with the time variation of its photointencity having the waveform 111 as shown in FIG. 33 or FIG. 34 was illuminated to the film photoelement 8, the output waveform from the photodetector 22 monitoring the photointencity of the signal light varied reversibly corresponding to the time-variation of the photointencity of the control light. That is, it has been confirmed that the control of the signal light transmittance by increasing/decreasing the photointencity of the control light or turning off/on of said signal light, namely the light control by light or the light modulation by light can be carried out.

In addition, the degree of changes in the photointencity of the signal light corresponding to the turning on and off of the control light can be quantitatively compared with the value $\Delta T$ (unit, %) defined as follows using the output levels A, B and C from said photodetector 22, or the value $\Delta T'$ (unit, %) similarly defined using A, C and D:

$$\Delta T=100[(A-B)/(A-C)]$$

or $$\Delta T=100[(D-A)/(A-C)],$$

wherein A is the output level of the photodetector 22 with the control light being cut of, and the light source of signal light 2 being turned on, B and D are the output levels of the photodetector 22 when both signal light and control light are simultaneously illuminated, and C is the output level of the photodetector 22 with the light source 2 being turned off.

In the above-described example, when the direction and magnitude of the photoresponse of signal light was examined by sliding the film photoelement 8 with the incident power being fixed at 20 mW, the maximum value of $\Delta T$, the magnitude of response in the direction of decreasing photointencity of signal light was 82%, while the maximum value of $\Delta T'$, the apparent magnitude of response in the direction of increasing the photointencity of signal light was 54%.

As described above, it is possible to reverse the direction of photoresponse of signal light and obtain the photoresponse in the direction of decreasing or increasing the apparent photointencity of signal light by altering the positional relationship between the position wherein the converged beam diameter becomes minimum (the focal point Fc) and that of the film photoelement 8.

Figure 35:
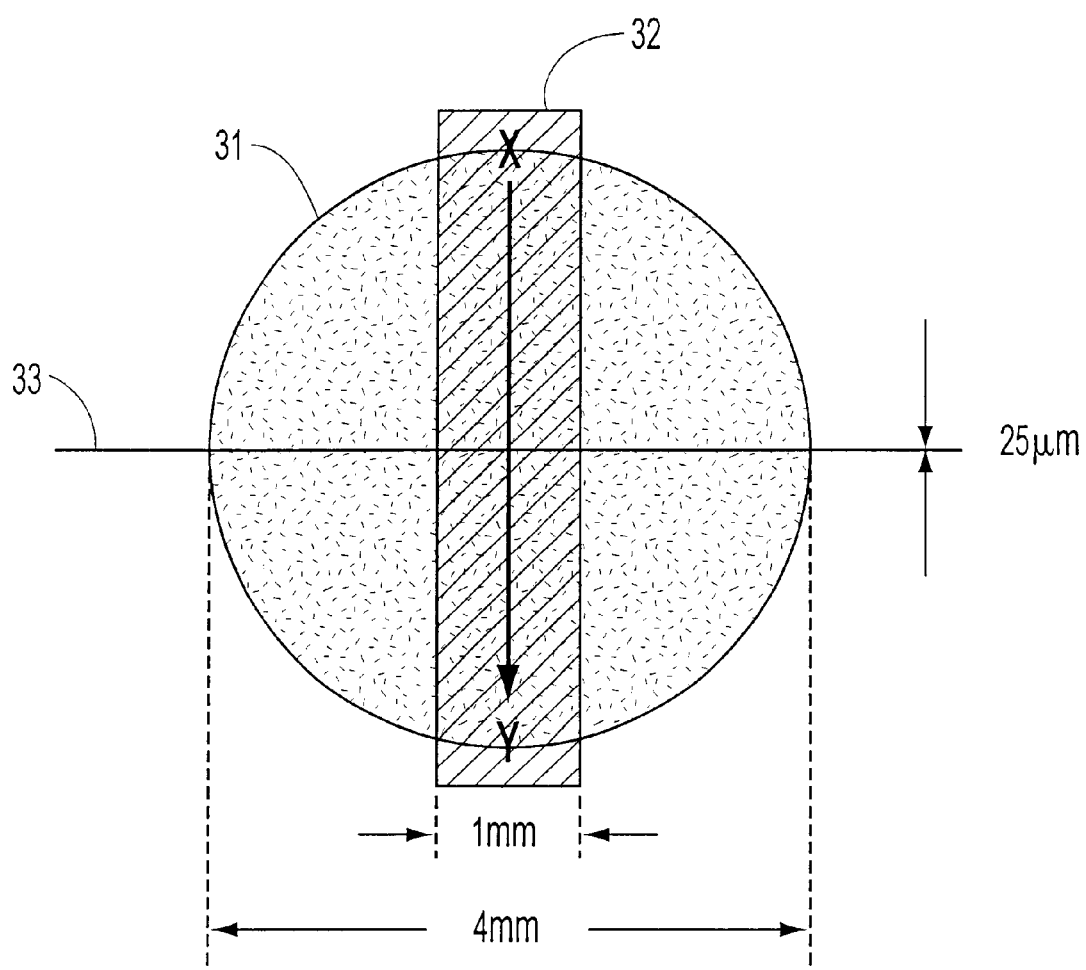
FIG. 35 is a drawing showing the relationship between the slit and the light beam used in the determination of photointencity distribution.
Figure 36:
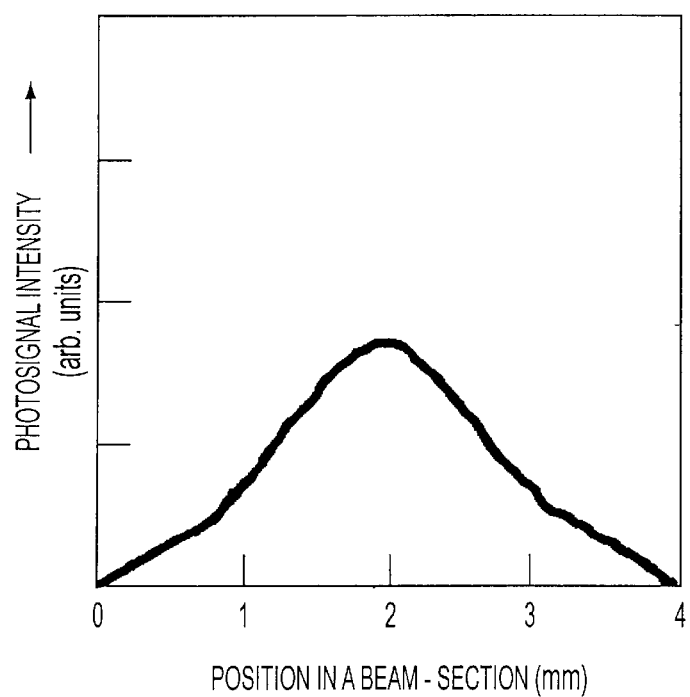
FIG. 36 is a drawing showing the photointencity distribution in the beam-section of the signal light.
Figure 37:
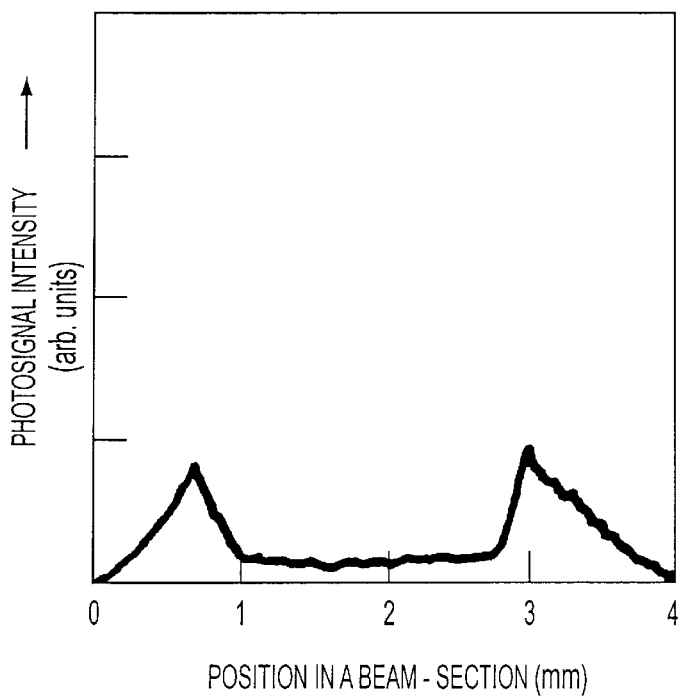
FIG. 37 is a drawing showing the photointencity distribution in the beam-section of the signal light.
Figure 38:
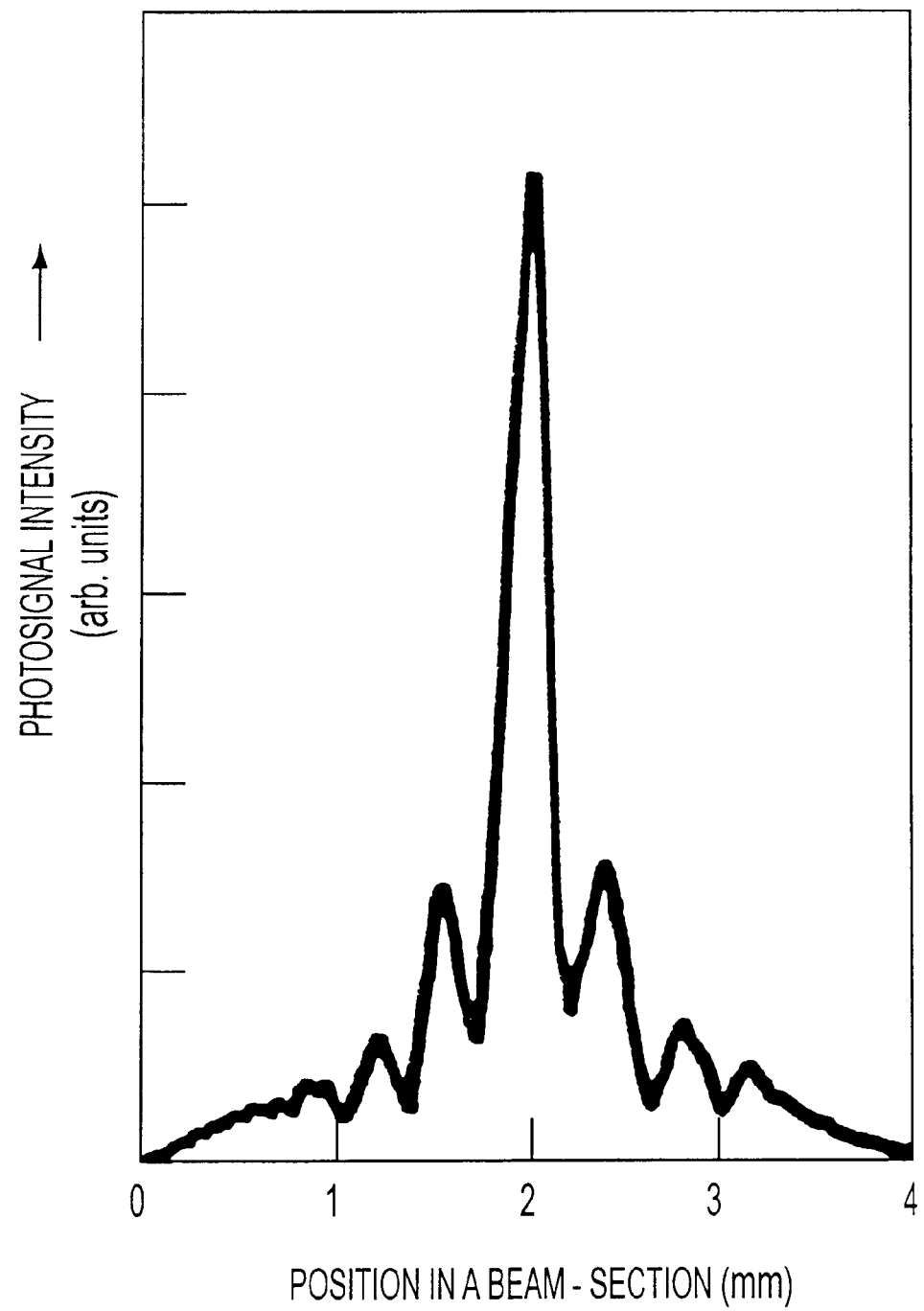
FIG. 38 is a drawing showing the photointencity distribution in the beam-section of the signal light.

In order to examine the mechanisms to cause such alterations in the photoresponse, changes in the distribution of photointencity on the beam-section of signal light beam occurring when the light control was carried out were examined. That is, in the apparatus shown in FIG. 31, after the collimate lens 9 was changed to the one with the numerical aperture larger (for example 0.75) than that (in this embodiment 0.65) of the converging lens 7, the aperture stop 19 was detached, and a photointencity distribution measuring instrument was installed in place of the photodetector 22. Under these conditions, all the bundles of rays which had transmitted the film photoelement 8 were intercepted and converged with the collimate lens 9, and radiated to the light-receiving part 31 (effective diameter, 4 mm) of said photointencity distribution measuring instrument, and the photointencity distribution on the beam-section of bundle of rays of signal light beams was measured. Results of the measurement are shown in FIGS. 36, 37 and 38. Herein, as shown in FIG. 35, the photointencity distribution measuring instrument is an instrument it is wherein equipped with the first 1-mm wide slit 32 for the light-receiving aperture 31 (effective aperture 4 mm), and wherein the second 25 $\mu$m wide slit 33 was moved in the length direction of said first slit, that is, in the direction of the points X to Y in FIG. 35 at a constant speed, and the photointencity passing through a rectangular window of 1 mm×25 $\mu$m formed by the two slits was measured in accordance with the respective moving positions of said window. In order to measure the photointencity in accordance with the moving positions of said window, for example, it is preferable to record the output of the detector receiving the light passing through said window on a storage oscilloscope synchronized with the moving velocity of the second slit 33. FIGS. 36 through 38 show the photointencity distribution on the beam-section of bundle of rays of signal light beams recorded on the storage oscilloscope, wherein the abscissa (positions in a beam-section) corresponds the positions in the direction from the point X to the point Y in FIG. 35, and the ordinate represents the photointencity.

FIG. 36 shows the photointencity distribution in said beam-section of the signal light in the case wherein the control light did not enter the film photoelement 8, but only the signal light entered it. The photointencity distribution in this case shows that the photointencity is strong in the central area, decreasing toward the peripheral areas (a near Gaussian distribution).

FIG. 37 shows the photointencity distribution in the signal beam-section of signal light when the control light was illuminated under the conditions wherein the position at which the converged beam diameter became minimum (the focal point Fc) was set up in the proximity of the converging lens 7 of the film photoelement 8 (on the side of the incident beam), and wherein the photo-response 222 in the direction of decreasing the apparent photointencity of the signal light was observed when the control light was illuminated. The photointencity distribution in this case shows that the photointencity is weak in the central area, increasing toward the peripheral areas. The photointencity in the central area of the beam-section of signal light decreases depending on the photointencity of control light and the positional relationship between the film photoelement 8 and the focal point, nearing zero with the increasing photointencity of control light. Therefore, in this case, the photoresponse 222 of a sufficiently large magnitude in the direction of decreasing the photointencity of signal light corresponding to the turning on and off of the control light can be taken out by extracting only the central area of the beam-section of signal light, and measuring the apparent photointencity of signal light.

FIG. 38 shows the photointencity distribution in the beam-section of signal light do when the control light was illuminated under the conditions wherein the position at which the converged beam diameter became minimum (the focal point Fc) was set up in the proximity of the collimate lens 9 of the film photoelement 8 (on the side of the exiting beam), and wherein the photo-response 223 in the direction of increasing the apparent photointencity of signal light was observed when the control light was illuminated. In this case, the photointencity in the central area is stronger than the corresponding photointencity in the central area when the control light is not illuminated (FIG. 36). In this case, the photointencity in the central area of the beam-section of signal light varies depending on the photointencity of control light and the positional relationship between the film photoelement 8 and the focal point, reaching a several times higher value than that when the control light is not illuminated. Therefore, in this case, the photoresponse 223 of a sufficiently large magnitude in the direction of increasing the photointencity of signal light can be taken out by extracting only the central area of the beam-section of signal light, and measuring the apparent photointencity of signal light.

From the above-described experiments, it becomes clear that the modulation of the photointencity of signal light by turning on and off of the control light (photoresponse) occurs greatly especially in the central area of the beam-section of the signal light beam (bundle of rays). Therefore, contrary to the principle of the present invention, when all the signal beams transmitting the film photoelement 8 are captured and intercepted with the photodetector by making the numerical aperture of the collimate lens 9 larger than the numerical aperture of the converging lens 7, the photoresponse thus detected becomes remarkably smaller as compared with the case of the present invention. In addition, the photodetector tends to pick up the noise component other than the fractions modulated by the control light, resulting in remarkably deteriorated S/N ratios.

COMPARATIVE EXAMPLE 1

When a thin film (50 $\mu$m thick) made of the matrix material only was prepared in a similar manner as described in Embodiment 1 except for the single use of poly(benzyl methacrylate) without using dye, and the evaluation test of the photoresponse was carried out with this thin film similarly as in Embodiment 1, the photointencity of the signal light (wavelength 830 nm) was not modulated at all even by turning on and off the control light (wavelength 633 nm). That is, it has been confirmed that the photoresponse is not observed at all with the matrix materials only. Therefore, it is obvious that the photoresponse observed in Embodiment 1 is resulted from the dye present in said photoelement.

EMBODIMENT 2

Figure 39:
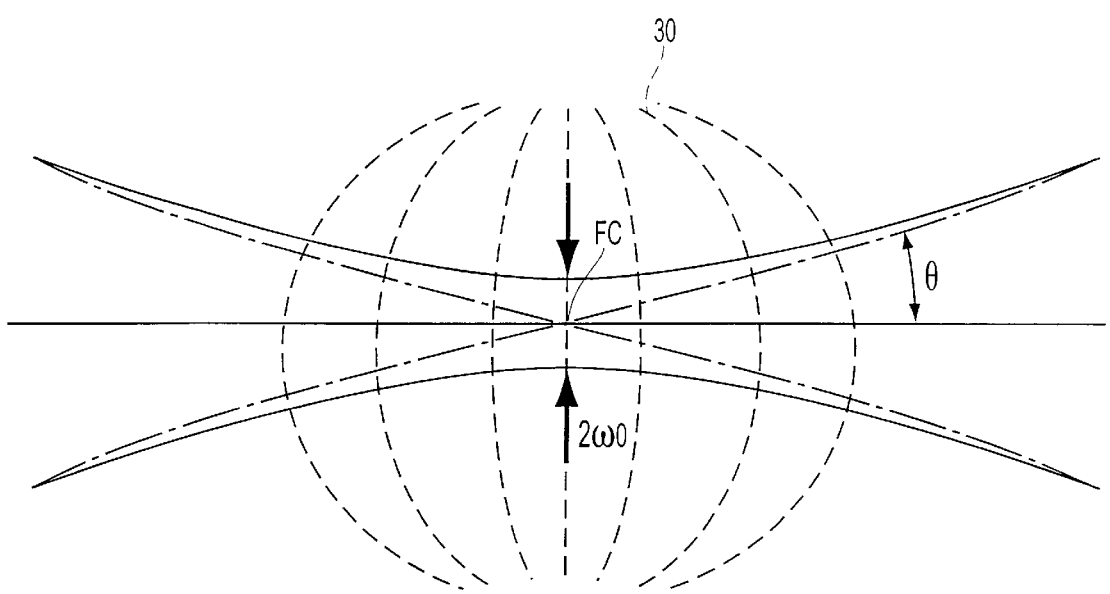
FIG. 39 is a schematic drawing showing the situation of the Gaussian beam converged with a converging lens, etc. in the vicinity of the focal point.

In order to make the photoresponse as large as possible in the method of controlling light and the apparatus of controlling light of the present invention, said control light and said signal light may be converged respectively and illuminated to said photoelement, and, furthermore, the optical paths of said control light and said signal light may be aligned such that the regions having the highest photon density in the proximity of the focal points of said control light and said signal light respectively are overlapped each other in said photoelement. For that purpose, the signal and control lights are preferably propagated on essentially the same optical path. Also, in the case of a Gaussian beam having a Gaussian distribution of the amplitude of electric field of said control light and said signal light, the state of the bundle of rays and the wave surface 30 in the vicinity of the focal point Fc when converged at the angular aperture 2θ using the converging lens 7, etc. are shown schematically in FIG. 39. Herein, the position at which the diameter $2\omega_0$ of a Gaussian beam having the wavelength $\lambda$ becomes minimum, that is, the radius $\omega_0$ of the beam waist is given by the following equation:

$$\omega_0 = \lambda/(\pi \cdot \theta)$$

For example, the radius $\omega_0$ of the beam waist calculated to be 1.02 $\mu$m, when the control light having the wavelength 633 nm and the beam diameter 2 mm was converged using the converging lens (the focal length 5 mm, and the numerical aperture 0.65) used in Embodiment 1, and similarly, the radius $\omega_0$ of the beam waist is calculated to be 0.392 $\mu$m (approximately the limit of diffraction) when the signal light (wavelength 830 nm, and the beam diameter 8 mm) is converged.

Figure 40:
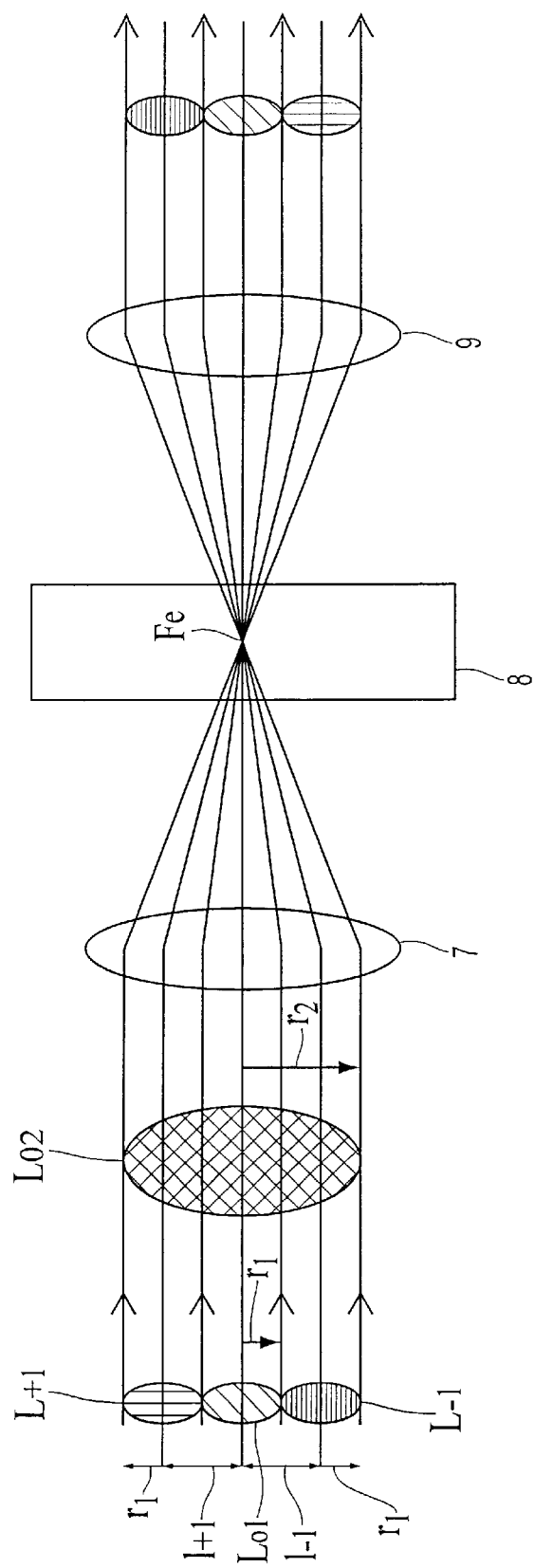
FIG. 40 is a schematic drawing showing the relationship between the optical paths (and optical axes) of the control light and the signal light.

In the following cases, in FIG. 40 the signal light and the control light are regarded to be on an "essentially the same optical path" wherein, 1. the axes of control light and signal light are parallel each other, and the optical path of signal light, for example, any one of its beam-sections $L_{+1}$, $L_{01}$ or $L_{-1}$ (radius $r_1$; $r_1 \leq r_2$) overlaps in the optical path of control light, for example, in its beam-section $L_{02}$(radius $r_2$), and propagates,
2. the axes of control light and signal light are parallel each other, and the optical path of control light, for example, any one of its beam-sections $L_{+1}$, $L_{01}$ or $L_{-1}$ (radius $r_1$; $r_1 \leq r_2$) overlaps in the optical path of signal light, for example, in its beam-section $L_{02}$ (radius $r_2$), and propagates, and
3. the axes of control light and signal light are parallel each other (distances between the axes, $\mathbf{1}_{+1}$ and $\mathbf{1}_{-1}$ or $\mathbf{1}_{+1}$ and $+\mathbf{1}_{-1}$), and the optical path of control light is any one of the beam-sections $L_{+1}$, $L_{01}$ or $L_{-1}$, and the optical path of signal light is also any one of the beam-sections $L_{+1}$, $L_{01}$ or $L_{-1}$.

Data in Table 1, as one example, show the variations of the photoresponse of signal light $\Delta T$ when, with the optical path of signal light being fixed to its beam-section $L_{02}$ (diameter 8 mm), the optical path (optical axis) having its beam-sections $L_{+1}$, $L_{01}$ or $L_{-1}$ (diameter 2 mm) is moved ±1.2 mm in parallel keeping the distance between the axes as $1_{+1}$ and $1_{-1}$, under the conditions wherein, using a microscope objective having the numerical aperture 0.65 as the converging lens 7, and a microscope lens having the numerical aperture 0.4 as the collimate lens 9, the position at which the converged beam diameter becomes minimum (the focal point Fc) is set up in the vicinity of the converging lens 7 of the film photoelement 8, and wherein the photoresponse 222 in the direction of decreasing said photointencity of signal light which has transmitted said photoelement is observed. Although the photoresponse is maximum when the photoaxes of signal light and control light are completely coincided, the magnitude of the photoresponse $\Delta T$ varies only by about points even though the distance between the axes, $1_{+1}$ or $1_{-1}$ deviates by about ±0.6 mm.

That is, it has been proved that said photoresponse becomes maximum when, under the conditions wherein the optical paths of said control light and signal light are placed respectively such that the regions with the highest photon density (beam waist) in the vicinity of the focal points of converged signal light and control light respectively overlap each other in said photoelement, the overlapping of these region becomes maximum, that is, when the optical paths of said control light and said signal light are completely coincided, and also that a sufficiently large photoresponse is obtained when the optical paths of said control light and said signal light are essentially the same.

TABLE 1

| Parallel moving distance of control light (633 nm) 1/mm | Photoresponse of signal light (830 nm) $\Delta T/\%$ |
|---|---|
| −1.2 | 34 |
| −0.9 | 64 |
| −0.6 | 81 |
| −0.3 | 86 |
| 0.0 | 89 |
| +0.3 | 85 |
| +0.6 | 82 |
| +0.9 | 64 |
| +1.2 | 35 |

EMBODIMENT 3

In the following, there will be described a case wherein a photocell 800 or 810 the interior shape of which is of thin film is filled in with a liquid photoresponsive composition is used in place of the film photoelement 8 in the apparatus of controlling light the schematic configuration of which is shown in FIG. 31. In addition, such construction and configuration of an apparatus of controlling light as shown in FIG. 31 can be preferably used, in addition to the case wherein a photocell the interior shape of which is of a thin film, in the cases wherein photocells the exterior and interior shapes of which are plate-shaped, rectangular parallelepiped-shaped, column-shaped, semicolunn-shaped, square pillar-shaped, etc.

Figure 41:
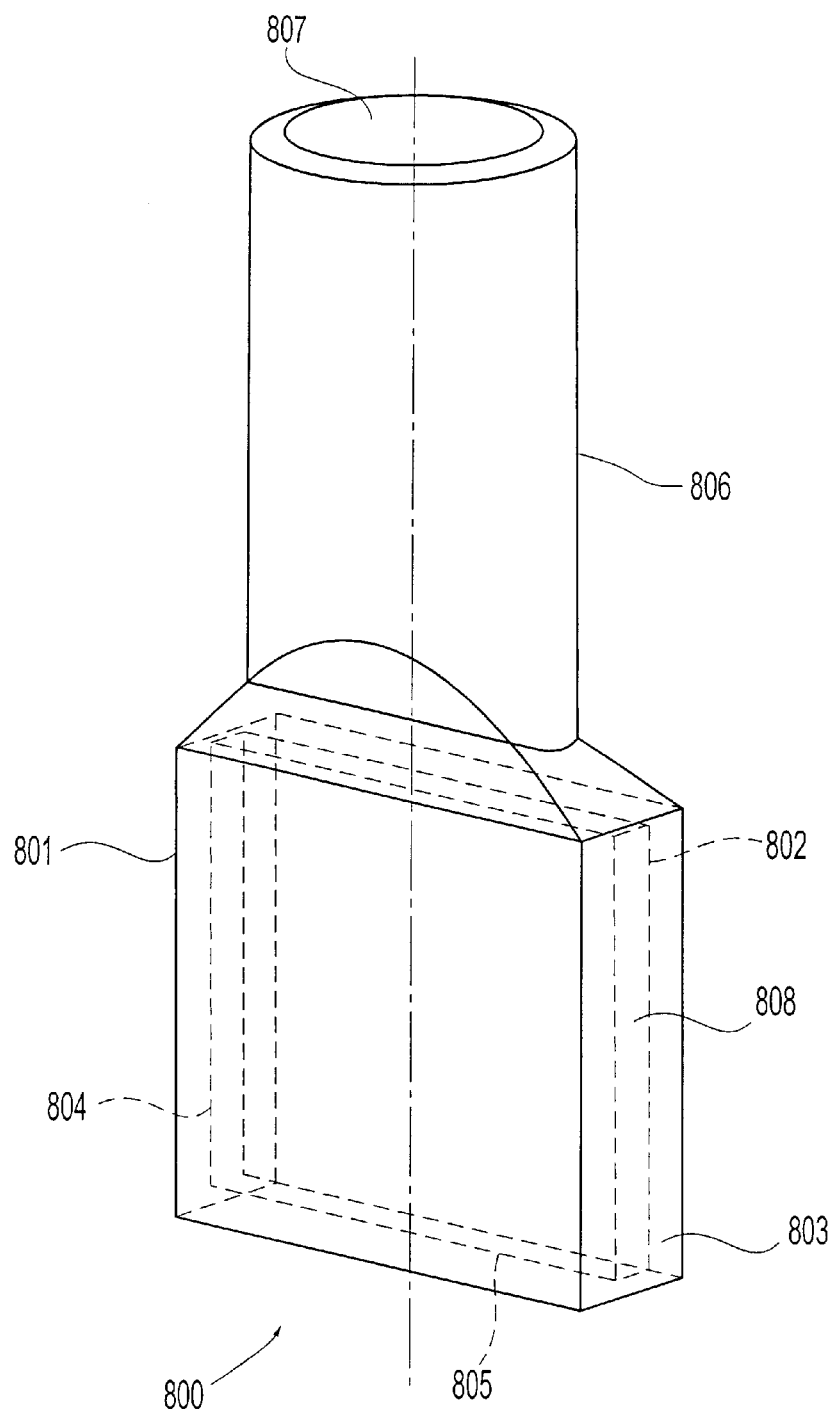
FIG. 41 is a schematic drawing exemplifying the photocell made of optical glass or quartz glass.
Figure 42:
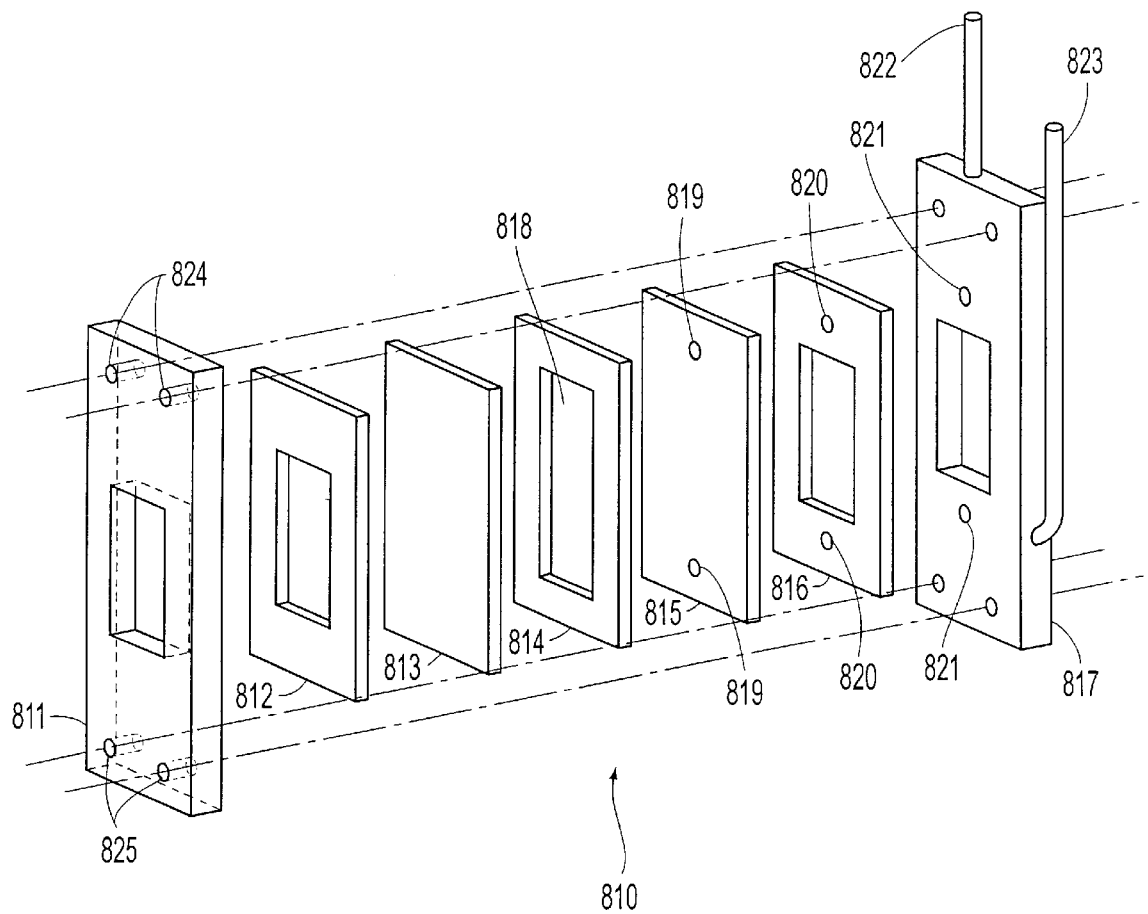
FIG. 42 is a schematic drawing exemplifying the construction components of a sectional photocell.

Herein, photocells the interior shapes of which are of thin film type have the following construction:
1. a cell 800 made of optical glass or quartz glass (FIG. 41), and
2. a sectional photocell 810 composed of two layered plate glasses having a spacer or rubber packing between them, and fixed with a fastening metal frame (FIG. 42).

The optical glass-made or quartz glass-made cell 800 as shown in FIG. 41 is comprised of the light-entering-exiting plate glasses 801 and 802, the side plate glasses 803 and 804, and the bottom plate glass 805, forming a filling space for liquid photoresponsive composition 808. As the glass materials, in addition to quartz glass, optic glasses such as soda glass, borosilicate glass, etc. can be used, and cells can be made by the known glass-processing techniques. In order to attain the precision as the photocell, it is necessary to maintain the flatness and parallelism of the light-entering-exiting plate glasses 801 and 802 at a high level at the time of glass-processing. Liquid photoresponsive compositions are filled in from the introduction opening 807 via the introduction duct 806. By inserting, for example, a polytetrafluoroethylene-made stopper to the introduction opening 807, or sealing the introduction opening 807 with glass-processing techniques, the liquid photoresponsive composition which has been filled in can be sealed in the photocell, filing the functional requirement of said photocell. Except for the cases wherein glass-corrosive solutions, for example, such as a strong alkaline liquid, hydrofluoric acid or borokydrofluoric acid, etc. are used, the optical glass- or quartz glass-made photocell 800 can be widely used when it is filled in with liquid photoresponsive compositions comprised of a large majority of organic or inorganic matrix materials. Especially, said cell is useful when acids such as hydrochloric acid, sulfuric acid, aqua regia, chlorosulfonic acid, methanesulfonic acid, trifluoromethanesulfonic acid, chloroacetic acid, trichloroacetic acid, acetic acid, etc. are used as the matrix materials.

Cells having similar shape as that of the optical glass-made photocell 800 shown in FIG. 41 can be made of a transparent plastic (organic glass) such as methyl polymetacrylate, polystyrene, polycarbonate, etc., and used as the photocell. However, in this case, in order to prevent the matrix materials from dissolving or corroding said plastics, it is necessary to carefully select and combine materials.

In the sectional photocell 810 shown in FIG. 42, the spacer 814 having the space 818 for filling the liquid photoresponsive composition is placed between the two light-entering-exiting plate glasses 813 and 815, and these three components are placed between the fastening frames 811 and 817 via the rubber packings 812 and 816, then tightly fastened using the fastening screw holes 824 and the screws 825 (not shown in the figure). The introduction ducts 822 and 823 installed to the fastening frame 817 are successively connected to the introduction hole 821 made on the fastening frame 817, the introduction hole 820 made on the rubber packing 816, then the introduction hole 819 made on the light-entering-exiting plate glass 815, enabling the introduction of the liquid photoresponsive composition into the filling space 818 via these introduction routes. The thickness of the filling space 818, that is, the optical path length in which the perpendicular incident signal light and/or control light propagate is defined by the thickness of the spacer 818 at the time of assembly. Since the spacer 814, the light-entering-exiting plate glasses 813 and 815, the rubber packings 812 and 816, and the fastening frames 811 and 817 all contact the liquid photoresponsive composition, they are required to be made of materials resistant to the dissolubility, penetrability, permeability and/or corrosiveness of the liquid matrix materials. Specifically, the materials of the spacer 814 are preferably optical glass, quartz glass, polytetrafluoroethylene, butyl rubber, silicone rubber, ethylene-propylene rubber, etc. Particularly, in order to realize the maintenance of both precision of said optical path and capability for sealing liquid, ato fluorine-containing polymeric materials such as polytetrafluoroethylene are preferably used. As the light-entering-exiting plate glasses 813 and 815, in addition to quartz glass, optical glasses such as synthetic sapphire, soda glass, borosilicate glass, etc. can be used. In addition, in the case of said matrix material that is an inorganic glass-corrosive liquid, organic glasses such as methyl polymethacrylate, polystyrene, polycarbonate, etc. can be used. As the materials for the rubber packings 812 and 816, butyl rubber, silicone rubber, ethylene-propylene rubber, radiation cross-linkaged fluorine-containing resin, etc. can be used. Metallic fastening frames 811 and 817 made of stainless steel, gold-plated brass, etc. can be preferably used.

Figure 43:
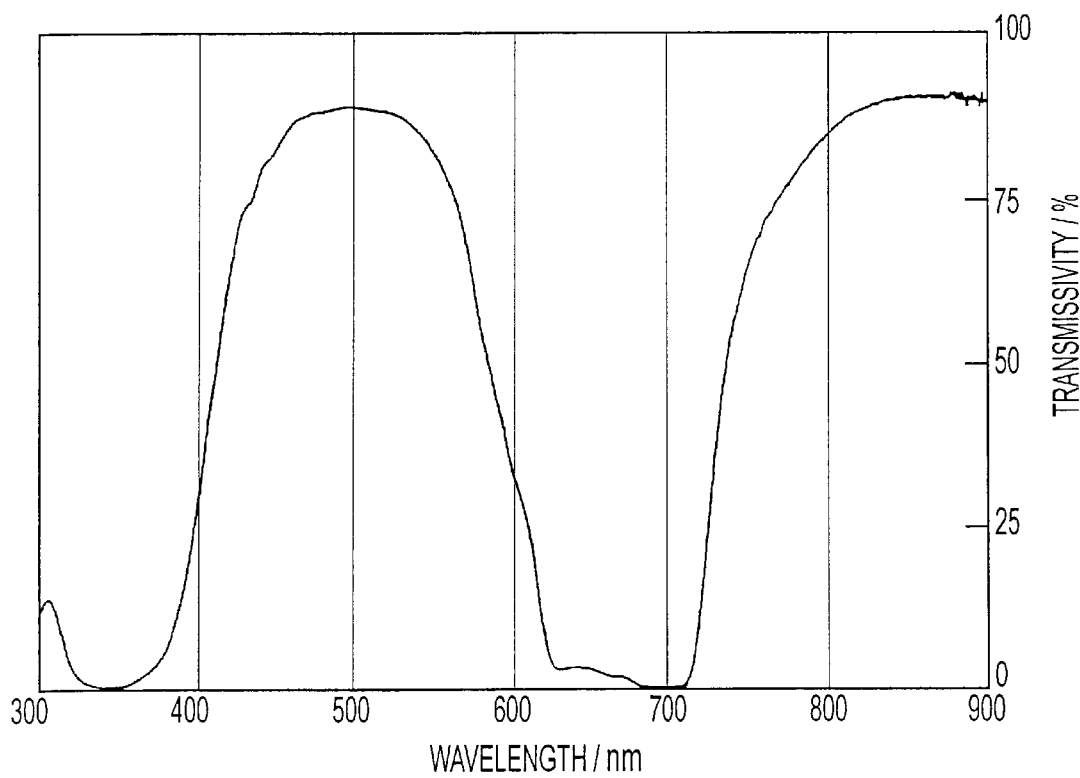
FIG. 43 is a drawing showing the transmittance spectrum of a film photocell filled in with the liquid photo-responsive composition of the third embodiment.

In the following, there will be described a case wherein a quartz-made cell 800 was prepared such that the film-thickness of liquid matrix material (the optical path length of the perpendicular incident light) was adjusted to be 50 μm, filled in with a solution of said tetra(tert-butyl)oxyvanadium phthalocyanine (a mixture of four kinds of substitution position isomers) in chloroform (concentration, $5 \times 10^{-3}$ mol/l) as the liquid photoresponsive composition, and used as the photocell 8. The transmittance spectrum of photoelement 8 in this case is shown in FIG. 43. The transmittance of this photoelement 8 was 3.4% for the wavelength (633 nm) of the control light, and 89% for the wavelength (830 nm) of the signal light This photoelement 8 (a film photocell) was installed in a similar apparatus of controlling light as in the case of Embodiment 1 (FIG. 31), and, by varying the positional relationship between the position at which the converged beam diameters of both control light and signal light become minimum (the focal point Fc) and the film photoelement 8, the direction as well as the magnitude of photoresponse of the signal light corresponding to the turning on and off of the control light were examined similarly as in the case of Embodiment 1. That is, the above examination was carried out using a semiconductor laser (oscillation wavelength 830 nm, continuous oscillation output 6 mW, a Gaussian Do0 beam of about 8 mm diameter after the beam rectification) as the light source of signal light 2, a helium-neon laser (oscillation wavelength 633 nm, a Gaussian beam of 2 mm diameter) as the light source of control light 1, a microscope lens of 20 magnifications and a numerical aperture of 0.4 as the converging lens 7, and a microscope objective of 10 magnifications and a numerical aperture of 0.3 as the collimate lens 9, with the distance ($d_{78}+d_{89}$) between the converging lens 7 and the collimate lens 9 being fixed, and by varying the distance between the photocell 800 as the film photoelement 8 and the converging lens 7 such that the position relationship between the focal points of control light and signal light converged on the same optical path and the film photocell 800 are altered.

When the incident power of control light to the film photoelement 8 was 5 mW, the maximum value of the photoresponse in the direction of decreasing the photointencity of signal light ΔT was 87%, and the maximum value of the photoresponse in the directioin of increasing the apparent photointencity of signal light ΔT' was 53%. Furthermore, when the position of focal point of control light was placed in the proximity of the incident light side of the photoresponsive composition within the photocell, and the control light was illuminated with a longer pulse interval than 1 millisecond, and the control light power was increased to higher than 10 mW, the solvent chloroform started to boil at the position of focal point of the control light. However, since the boiling of the solvent occurred extremely locally, the pressure increase within the photocell was little. Also, when the control light was shut off, the boiling stopped immediately.

COMPARATIVE EXAMPLE 2

Figure 44:
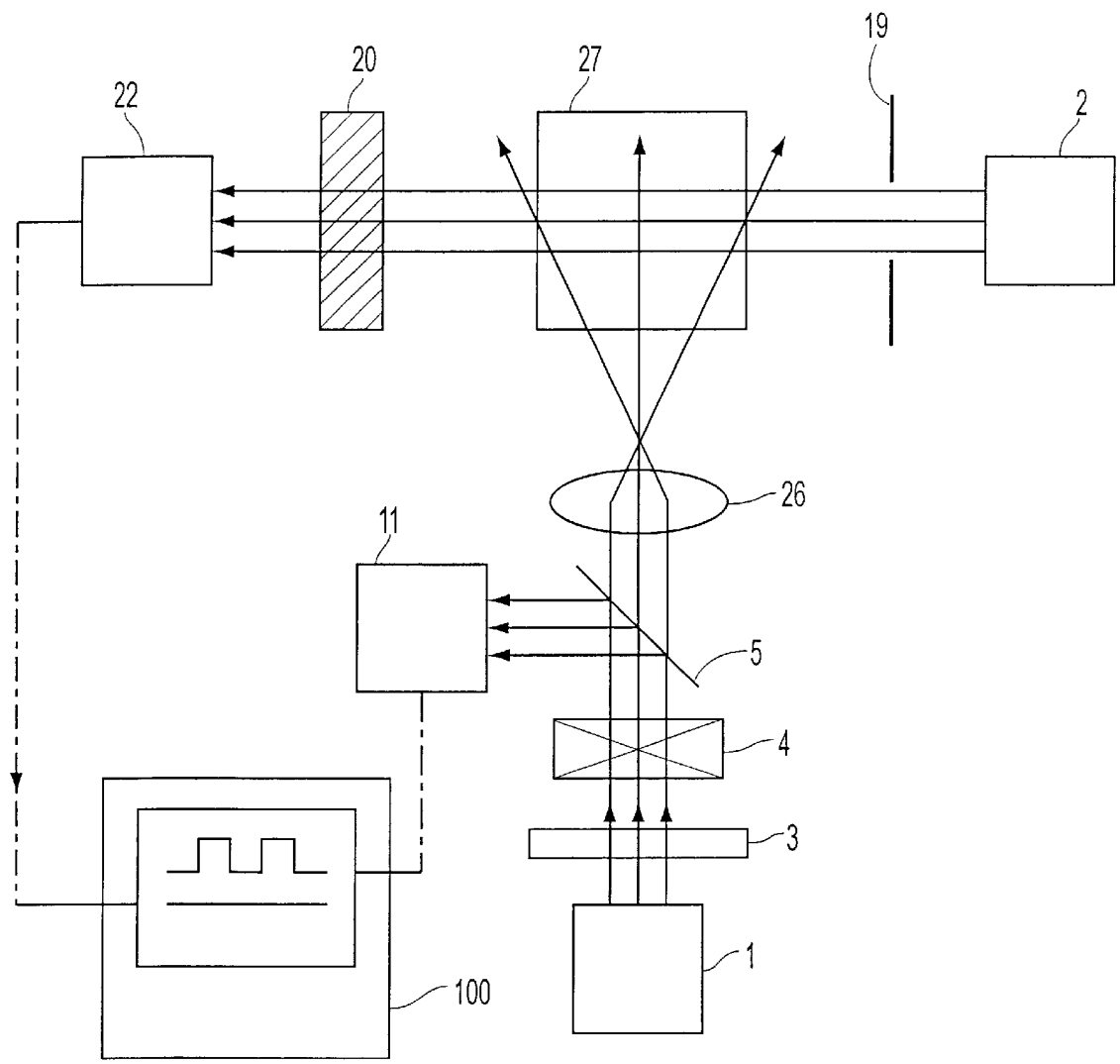
FIG. 44 is a block diagram showing the configuration of the apparatus used in the conventional arts.

In order to carry out a comparative experiment with the known arts, according to the descriptions of Japanese Patent Laidopen Publications No. Sho 53-137884, No. Sho 63-231424, and No. Sho 64-73326, light control was attempted using an apparatus in the configuration as shown in the schematic diagram of FIG. 44. That is, a quartz-made solution cell 27 having the optical path length of 1 cm was illuminated with the semiconductor laser beam (wavelength 830 nm) from the light source of signal light 2 through the aperture stop 19, and the transmitting beam was intercepted with the photodetector 22 via the band-pass filter 20, while the entire optical path of the signal light transmitting the solution cell 27 was illuminated with the control light which had been diffused using the incident lens 26 from the right angle direction of the signal light. In the configuration of apparatus shown in FIG. 44, the functions and mechanisms of the light source of signal light 1 (wavelength 633 nm), the ND filter 3, the shutter 4, the semitransparent mirror 5, and the photodetector 11 are the same as those used in Embodiments 1 or 3. Also, the band-pass filter 20 is to prevent the control light scattering from the solution cell 27 from entering the photodetector 22, and a similar one used in Embodiments 1 or 3 can be employed.

Similarly as in Embodiment 3, tetra(tert-butyl) oxyvanadium phthalocyanine was used as the dye, and examined by filling its chloroform solution into the solution cell 27. As to the dye concentration, taking the difference of the optical path length, that is, 1 cm which is 200 times of the optical path length 50 μm in the case of Embodiment 3 into consideration, it was set to one two hundredth the concentration in the case of Embodiment 3 ($2.5 \times 10^{-5}$ mol/l) such that the practical transmittance was adjusted to be equal to that of Embodiment 3. Similarly as in the case of Embodiment 3, the power of the incident control light to the photoelement (the solution cell 27) was adjusted in the range of 0.5 mW to 25 mW with the ND filter 3, and the control light was turned on and off using the shutter 4. However, even the elevation of the control light power to the maximum value resulted in no modulation of the incident signal light to the photodetector 22 at all. That is, when the control light power was adjusted in the range of 0.5 mW to 25 mW, the light-light control could not be achieved in the apparatus construction-apparatus configuration shown in FIG. 44.

EMBODIMENT 4

Figure 45:
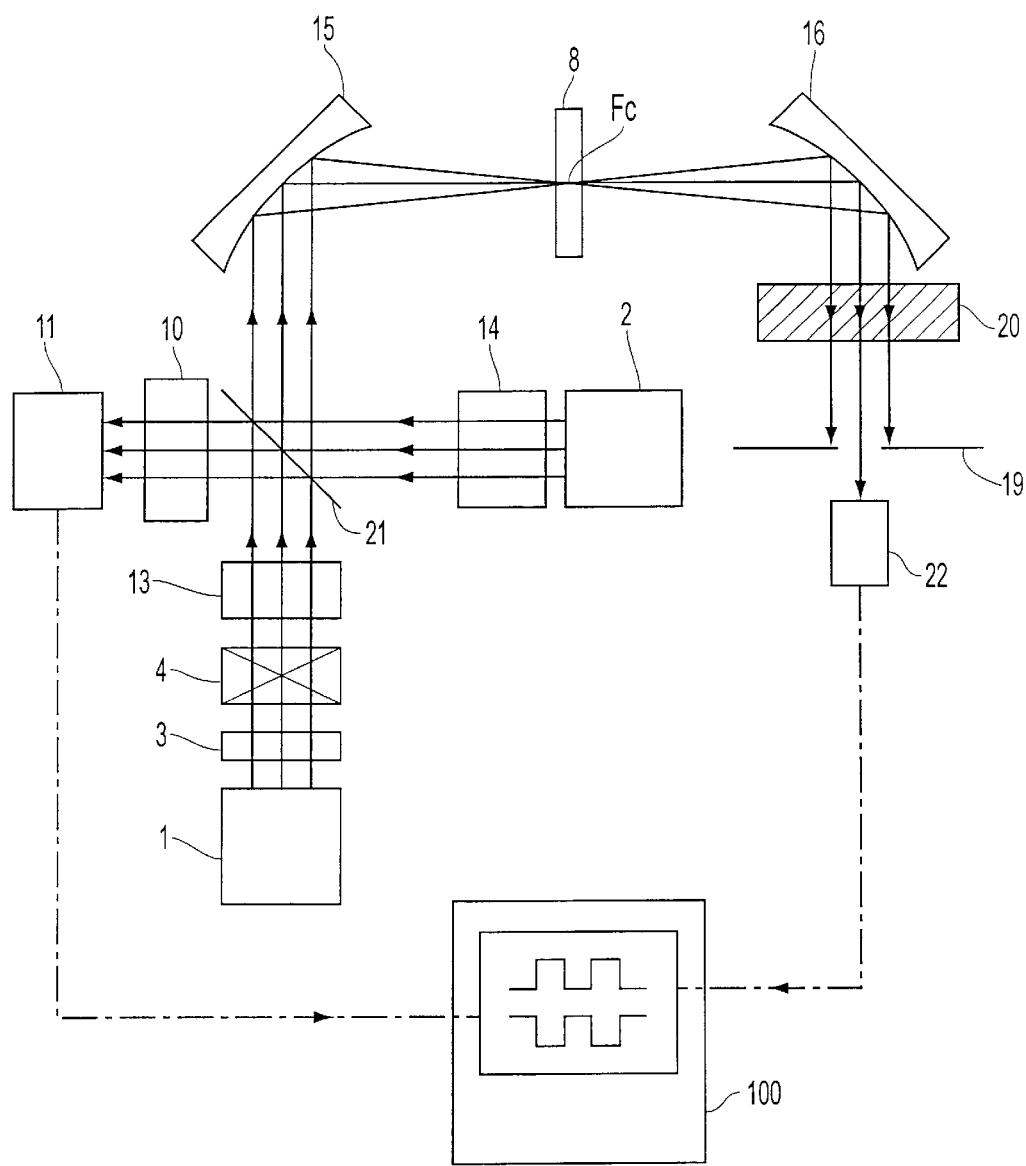
FIG. 45 is a block diagram showing the configuration of the fourth embodiment of the apparatus used for carrying out the present invention.

FIG. 45 shows the schematic diagram of an apparatus of controlling light of the present Embodiment. Such construction and configuration of the optical apparatus can be used preferably, in addition to the film photoelement 8 shown in FIG. 45 as an example, in the cases wherein photoelements of fiber-shape, optical waveguide-shape, microchannel alley-shape, etc. are employed, and wherein a photocell filled in with liquid photoresponsive composition is used.

As to the light sources 1 and 2, ND filter 3, shutter 4, photodetectors 11 and 22, film photoelement 8, band-pass filter 20, and oscilloscope 100, similar ones to those of Embodiment 1 (FIG. 31) were employed.

By using a dichroic mirror 21 in the configuration shown in FIG. 45, it is possible to divide the control light and monitor its photointencity with the photodetector 11, at the same time overlap the optical paths of control light and signal light, and omit the optical mixer 6 required in the configuration shown in FIG. 31. However, in the configuration in FIG. 45, in order to supplement the wavelength selective transmission and reflection, it is preferable to install a band-pass filter 10 that completely blocks the signal light and only transmits the control light prior to the photodetector 11. In addition, in order to prevent the signal light and/or control light from returning to the light sources 1 and 2 and exerting harmful influence on the light source apparatus, the photoisolators 13 and 14 may be installed respectively prior to the light sources 1 and 2.

As a means of light convergence for converging together the signal light and control light the optical paths of which have been coincided and illuminating them to the film photoelement 8, in place of the converging lens 7 and the collimate lens 9, concave mirrors 15 and 16 can be used in the configuration shown in FIG. 45. In the case of the use of lens as the common means of converging signal and control lights, strictly speaking, there is a problem that focal length differs according to wavelength, but this is not a problem with concave lenses.

In the apparatus of controlling light exemplified in FIG. 45, in order to differentiate and extract, out of the bundle of rays of signal light, those in the region wherein they undergo profound modulation of said photointencity and/or luminous flux density and emit after transmitting said photoelement or reflecting from it, the following methods can be employed:

1. a method of installing an aperture stop 19 prior to the photodetector 22,
2. a method wherein the angular aperture of a concave mirror 16 on the light-receiving side is made smaller than the angular aperture of a concave mirror 15 on the light-reflecting side, and
3. a method wherein the angular aperture of a concave mirror 16 on the light-receiving side is maade smaller than the angular aperture of a concave mirror 15 on the light-reflecting side, and furthermore, an aperture stop 19 is installed prior to a photodetector 22.

In the apparatus of controlling light of the present invention exemplified in FIG. 45, the essential elements of this apparatus construction include the light sources 1 and 2, dichroic mirror 21, band-pass filter 20, concave mirrors 15 and 16, and film photoelement 8. In addition, in place of the dichroic mirror 21 in FIG. 45, a polarized or non-polarized beam splitter may be used.

In the procedure to carry out the method of controlling light of the present invention with an apparatus shown in FIG. 45, at first, adjustments were made such that the optical paths of control light (light source 1) and signal light (light source 2) are coincided, and the photoelement 8 is placed at the position of the common focal point (Fc) (beam waist). Then, in order to inspect the functions of the dichroic mirror 21 as well as the band-pass filters 10 and 20, it was confirmed, while the light sources 1 and 2 were alternately turned on, that there was no response in the photodetector 22 when only the light source 1 was turned on (with the shutter 4 being open), and also that there was no response in the photodetector 11 when only the light source 2 was turned on.

In the following, similarly as in Embodiment 1, the method of controlling light by light was carried out using said fllm photoelement 8, obtaining experimental results equivalent to those in the case of Embodiment 1.

EMBODIMENT 5

Figure 46:
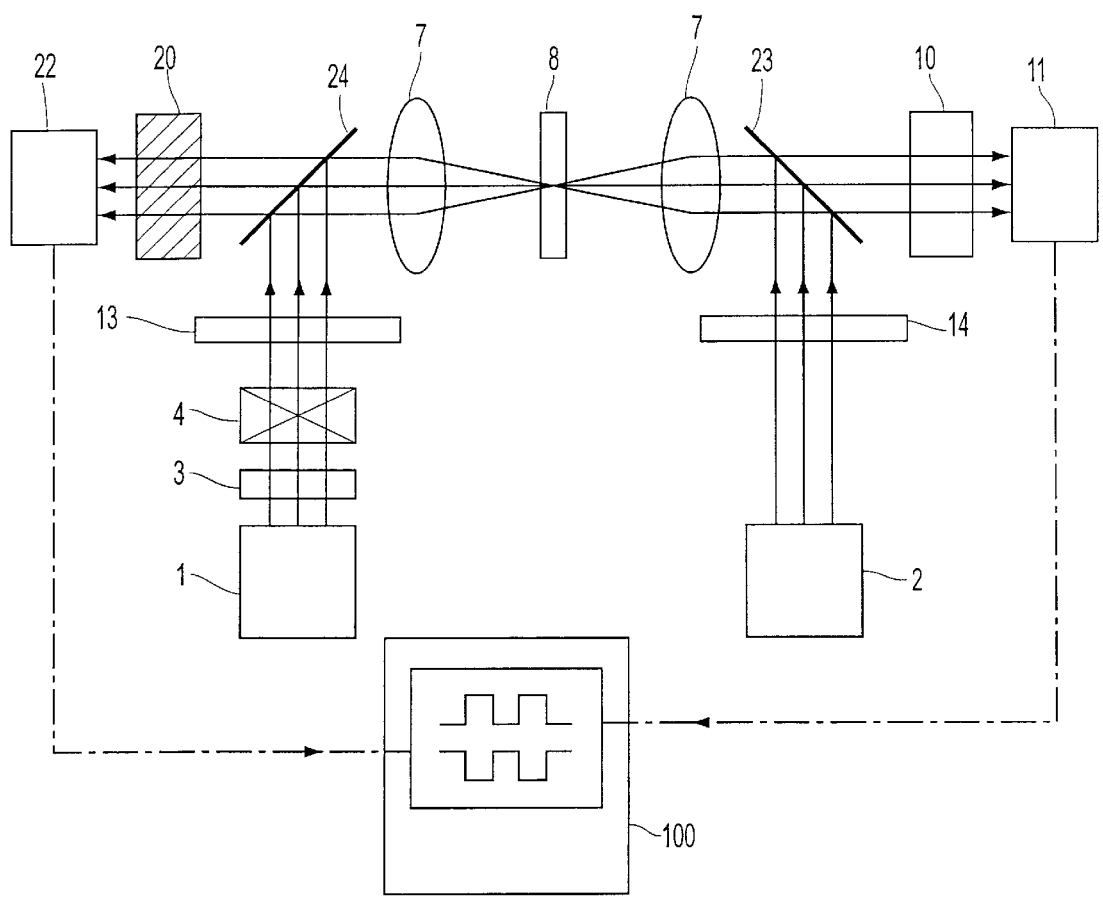
FIG. 46 is a block diagram showing the configuration of the fifth embodiment of the apparatus used for carrying out the present invention.

FIG. 46 shows the schematic diagram of an apparatus of controlling light of a fifth embodimnent In contrast to the apparatus constructions exemplified in FIGS. 31 and 45, wherein the signal light and control light are illuminated to the photoresponsive optical element from the same direction, the apparatus in FIG. 46 features that the signal light and the control light are illuminated from the opposite directions such that their photoaxes coincide and they are converged to the identical focal point.

Such construction and configuration of the optical apparatus can be used preferably, in addition to the film photoelement 8 exemplified in FIG. 46, in the cases wherein photoelements of fiber-shape, optical waveguide-shape, microchannel alley-shape, etc. are employed, and wherein a photocell filled in with liquid photoresponsive composition is used.

In the apparatus construction exemplified in FIG. 46, as to the light sources 1 and 2, ND filter 3, shutter 4, converging lens 7, film photoelement 8, band-pass filters 10 and 20, photodetectors 11 and 22, light isolators 13 and 14, and oscilloscope 100, similar ones as in Embodiment 1 (FIG. 31) ancdor Embodiment 4 (FIG. 45) can be similarly used.

By using two dichroic mirrors (23 and 24) in the configuration as shown in FIG. 46, the signal light and control light can be Muminated from the opposite directions such that their photoaxes are coincided and they are converged to the identical focal point. Moreover, the two converging lens 7 also functionally serve as the collimate lens 9 to srestore the control light and signal light which have transmitted the photoelement to the former parallel beams, respectively.

In the apparatus for controlling light of the present invention, the essential elements of the apparatus construction axe the light sources 1 and 2, two dichroic mirrors (23 and 24), band-pass filters 10 and 20, two converging lens 7, and fim photoelement 8.

In addition, in place of the dichroic mirror (23 and 24) in FIG. 46, a polarized or non-polarized beam splitter can be used.

As the procedures to carry out the method of controlling light of the present invention with an apparatus shown in FIG. 46, at first, adjustments were made sucb that the optical paths of control light (light source 1) and signal light (light source 2) are coincided, and the film photoelement 8 is placed at the position of the common focal point. Then, in order to inspect the functions of the band-pass filters 10 and 20, it was confirmed that there was no response in the photodetector 22 when only the light source of control light 1 was turned on (with the shutter 4 being open) while the light sources 1 and 2 were alternately turned on, and also that there was no response in the optical detector 11 when only the light source of signal light 2 was turned on.

In the following, similarly as in Embodiment 1, the light-light controlling method was carried out using said film photoelement 8, obtaining experimental results equivalent to those in the case of Embodiment 1.

EMBODIMENT 6

Figure 47:
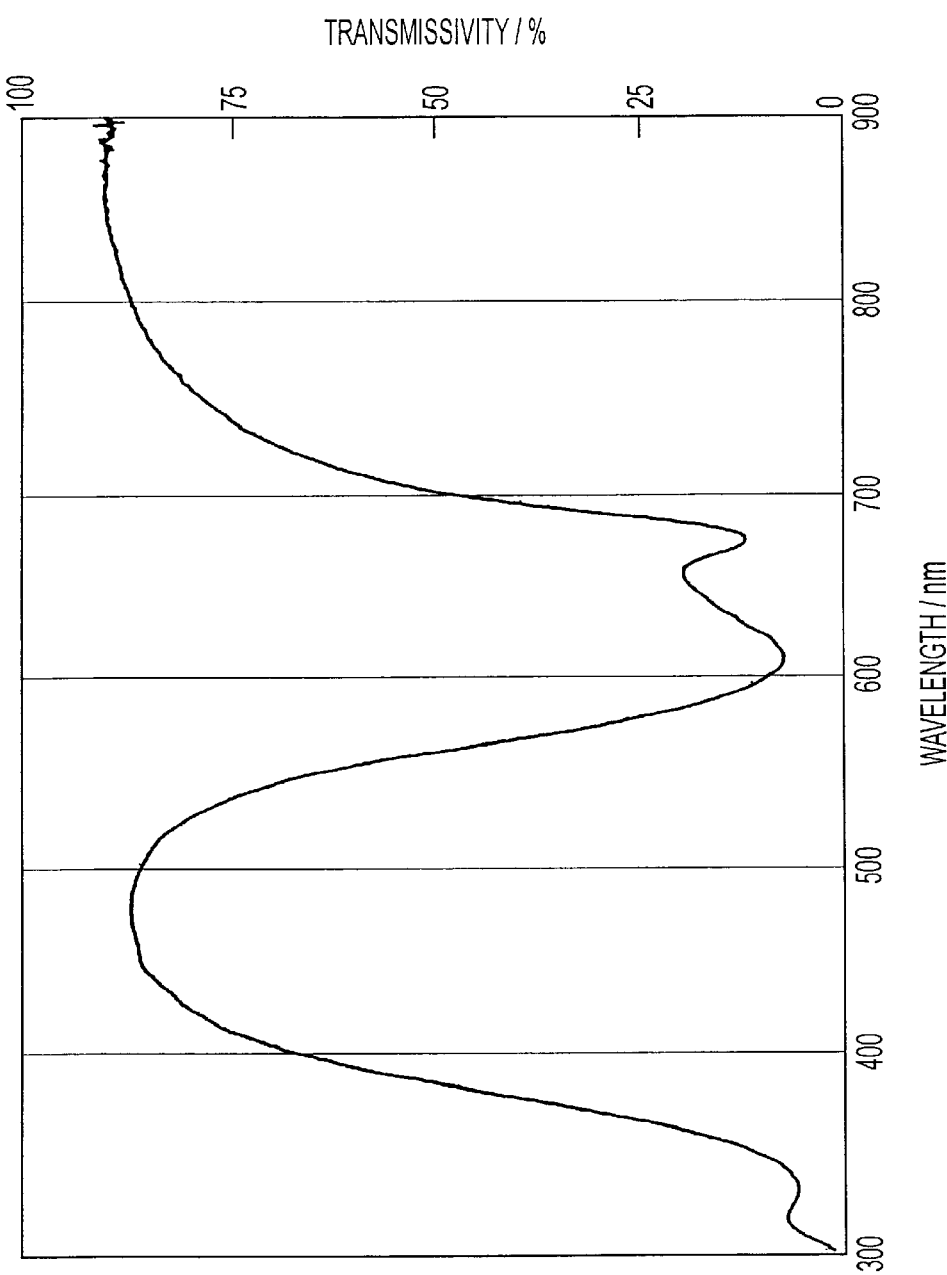
FIG. 47 is a drawing showing the transmittance spectrum of a film photo-element of the sixth embodiment.

The film photoelement 8 was prepared by similar procedures as those described in Embodiment 1 except that, in place of the tetra(tert-butyl)oxyvanadium phthalocyanine used in Embodiment 1, as the phthalocyanine compound, a mixture of four kinds of substitution position isomers (2,6, 10,14-, 2,6,10,15-, 2,6,11,15-, and 2,7,10,15-substituted derivatives) of tetra(t-butyl)copper phthalocyanine represented by the following formula 15 (6.78 mg) was used. The thickness of this film photoelement was 35 $\mu$m, and its transmittance spectrum was as shown in FIG. 47. The transmittance of this film was 12% for the wavelength (633 nm) of the control light, and 85% for the wavelength (780 nm) of the signal light.

[Formula 15]

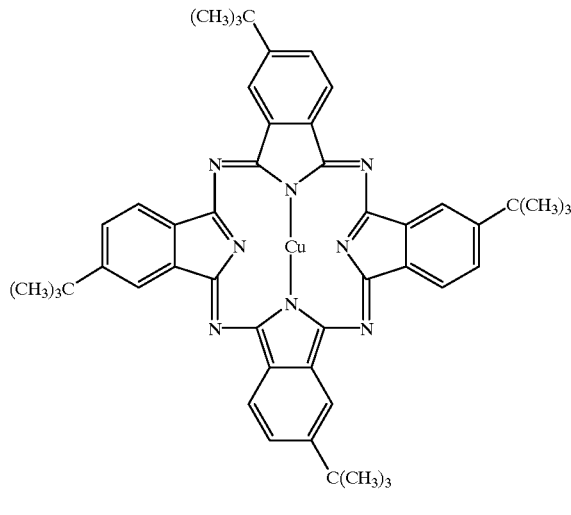

(15)

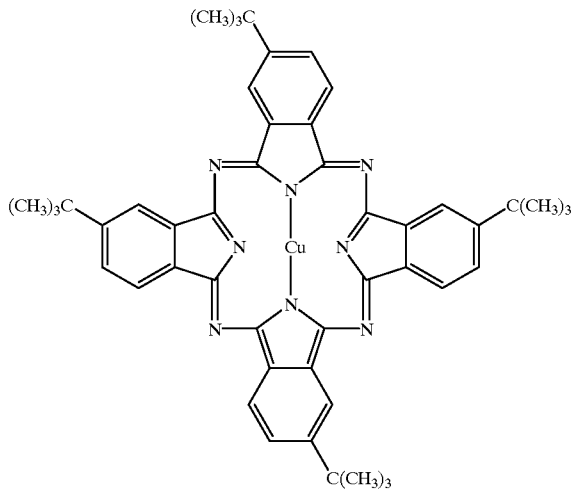

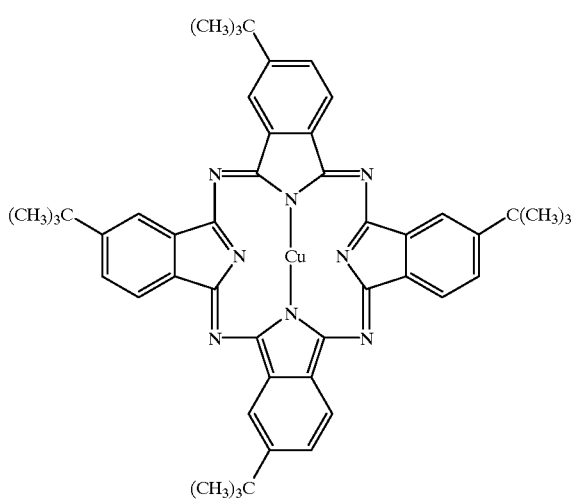

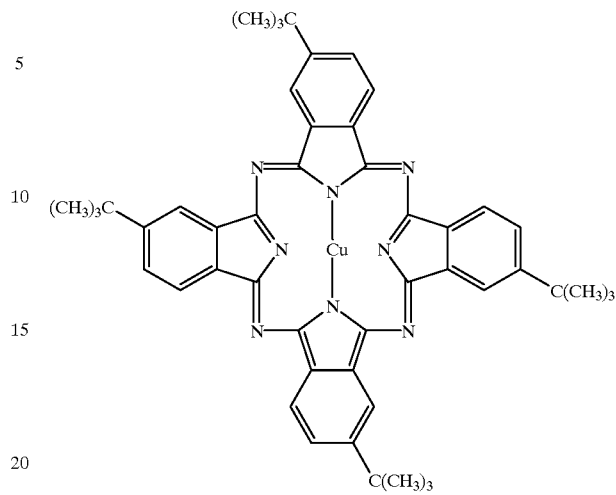

This film photoelement was installed in a similar apparatus of controlling light as in the case of Embodiment 1 (FIG. 31), and, by varying the positional relationship between the position at which the converged beam diameters of both control light and signal light become minimum (the focal point Fc) and the film photoelement 8, the direction as well as the magnitude of photoresponse of the signal fight corresponding to the turning on and off of the control light were examined similarly as in the case of Embodiment 1. However, the above examination was carried out using a semiconductor laser (oscillation wavelength 780 nm, continuous oscillation output 6 mW, a Gaussian beam of about 8 mm diameter after the beam rectification) as the light source of signal light 2, a He-Ne laser (oscillation wavelength 633 nm, a Gaussian beam of 2 mm diameter) as the light source of control light 1, a microscope lens of 20 magnifications and a numerical aperture of 0.4 as the converging lens 7, and a microscope objective of 10 magnifications and a numerical aperture of 0.3 as the collimate lens 9, with the distance ($d_{78}+d_{89}$) between the converging lens 7 and the collimate lens 9 being fixed, and by varying the distance between the film photoelement 8 and the converging lens 7 such that the position relationship between the focal points of control light and signal light converged on the same optical path and the film photoelement 8 were altered.

When the incident power of the control light was 13 mW, the maximum value of the photoresponse in the direction of decreasing the photointencity of signal light $\Delta T$ was 97%, and the maximunm value of the photoresponse in the direction of increasing the apparent photointencity of signal light $\Delta T'$ was 49%.

EMBODIMENT 7

Figure 48:
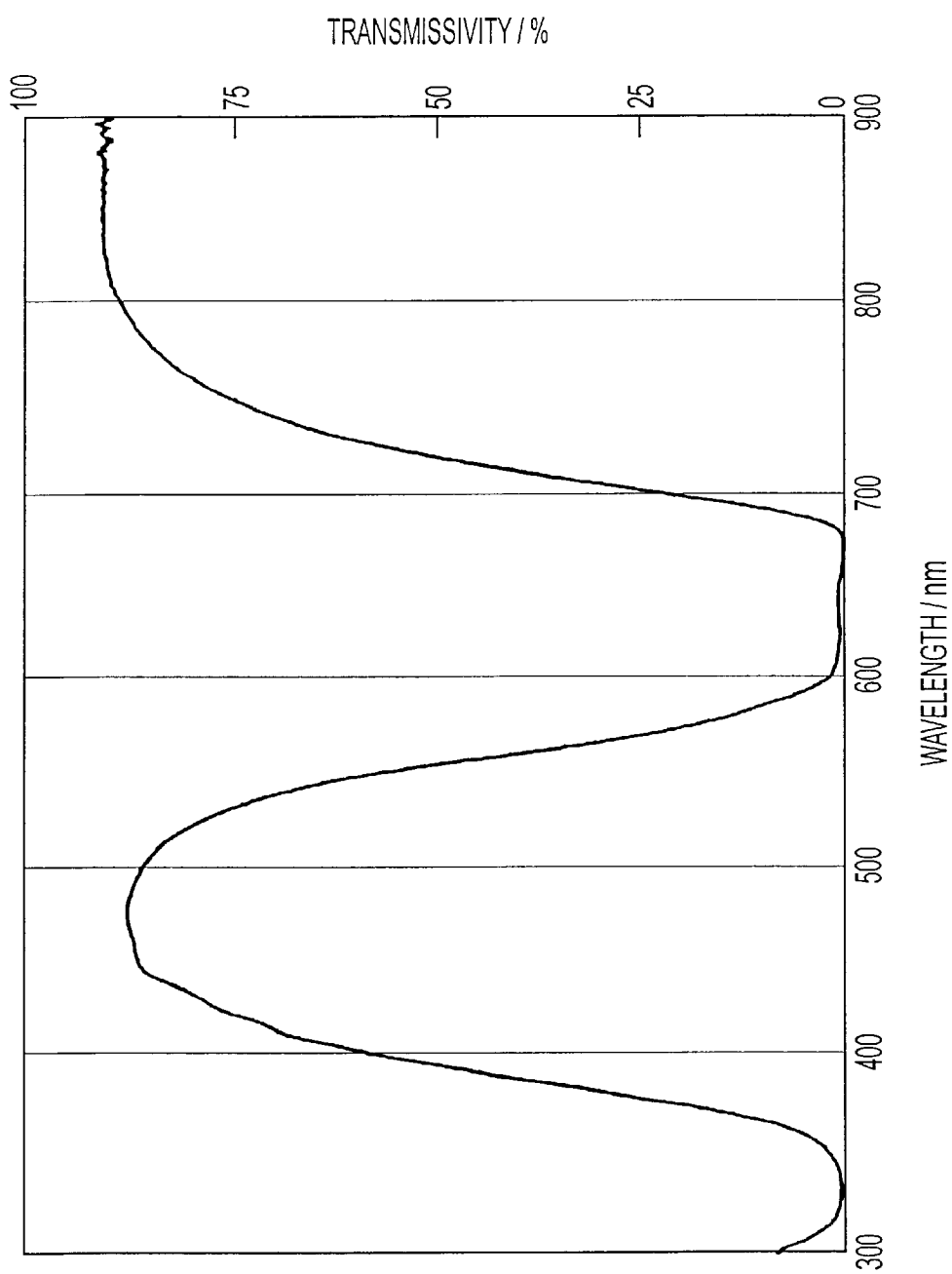
FIG. 48 is a drawing showing the transmittance spectrum of a film photocell filled in with the liquid photo-responsive composition of the seventh embodiment.

The film photoelement 8 was prepared similarly as described in Embodiment 3 using, in place of said tetra(tert-butyl)oxyvanadium phthalocyanine (a mixture of four kinds of substitution position isomers) in Embodiment 3, tetra(tert-butyl)copper phthalocyanine (a mixture of four kinds of substitution position isomers) represented by said Formula 15 as the phthalocyanine compound, with other conditions being kept the same as in Embodiment 3, and filling in the photocell 800 (the optical path length 50 μm) with a solution of said phthalocyanine compound in chloroform (the concentration $5 \times 10^{-3}$ mol/l). The transmittance spectrum in this case is shown in FIG. 48. The transmittance of this photoelement 8 was 0.5% for the wavelength (633 nm) of the control light, and 91% for the wavelength (830 nm) of the signal light.

Using said photocell 800, by varying the positional relationship between the position at which the converged beam diameters of the control light and signal light become minimum (the focal point Fc) and the film photoelement 8, the direction and the magnitude of photoresponse of the signal light corresponding to the turning on and off of the control light were examined similarly as in the case of Embodiment 3. That is, the above examination was carried out using a semiconductor laser (oscillation wavelength 830 nm, continuous oscillation output 6 mW, a Gaussian beam of about 8 mm diameter) as the light source of signal light 2, a helium-neon laser (oscillation wavelength 633 nm, a Gaussian beam of 2 mm diameter) as the light source of control light 1, a microscope lens of 20 magnifications and a numerical aperture of 0.4 as the converging lens 7, and a microscope objective of 10 magnifications and a numerical aperture of 0.3 as the collimate lens 9, with the distance ($d_{78}+d_{89}$) between the converging lens 7 and the collimate lens 9 being fixed, and by varying the distance between the photocell 800 as the film photoelement 8 and the converging lens 7 such that the positional relationship between the focal points of control light and signal light converged on the same optical path and the film photocell 800 were altered.

When the incident power of the control light to the film photoelement 8 was 5 mW, the maximum value of the photoresponse in the direction of decreasing the photointencity of signal light $\Delta T$ was 89%, and the maximum value of the photoresponse in the direction of increasing the apparent photointencity of signal light $\Delta T'$ was 51%.

EMBODIMENT 8

A polymethine dye represented by the following Formula 16, that is,
(Formula 16)

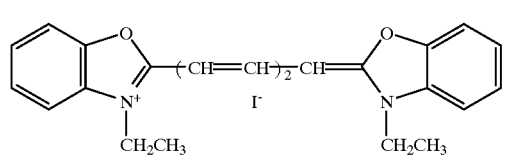

(16)

3,3'-diethyloxacarbocyanine iodide (trivial name DODCI) (23.0 mg) and poly(2-hydroxypropyl methacrylate) (1977.0 mg) were dissolved in acetone (200 ml), and this solution was poured into n-hexane (300 ml) under stirring. Precipitates (a mixture of the dye and the polymer) thus formed were filtered, washed with n-hexane, dried in vacuo, and pulverized.

By continuously heating mixed powder of the dye and polymer thus obtained under ultra-high vacuum less than $10^{-5}$ Pa at 100° C. for 2 days, the volatile fraction such as the remaining solvent, etc. was completely removed to obtain the powder of photo-resonsive composition. The powder (20 mg) was placed between a slide glass (25 mm×76 mm×1.150 mm thick) and a cover glass (18 mm×18 mm×0.150 mm), heated at 150° C. in vacuo, and then a film of the dye/polymer (film thickness 50 μm) was formed between said slide glass/said cover glass using a method of pressing two glass plates (vacuum hot pressing method). The concentration of the dye in the dye/polymer film is calculated to be $2.5 \times 10^{-2}$ mol/l with the density of the dye/polymer being taken as 1.06.

Figure 49:
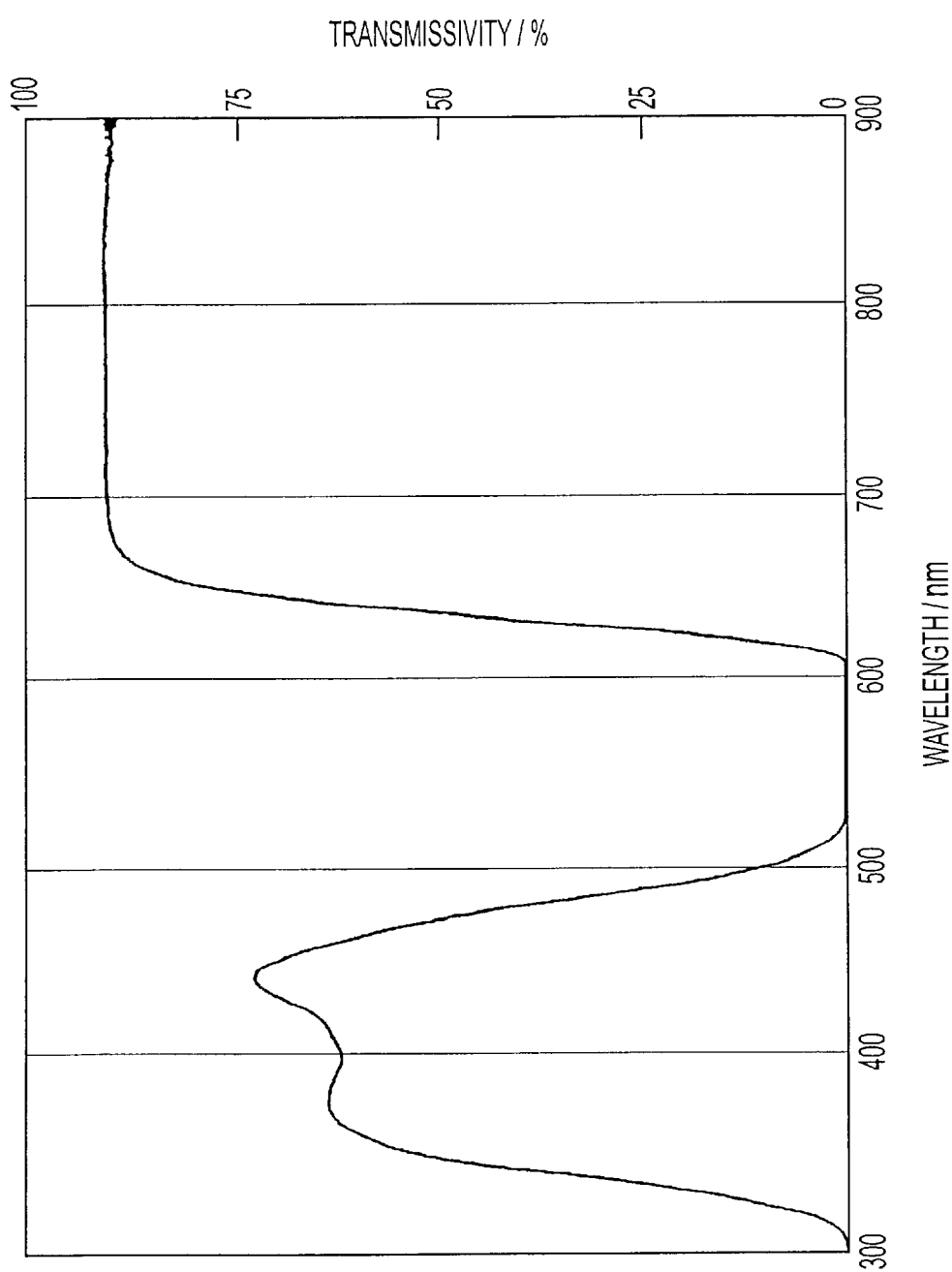
FIG. 49 is a drawing showing the transmittance spectrum of a film photo-element of the eighth embodiment.

The transmittance spectrum of the film photoelement thus prepared is shown in FIG. 49.

The transmittance of this film was 28.3% for the wavelength (633 nm) of the control light, and 90.2% for the wavelength (694 nm) of the signal light.

Using such photoelement 8 as above, and a semiconductor laser (oscillation wavelength 694 nm, continuous oscillation output 3 mW, a Gaussian beam of about 8 mm diameter after the beam normalization) as the light source of signal light 2, with other conditions being kept the same as in Embodiment 4, by varying the positional relationship between the position at which the converged beam diameters of the control light and signal light become minimum (the focal point Fc) and the film photoelement 8, the direction as well as the magnitude of photoresponse of the signal light corresponding to the turning on and off of the control light were examined.

When the incident power of the control light was 24 mW, the maximum value of the photoresponse in the direction of decreasing the photointencity of signal light $\Delta T$ was 83%, and the maximum value of the photoresponse in the direction of increasing the apparent photointencity of signal light $\Delta T'$ was 44%.

EMBODIMENT 9

A triarytnethane dye represented by said Formula 12 (trivial name Brilliant green) (3.97 mg) aid poly-(2-hydroxypropyl methacrylate) (1996.03 mg) were dissolved in acetone (200 ml), and this solution was poured into n-hexane (800 ml) under stirring. Precipitates (a mixture of the dye and the polymer) thus formed were filtered, washed with n-hexane, dried in vacuo, and pulverized.

By continuously heating mixed powder of the dye and polymer thus obtained under ultra-high vacuum less than $10^{-5}$ Pa at 100° C. for 2 days, the volatile fraction such as the remaining solvent, etc. was completely removed to obtain the powder of photo-responsive composition. The powder (20 mg) was placed between a slide glass (25 mm×76 mm×1.150 mm thick) and a cover glass (18 mm×18 mm×0.150 mm), heated at 150° C. in vacuo, and a film of the dye/polymer (film thickness 120 μm) was formed between said slide glass/said cover glass using a method of pressing two glass plates (vacuum hot pressing method). The concentration of the dye in the dye/polymer film is calculated to be $5.0 \times 10^{-3}$ mol/l with the density of the dye/polymer being taken as 1.06.

Figure 50:
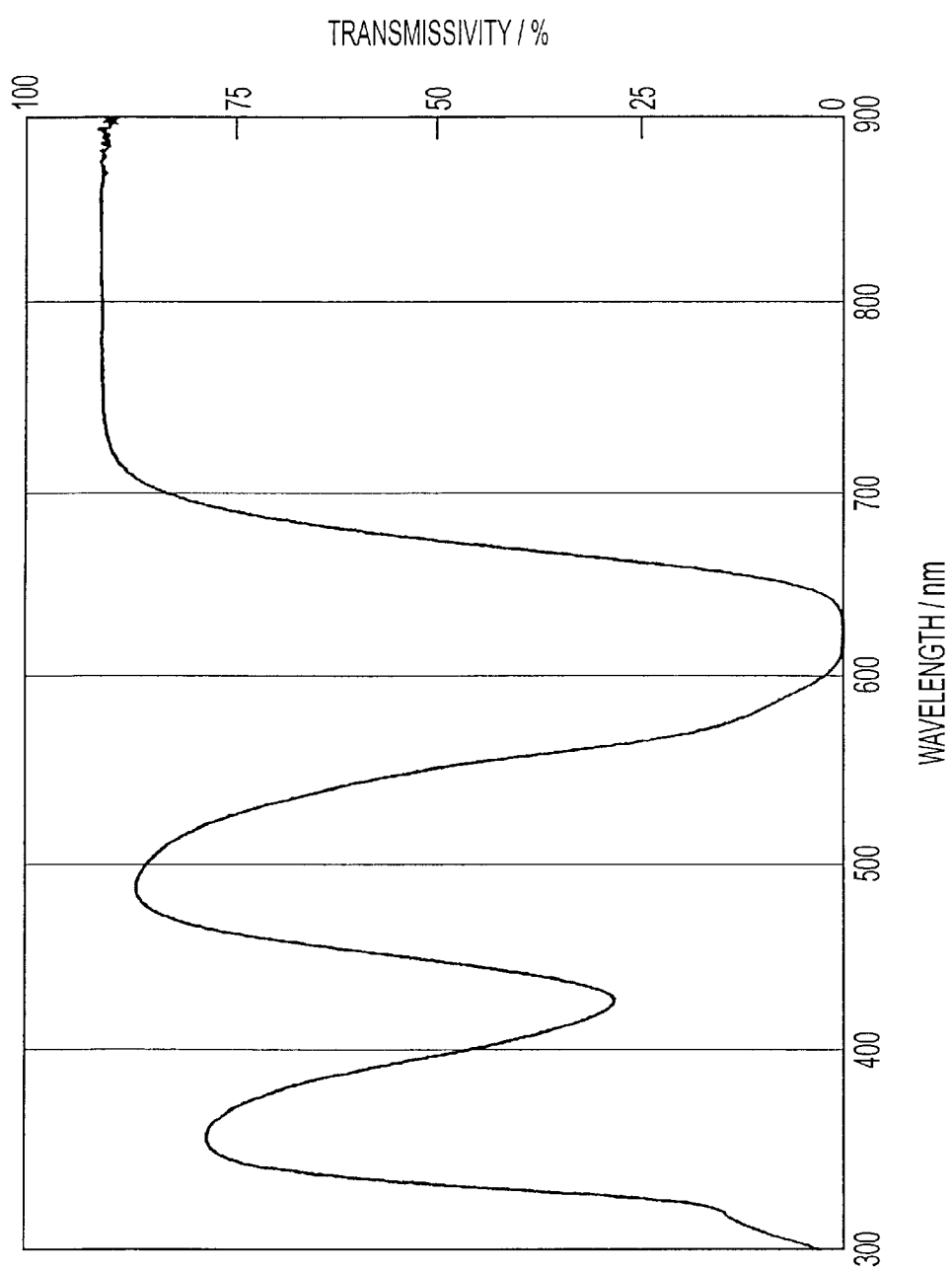
FIG. 50 is a drawing showing the transmittance spectrum of a film photo-element of the ninth embodiment.

The transmittance spectrum of the film photoelement thus prepared is shown in FIG. 50.

The transmittance of this film was 0.12% for the wavelength (633 nm) of the control light, and 77.9% for the wavelength (694 nm) of the signal light.

Using such photoelement 8 as above, and a semiconductor laser (oscillation wavelength 694 nm, continuous oscillation output 3 mW, a Gaussian beam of about 8 mm diameter after the beam normalization) as the light source of signal light 2, with other conditions being kept the same as in Embodiment 1, by varying the positional relationship between the position at which the converged beam diameters of the control light and signal light become minimum (the focal point Fc) and the film photoelement 8, the direction as well as the magnitude of photoresponse of the signal light corresponding to the turning on and off of the control light were examined.

When the incident power of the control light was 25 mW, the maximum value of the photoresponse in the direction of decreasing the photointencity of signal light ΔT was 83%, and the maximum value of the photoresponse in the direction of increasing the apparent photointencity of signal light ΔT' was 39%.

Possible Industrial Applications

As described above, with the method of controlling light and the apparatus of controlling light of the present invention, it becomes possible to efficiently modulate the signal light in the near-infrared region, for example, using the laser beam in the visible region as the control light, with a fairly simple optical apparatus and without using an electronic circuit, etc. at all, and at a practically sufficient response speed.

Also, the direct modulation of a near-infrared light laser by a visible light laser of the present invention is extremely useful, for applications such as the direct modulation of the near-infrared light laser suitable for the transmission in the air by the visible light laser adequate for the transmission within an optical plastic fiber of the polymethyl methacrylate series. In addition, the present invention is expected to be useful, for example, for developing a novel optical computation system in the field of optical computing.

Furthermore, according to the present invention, it is possible to use photoelements comprised of photoresponsive compositions wherein dyes, as the photoelement, are dissolved or dispersed in the matrix materials, expand the selection range of materials used for said photoelements, and widely make way for the industrial applications.

Also, by using the liquid photoresponsive composition filled in the photoelement, it is possible to reduce the optical scattering, and provide an optical apparatus to produce a large response with an as small power as possible. It is also possible to easily carry out the exchange of photoresponsive compositions in the photoelement; and, further, it is possible to display the function of dye for a longer period of time as compared with the case wherein the photoresponsive composition is not liquid because of the material movement caused by diffusion, even though the dye deteriorates in the vicinity of the focal point of control light illuminated into the photoresponsive composition.

Furthermore, by preparing the liquid photoresponsive composition using a volatile solvent, it is possible to prevent the photoelement from being damaged, because said solvent boils to foam when the control light with an excessive power enters, resulting in shutting off said control light.

By incorporating said means of converging the control light and signal light into the photoelement and/or means of differentiating and extracting the bundle of rays of signal light in the region wherein said bundle of rays undergoes the profound modulation of the photointencity and/or the luminous flux density out of those bundle of rays of the diverging signal light after it transmits the photoresponsive composition in the photoelement, and/or means of separating a mixture of signal light and control light which have transmitted said photoresponsive composition in the photoelement into the signal light and control light components, it is possible to provide an exceedingly simple and compact apparatus for controlling light.

What is claimed is:

1. A method of controlling light comprising carrying out modulation of at least one of photosignal intensity and luminous flux density of a signal light by illuminating a photoelement comprised of a photoresponsive composition with a control light having a wavelength to which said photoresponsive composition responds, and thereby reversibly modulating at least one of transmittance and refractive index of said photoelement through which said signal light is being transmitted, wherein said method comprises converging said signal light and said control light respectively and illuminating them on said photoelement, and aligning optical paths of said control light and said signal light respectively so that said control light and said signal light are propagated on essentially the same optical path in said photoelement, and so that regions having the highest photon density in a vicinity of focal points of said control light and said signal light respectively overlap in said photoresponsive composition within said photoelement, and wherein said method further comprises differentiating and extracting a bundle of rays of said signal light in a region of said photoelement where said signal light has undergone profound modulation of at least one of said photosignal intensity and luminous flux density by extracting a bundle of rays that has been transmitted through said photoresponsive composition in said photoelement and exited therefrom with a smaller angular aperture than an emitting angle of said bundle of rays of said signal light.

2. The method of controlling light according to claim 1, wherein said method comprises changing a positional relationship between a position of said photoelement and the focal points of said control light and said signal light, by selecting and extracting a photoresponse in a direction of decreasing apparent photosignal intensity of said signal light that has transmitted through said photoelement, or in a direction of increasing apparent photosignal intensity of said signal light.

3. The method of controlling light according to claim 1, wherein said method comprises using a photoelement comprised of a photoresponsive composition containing a dye as said photoelement.

4. The method of controlling light according to claim 1, wherein said photoresponsive composition is liquid, and said method comprises using a photocell filled in with said liquid photoresponsive composition as said photoelement.

5. The method of controlling light according to claim 4, wherein said liquid photoresponsive composition comprises a volatile solvent.

6. The method of controlling light according to claim 1, wherein said method comprises:

using a photoelement comprised of a photoresponsive composition containing at least one kind of triarylmethane dye represented by the following Formula 1 as said photoelement:

(1)

wherein, in Formula 1, $\phi^1$, $\phi^2$ and $\phi^3$ represent the monovalent or divalent aromatic hydrocarbon residues or aromatic heterocyclic residues linked to the central carbon atom C with the carbon atom, including the cases wherein these residues have a substituent, and $X^-$ represents a chemically inactive counter anion for said triarylmethyl cation.

7. The method of controlling light according to claim 1, wherein said method comprises:

using a photoelement comprised of a photoresponsive composition containing at least one kind of triarylmethane dye represented by the following Formula 2 as said photoelement:

$$\phi^4\phi^5 C = \phi^6 = O \quad (2)$$

wherein, in Formula 2, $\phi^4$ and $\phi^5$ represent the monovalent or divalent aromatic hydrocarbon residue or aromatic heterocyclic residue linked to the central carbon atom C with the carbon atom, including the cases wherein these residues have a substituent $\phi^6$ represents a quinoinic aromatic hydrocarbon residue or aromatic heterocyclic residue wherein two carbon atoms are linked to the central carbon atom and an oxygen atom via the double bond, respectively, including the cases wherein these residues have a substituent.

8. The method of controlling light according to claim 1, wherein said method comprises:

using a photoelement comprised of a photoresponsive composition containing at least one kind of the polymethine dye represented by the following Formula 3 as said photoelement:

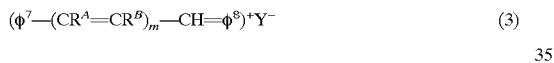

$$(\phi^7-(CR^A=CR^B)_m-CH=\phi^8)^+Y^- \quad (3)$$

wherein, in Formula 3, $\phi^7$ represents a monovalent heterocyclic residue linked to the methine chain by a carbon atom, including the cases wherein these residues have a substituent;

$\phi^8$ represents a divalent heterocyclic residue linked to the methine chain by the carbon atom, including the cases wherein these residues have a substituent, m is the integer 0, 1 or 2, or is higher than 3, when m is higher than 1, $R^A$ and $R^B$ represent hydrogen atom, ethyl carbonate group, halogen atom, alkyl group, aryl group, hydroxyl group, alkoxy group, or amino group respectively, including the cases wherein these residues have a substituent, when m is higher than 2, $R^A$ and $R^B$ are different from each other, or combine to each other to form a ring in some cases, and $Y^-$ represents a chemically inactive counter anion for the cationic moiety of said polymethine dye.

9. The method of controlling light according to claim 1, wherein said method comprises:

using a photoelement comprised of a photoresponsive composition containing at least one kind of phthalocyanine compound represented by the following Formulas 4 through 11 as said photoelement:

(Formula 4)

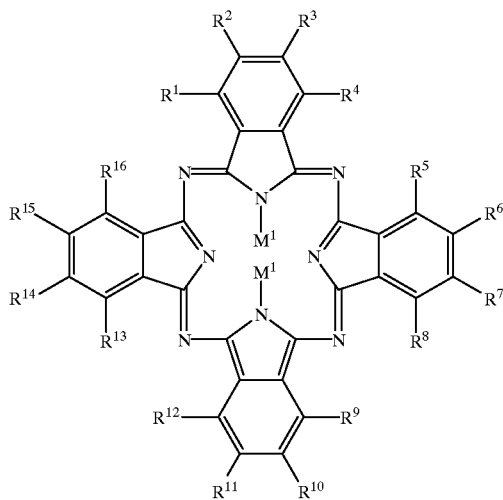

[4]

wherein, in Formula 4, $M^1$ represents one hydrogen atom or one monovalent metal atom, including the case wherein a neutral ligand is coordinated to $M^1$, and $R^1$ through $R^{16}$ represent hydrogen atom, or a monovalent substitute derived from compounds of elements of IV group (C, Si, Ge, Sn and Pb), V group (N, P, As, Sb and Bi), VI group (O, S, Se, Te and Po) or VII group (F, Cl, Br, and I), including the case wherein these substituents are different from each other, or two adjacent substituents combine to each other to form a ring;

(Formula 5)

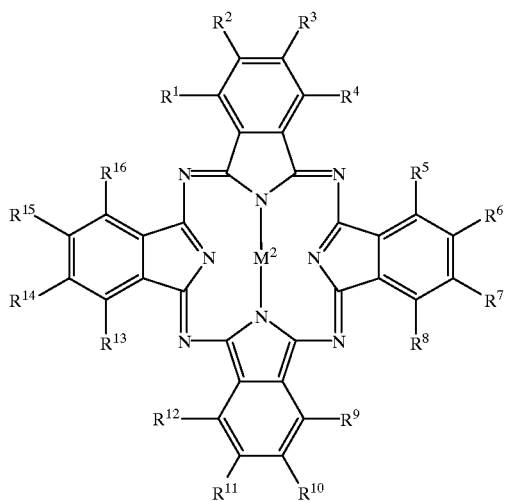

[5]

wherein, in Formula 5, $M^2$ represents one divalent metal atom, including the case wherein a neutral ligand is coordinated to $M^2$, and $R^1$ through $R^{16}$ represent the same as described in the case of Formula 4;

(Formula 6)

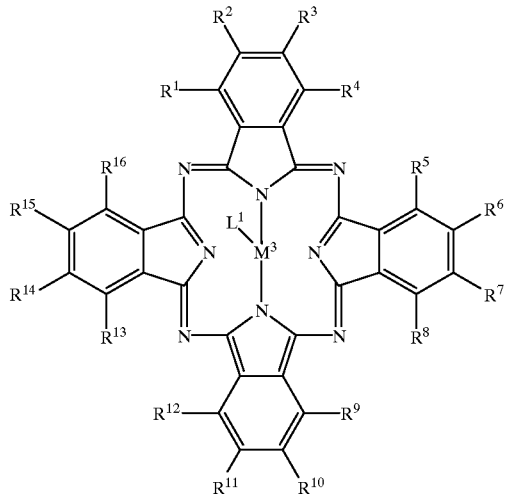

wherein, in Formula 6, $M^3$ represents one trivalent metal atom, including the case wherein a neutral ligand is coordinated to $M^3$, $L^1$ represents a monovalent substitute or a monovalent anion derived from compounds of elements of IV group (C, Si, Ge, Sn and Pb), V group (N, P, As, Sb and Bi), VI group (O, S, Se, Te and Po) or VII group (F, Cl, Br and I), and $R^1$ through $R^{16}$ represent the same as described in the case of Formula 4;

(Formula 7)

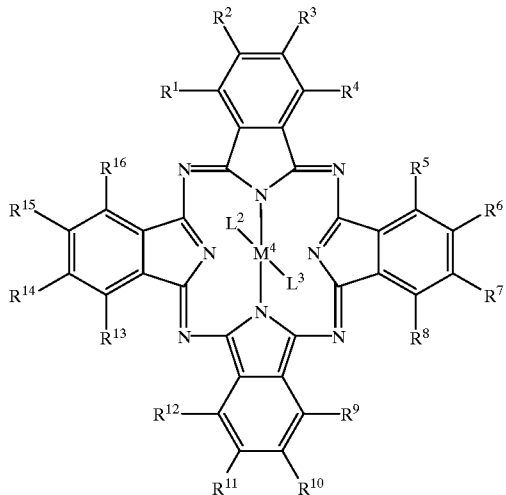

wherein, in Formula 7, $M^4$ represents one tetravalent metal atom, $L^2$ and $L^3$ are synonymous with $L^1$ in formula 6, respectively, including the case wherein $L^2$ and $L^3$ are combined to each other to form a ring, and $R^1$ through $R^{16}$ are synonymous with those of Formula 4;

(Formula 8)

wherein, in Formula 8, $M^4$ represents one trivalent metal atom, n is an integer higher than 1, Z is a divalent group represented by —O— or —O—R—O—, wherein R represents a divalent group derived from compounds comprising elements of IV group (C, Si, Ge, Sn and Pb), and $R^1$ through $R^{18}$ are synonymous with $R^1$ through $R^{16}$ described in formula 4;

(Formula 9)

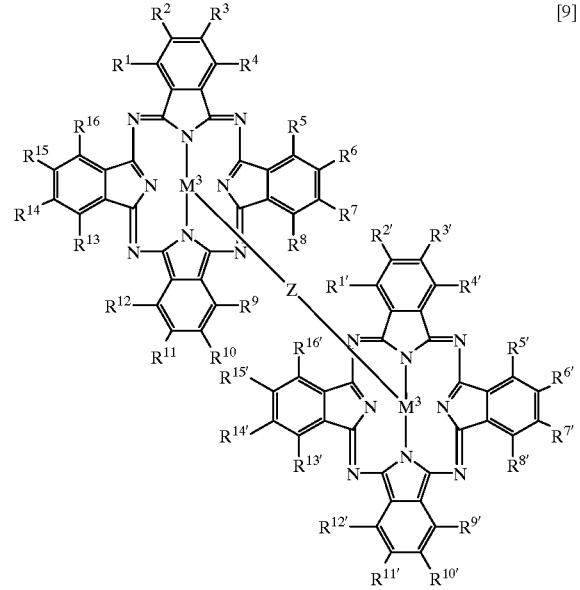

wherein, in Formula 9, $M^3$ represents one trivalent metal atom, including the case wherein a neutral ligand is coordinated to $M^3$, Z is synonymous with that in Formula 8, and $R^1$ through $R^{16}$, and $R^{1'}$ through $R^{16'}$ are synonymous with $R^1$ through $R^{16}$ described in Formula 4;

(Formula 10)

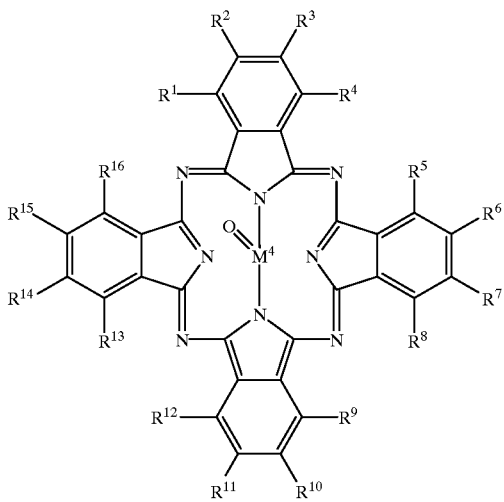

wherein, in Formula 10, $M^4$ represents one tetravalent metal atom, including the case wherein a neutral ligand is coordinated to $M^4$, and $R^1$ through $R^{16}$ are synonymous with those described in the case of Formula 4;

(Formula 11)

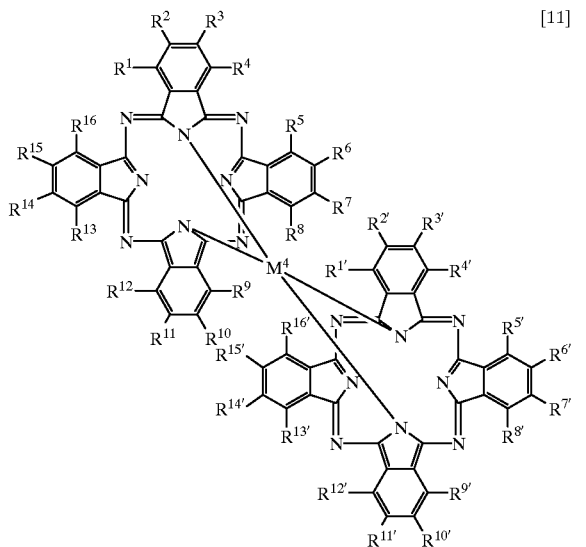

wherein, in Formula 11, $M^4$ represents one tetravalent metal atom, including the case wherein a neutral ligand is coordinated to $M^4$, and $R^1$ through $R^{16}$, and $R^{1'}$ through $R^{16'}$ are synonymous with $R^1$ through $R^{16}$ described in Formula 4.

10. An apparatus for controlling light that carries out modulation of at least one of photosignal intensity and luminous flux density of a signal light that transmits through a photoelement by illuminating said photoelement comprised of a photoresponsive composition with a control light having a wavelength to which said photoresponsive composition responds, thereby reversibly increasing or decreasing at least one of transmittance or refractive index of said photoelement in a different wavelength band region from that of said control light, wherein said apparatus comprises means for converging said control light and said signal light respectively, aligning optical paths of said control light and said signal light respectively so that said control light and said signal light propagate essentially on the same optical path in said photoelement, and so that regions having the highest photon density in a vicinity of focal points of said converged control light and said signal light respectively overlap, and, furthermore, placing said photoresponsive composition within said photoelement so that the regions having the highest photon density in the vicinity of the focal points of said converged control light and said signal light respectively overlap, and wherein said apparatus comprises means for differentiating and extracting a bundle of rays of said signal light in a region of said photoelement where said signal light has undergone profound modulation of at least one of said photosignal intensity and said luminous flux density out of a bundle of rays of said signal light that has transmitted through said photoresponsive composition in said photoelement and has emitted therefrom, and wherein said means for extracting has a numerical aperture that is smaller than a numerical aperture of the converging means used at the time of convergence and entrance of said signal light into said photoelement.

11. The apparatus for controlling light according to claim 10, wherein a positional relationship between the focal points of said control light and said signal light respectively and said photoelement are altered by selecting and extracting a photoresponse in a direction of decreasing apparent photosignal intensity of said signal light or in a direction of increasing apparent photosignal intensity of said signal light that has transmitted through said photoelement.

12. The apparatus for controlling light according to claim 10, wherein at least one of said convergence means for converging said control light and said signal light respectively, and said means for differentiating and extracting the bundle of rays of signal light in the region of said photoelement where said signal light has undergone the profound modulation of at least one of said photosignal intensity and luminous flux density out of the bundle of rays of signal light that has transmitted through said photoresponsive composition in said photoelement and emitted therefrom, or a means for separating a mixture of said signal light and said control light that have transmitted through said photoresponsive composition in said photoelement into a signal light and a control light component, are incorporated into the structure of said photoelement.

13. The apparatus for controlling light according to claim 10, wherein said photoresponsive composition comprises dye.

14. The apparatus for controlling light according to claim 10, wherein said photoresponsive composition is liquid, and said apparatus uses a photocell filled in with said liquid photoresponsive composition as said photoelement.

15. The apparatus for controlling light according to claim 14, wherein said liquid photoresponsive composition comprises a volatile solvent.

16. The apparatus for controlling light according to claim 10, wherein said photoresponsive composition comprises at least one kind of triarylmethane dye represented by Formula 1:

$$(\phi^1\phi^2\phi^3C)^+X^- \quad (1)$$

wherein, in Formula 1, $\phi^1$, $\phi^2$ and $\phi^3$ represent the monovalent or divalent aromatic hydrocarbon residues or aromatic heterocyclic residues linked to the central carbon atom C with the carbon atom, including the cases wherein these residues have a substituent, and $X^-$ represents a chemically inactive counter anion for said triarylmethyl cation.

17. The apparatus for controlling light according to claim 10, wherein said photoresponsive composition comprises at least one kind of triarylmethane dye represented by Formula 2:

$$\phi^4\phi^5C=\phi^6=O \quad (2)$$

wherein, in Formula 2, $\phi^4$ and $\phi^5$ represent the monovalent or divalent aromatic hydrocarbon residue or aromatic heterocyclic residue linked to the central carbon atom C with the carbon atom, including the cases wherein these residues have a substituent $\phi^6$ represents a quinoinic aromatic hydrocarbon residue or aromatic heterocyclic residue wherein two carbon atoms are linked to the central carbon atom and an oxygen atom via the double bond, respectively, including the cases wherein these residues have a substituent.

18. The apparatus for controlling light according to claim 10, wherein said photoresponsive composition comprises at least one kind of polymethine dye represented by Formula 3:

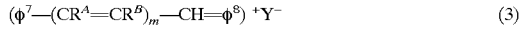

$$(\phi^7-(CR^A=CR^B)_m-CH=\phi^8)^+Y^- \quad (3)$$

wherein, in Formula 3, $\phi^7$ represents a monovalent heterocyclic residue linked to the methine chain by a carbon atom, including the cases wherein these residues have a substituent;

$\phi^8$ represents a divalent heterocyclic residue linked to the methine chain by the carbon atom, including the cases wherein these residues have a substituent, m is the integer 0, 1 or 2, or is higher than 3, when m is higher than 1, $R^A$ and $R^B$ represent hydrogen atom, ethyl carbonate group, halogen atom, alkyl group, aryl group, hydroxyl group, alkoxy group, or amino group respectively, including the cases wherein these residues have a substituent, when m is higher than 2, $R^A$ and $R^B$ are different from each other, or combine to each other to form a ring in some cases, and $Y^-$ represents a chemically inactive counter anion for the cationic moiety of said polymethine dye.

19. The apparatus for controlling light according to claim 10, wherein said photoresponsive composition comprises at least one kind of phthalocyanine compound represented by Formulas 4 through 11:

(Formula 4)

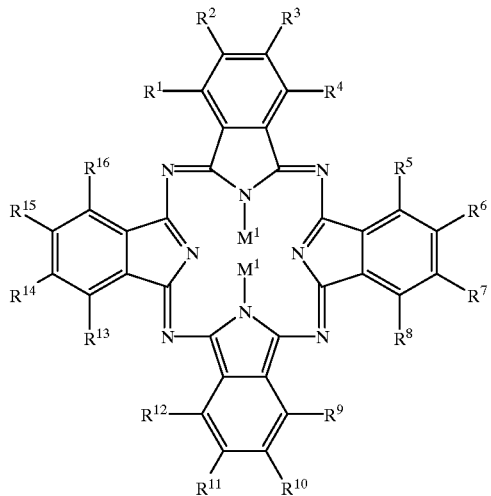

wherein, in Formula 4, $M^1$ represents one hydrogen atom or one monovalent metal atom, including the case wherein a neutral ligand is coordinated to $M^1$, and $R^1$ through $R^{16}$ represent hydrogen atom, or a monovalent substitute derived from compounds of elements of IV group (C, Si, Ge, Sn and Pb), V group (N, P, As, Sb and Bi), VI group (O, S, Se, Te and Po) or VII group (F, Cl, Br, and I), including the case wherein these substituents are different from each other, or two adjacent substituents combine to each other to form a ring;

(Formula 5)

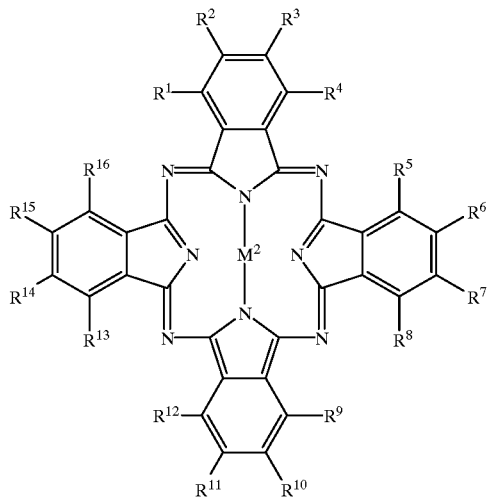

wherein, in Formula 5, $M^2$ represents one divalent metal atom, including the case wherein a neutral ligand is coordinated to $M^2$, and $R^1$ through $R^{16}$ represent the same as described in the case of Formula 4;

(Formula 6)

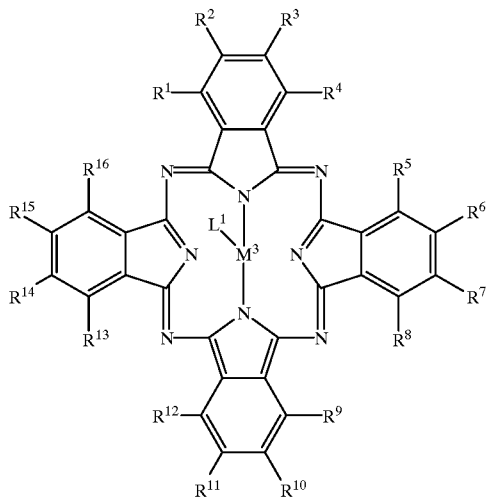

wherein, in Formula 6, $M^3$ represents one trivalent metal atom, including the case wherein a neutral ligand is coordinated to $M^3$, $L^1$ represents a monovalent substitute or a monovalent anion derived from compounds of elements of IV group (C, Si, Ge, Sn and Pb), V group (N, P, As, Sb and Bi), VI group (O, S, Se, Te and Po) or VII group (F, Cl, Br and I), and $R^1$ through $R^{16}$ represent the same as described in the case of Formula 4;

(Formula 7)

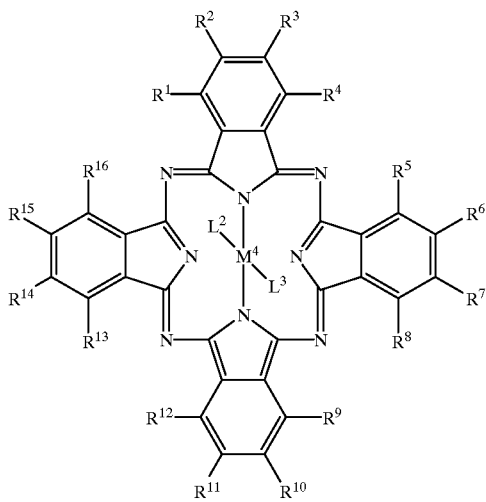

wherein, in Formula 7, $M^4$ represents one tetravalent metal atom, $L^2$ and $L^3$ are synonymous with $L^1$ in formula 6, respectively, including the case wherein $L^2$ and $L^3$ are combined to each other to form a ring, and $R^1$ through $R^{16}$ are synonymous with those I the case of Formula 4;

(Formula 8)

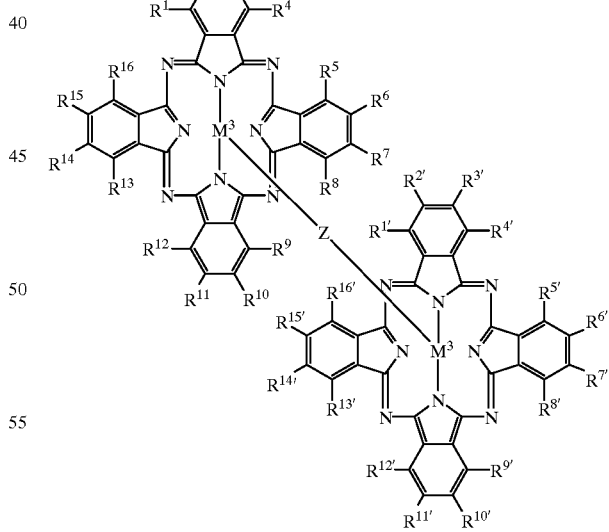

wherein, in Formula 8, $M^4$ represents one trivalent metal atom, n is an integer higher than 1, Z is a divalent group represented by —O— or —O—R—O—, wherein R represents a divalent group derived from compounds comprising elements of IV group (C, Si, Ge, Sn and Pb), and $R^1$ through $R^{18}$ are synonymous with $R^1$ through $R^{16}$ described in formula 4;

(Formula 9)

wherein, in Formula 9, $M^3$ represents one trivalent metal atom, including the case wherein a neutral ligand is coordinated to $M^3$, Z is synonymous with that in Formula 8, and $R^1$ through $R^{16}$, and $R^{1'}$ through $R^{16'}$ are synonymous with $R^1$ through $R^{16}$ described in Formula 4;

(Formula 10)

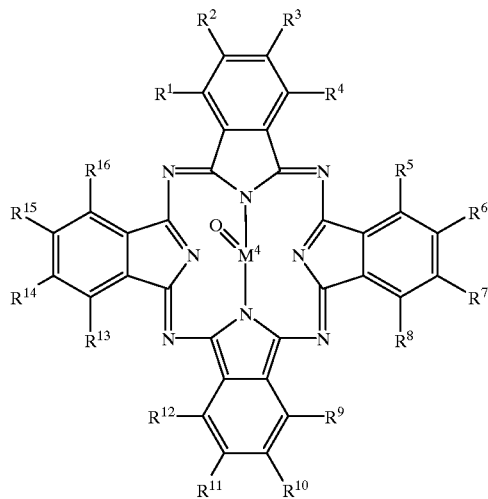

wherein, in Formula 10, $M^4$ represents one tetravalent metal atom, including the case wherein a neutral ligand is coordinated to $M^4$, and $R^1$ through $R^{16}$ are synonymous with those described in the case of Formula 4;

(Formula 11)

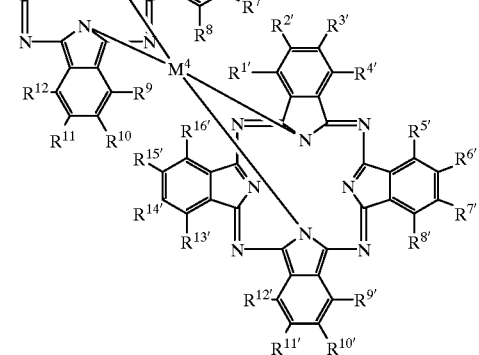

wherein, in Formula 11, $M^4$ represents one tetravalent metal atom, including the case wherein a neutral ligand is coordinated to $M^4$, and $R^1$ through $R^{16}$, and $R^{1'}$ through $R^{16'}$ are synonymous with $R^1$ through $R^{16}$ described in Formula 4.

* * * * *

UNITED STATES PATENT AND TRADEMARK OFFICE
CERTIFICATE OF CORRECTION

PATENT NO.    : 6,265,708 B1
DATED         : July 24, 2001
INVENTOR(S)   : Norio Tanaka, Shigeru Takarada, Hiromitsu Yanagimoto, Masakatsu Kai and Ichiro Ueno It is certified that error appears in the above-identified patent and that said Letters Patent is hereby corrected as shown below:

Title page,
Change "[22] PCT Filed: Nov. 14, 1996" to -- "[22] PCT Filed: Sep. 18, 1996 --.

Signed and Sealed this

Twenty-sixth Day of February, 2002

Attest:

Attesting Officer

JAMES E. ROGAN
Director of the United States Patent and Trademark Office